(12) United States Patent
Zhang et al.

(10) Patent No.: US 12,519,511 B2
(45) Date of Patent: Jan. 6, 2026

(54) MIMO BEAMFORMING BASED SENSING METHOD AND RELATED APPARATUS

(71) Applicant: Huawei Technologies Co., Ltd., Shenzhen (CN)

(72) Inventors: Meihong Zhang, Shenzhen (CN); Rui Du, Shenzhen (CN); Chenchen Liu, Shenzhen (CN); Yingxiang Sun, Shenzhen (CN); Xiao Han, Shenzhen (CN); Xun Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 345 days.

(21) Appl. No.: 18/366,406

(22) Filed: Aug. 7, 2023

(65) Prior Publication Data

US 2023/0379012 A1  Nov. 23, 2023

Related U.S. Application Data

(63) Continuation of application No. PCT/CN2022/073471, filed on Jan. 24, 2022.

(30) Foreign Application Priority Data

Feb. 8, 2021  (CN) .......................... 202110171822.6

(51) Int. Cl.
*H04B 7/0417* (2017.01)
*H04B 7/0452* (2017.01)
*H04B 7/06* (2006.01)

(52) U.S. Cl.
CPC ......... *H04B 7/0417* (2013.01); *H04B 7/0452* (2013.01); *H04B 7/0626* (2013.01); *H04B 7/0634* (2013.01)

(58) Field of Classification Search
CPC .. H04B 7/0413; H04B 7/0417; H04B 7/0452; H04B 7/06; H04B 7/0626; H04B 7/0634; H04B 7/0695; H04B 7/088; H04W 24/08
See application file for complete search history.

(56) References Cited

U.S. PATENT DOCUMENTS

2017/0317727 A1* 11/2017 Wang .................. H04B 7/0452
2019/0273535 A1*  9/2019 Yun ..................... H04B 7/0634
(Continued)

FOREIGN PATENT DOCUMENTS

CN         112748425 A       5/2021

OTHER PUBLICATIONS

International Search Report (ISR) of PCT/CN2022/073471 (English translation), mailed Apr. 20, 2022 (Year: 2022).*

(Continued)

*Primary Examiner* — Benjamin H Elliott, IV
(74) *Attorney, Agent, or Firm* — Slater Matsil, LLP

(57) ABSTRACT

A method includes: A first device sends a first BRP frame, to indicate a second device to evaluate a variation of CSI from the first device to the second device in an initiator beam refinement protocol transmit sector sweep procedure. The first device sends a plurality of first BRP-TX PPDUs, where the plurality of first BRP-TX PPDUs are used to evaluate the variation of the CSI from the first device to the second device. The first device receives a second BRP frame carrying a first sector information list, where the first sector information list is used to feed back one or more sending sectors whose variation of the CSI from the first device to the second device is greater than a CSI variation threshold.

20 Claims, 21 Drawing Sheets

(56) References Cited

U.S. PATENT DOCUMENTS

| | | | | |
|---|---|---|---|---|
| 2020/0204222 A1* | 6/2020 | Lou | | H04B 7/0452 |
| 2020/0204235 A1* | 6/2020 | Liu | | H04B 7/06 |
| 2020/0359248 A1* | 11/2020 | Sadeghi | | H04W 74/0808 |
| 2021/0143887 A1* | 5/2021 | Oteri | | H04B 7/088 |
| 2021/0242910 A1* | 8/2021 | Huang | | H04B 7/0417 |
| 2021/0336658 A1* | 10/2021 | Shimon | | H04B 7/0413 |
| 2022/0070927 A1* | 3/2022 | Lim | | H04W 24/10 |
| 2023/0138224 A1* | 5/2023 | Sadeghi | | H04W 74/0808 370/338 |
| 2023/0236307 A1* | 7/2023 | Kim | | H04B 17/24 342/52 |
| 2023/0362990 A1* | 11/2023 | Jang | | H04W 74/0808 |
| 2023/0379012 A1* | 11/2023 | Zhang | | H04W 24/08 |
| 2024/0031050 A1* | 1/2024 | Du | | H04J 13/0014 |

OTHER PUBLICATIONS

"An Overview of Signal Processing Techniques for Millimeter Wave MIMO Systems"; Heath, Jr. et al.; IEEE Journal of Selected Topics in Signal Processing, vol. 10, No. 3, 2016 (Year: 2016).*
"IEEE 802.11ay-Based mmWave WLANs: Design Challenges and Solutions"; Zhou et al.; IEEE Communications Surveys & Tutorials, vol. 20, No. 3, Third Quarter 2018 (Year: 2018).*
IEEE P802.11ay/D5.0, Oct. 2019. "Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 2: Enhanced throughput for operation in license-exempt bands above 45 GHz". total 790 pages.

* cited by examiner

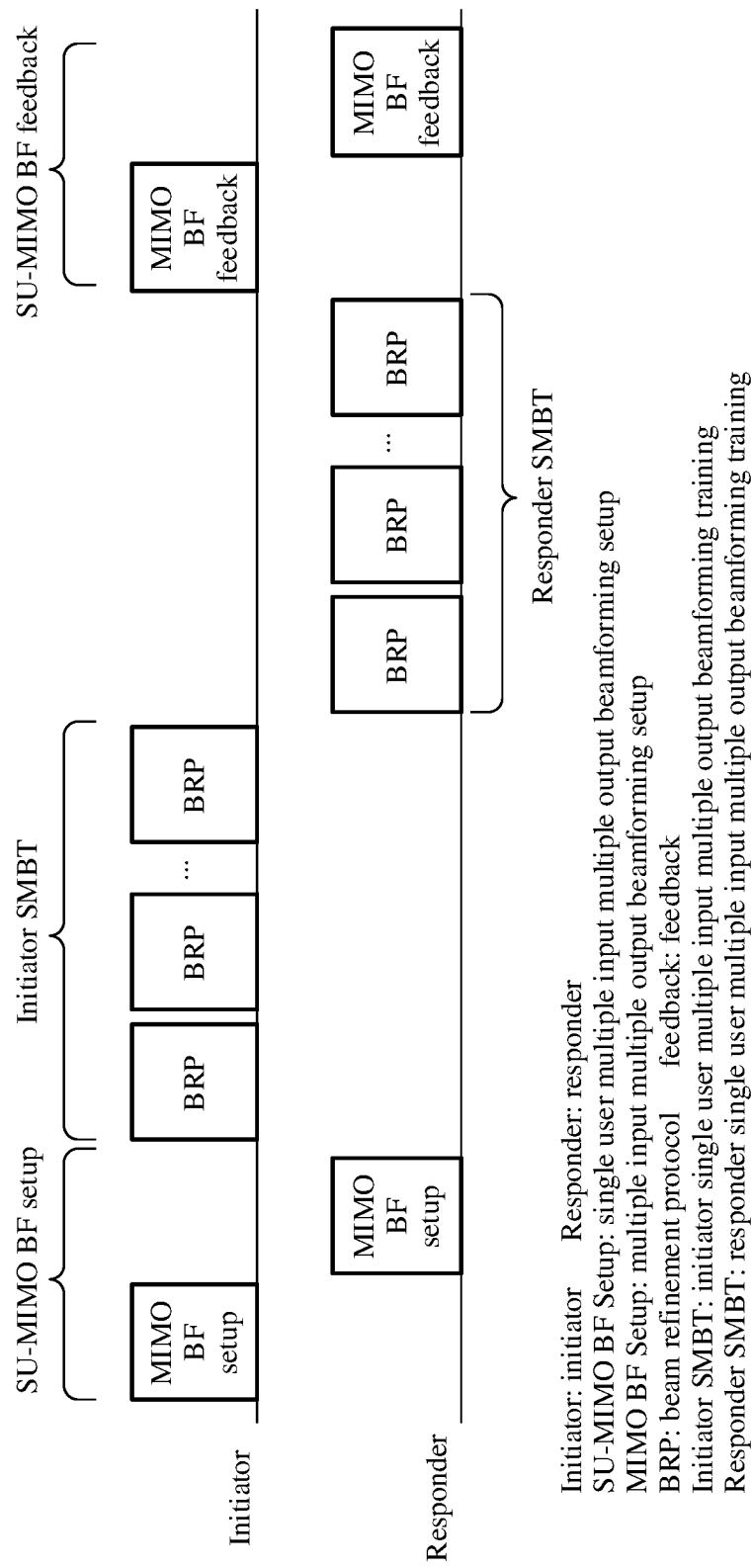

FIG. 4

Initiator: initiator    Responder: responder
SU-MIMO BF Setup: single user multiple input multiple output beamforming setup
MIMO BF Setup: multiple input multiple output beamforming setup
BRP: beam refinement protocol    feedback: feedback
Initiator SMBT: initiator single user multiple input multiple output beamforming training
Responder SMBT: responder single user multiple input multiple output beamforming training

| Order Order | Information (information) |
|---|---|
| 1 | Category (category) |
| 2 | Unprotected DMG action/Unprotected DMG action |
| 3 | Dialog token/Dialog token |
| 4 | BRP request field/BRP request field |
| 5 | DMG beam refinement element/DMG beam refinement element |
| 6 | Zero or more channel measurement feedback elements/Zero or more channel measurement feedback elements |
| 7 | Enhanced beam tracking element/Enhanced beam tracking element |
| 8 | SSW report element/SSW report element |
| 9 | EDMG partial sector level sweep element (optional)/EDMG partial sector level sweep element (optional) |
| 10 | EDMG BRP request element (optional)/EDMG BRP request element (optional) |
| 11 | Zero or more EDMG channel measurement feedback elements/Zero or more channel measurement feedback elements |
| 12 | BRP sensing request element/BRP sensing request element |

MIMO BF setup frame action field format
Multiple input multiple output beamforming setup frame action field format

| Order<br>Order | Information (information) |
|---|---|
| 1 | Category (category) |
| 2 | Unprotected DMG action/Unprotected DMG action |
| 3 | Dialog token/Dialog token |
| 4 | MIMO setup control element<br>MIMO setup control element |

CONT. FROM FIG. 11A

| Field | Size (bits) | Meaning |
|---|---|---|
| Element ID | 8 | |
| Element identifier | 8 | |
| Length | 8 | |
| Element ID extension | 8 | |
| Element identifier extension | 8 | |
| SU/MU Single user/multiple user | 1 | |
| Nonreciprocal/Reciprocal MIMO phase | 1 | |
| EDMG group ID/EDMG group ID | 8 | |
| Group user mask/Group user mask | 32 | |
| L-TX-RX | 8 | |
| Requested EDMG TRN-unit M | 4 | |
| Requested EDMG training unit M | | |
| Initiator/Initiator | 1 | |
| MIMO FBCK-REQ/MIMO feedback request | 10 | |
| Reserved/Reserved | 7 | |
| Sensing measurement | 1 | This field set to 1 indicates the sensing measurement./This field is set to 1 to indicate sensing measurement |
| MIMO FBCK-REQ extension/MIMO feedback request extension | 6 | This field is reserved when sensing measurement is set to 0. This field is reserved when sensing measurement is set to 0 |

| CSI variation threshold | Evaluation algorithm | Number of beam sweep cycles |
|---|---|---|
| Channel state information variation threshold | Evaluation algorithm | Number of beam sweep cycles |
| Bits: 2 | 2 | 2 |

FIG. 11B

| Element ID Element identifier | Length Length | Initiator Initiator | TX-train response Transmit train response | RX-train response Receive train response | TX-TRN-OK Normal transmit training | TXSS-FBCK-REQ Initiator sending sector sweep feedback request | BS-FBCK Basic service feedback | BS-FBCK DMG antenna ID Basic service feedback DMG antenna identifier | FBCK-REQ Feedback request |
|---|---|---|---|---|---|---|---|---|---|
| Bits: 8 | 8 | 1 | 1 | 1 | 1 | 1 | 6 | 2 | 5 |

| FBCK-TYPE Feedback type | MID extension Multi-sector ID detection extension | Capability request Capability request | Reserved Reserved | BS-FBCK MSB Most significant bit of basic service feedback | BS-FBCK antenna ID MSB Most significant bit of basic service feedback antenna ID | Number of measurements MSB Most significant bit of number of measurements |
|---|---|---|---|---|---|---|
| Bits: 18 | 1 | 1 | 2 | 5 | 1 | 4 |

| EDMG extension flag Enhanced directional multi-gigabit extension flag | EDMG channel measurement present EDMG channel measurement present | Sector sweep frame type Sector sweep frame type | DBF FBCK REQ Digital beamforming feedback request | Channel aggregation requested Channel aggregation requested |
|---|---|---|---|---|
| Bits: 1 | 1 | 2 | 1 | 1 |

| Channel aggregation present Channel aggregation present | BF training type Beamforming training type | EDMG dual polarization TRN channel measurement present EDMG dual polarization training channel measurement | Reserved Reserved | Sensing FBCK-REQ Sensing feedback request | Sensing FBCK-TYPE Sensing feedback type | Reserved Reserved |
|---|---|---|---|---|---|---|
| Bits: 1 | 2 | 1 | 4 | 1 | 7 | 3 |

MIMO BEAMFORMING BASED SENSING METHOD AND RELATED APPARATUS

CROSS-REFERENCE TO RELATED APPLICATIONS

This application is a continuation of International Patent Application No. PCT/CN2022/073471, filed on Jan. 24, 2022, which claims priority to Chinese Patent Application No. 202110171822.6, filed on Feb. 8, 2021. The disclosures of the aforementioned applications are hereby incorporated by reference in their entireties.

TECHNICAL FIELD

This application relates to the field of wireless communication technologies, and in particular, to a multiple input multiple output (MIMO) beamforming-based sensing method and a related apparatus.

BACKGROUND

A wireless local area network (WLAN) sensing (WLAN sensing) technology has a wide application prospect. In this technology, widely deployed WLAN devices are used to send a wireless fidelity (Wi-Fi) signal to sense an ambient environment and receive a signal echo or feedback information generated by a peer device in a wireless network. Then, corresponding parameters are extracted from a received signal according to a specific algorithm for analysis, to obtain ambient environment information. Although existing sensors on the market can also provide environmental control feedback, these sensors need to be installed specifically. An existing network can be used to generate same feedback through WLAN sensing, and there is no need to build and maintain a plurality of systems.

The 802.11ay standard is one of standards for millimeter-wave wireless local area network communication. A millimeter-wave band has abundant available spectrum resources, and can implement an extremely high communication rate. However, channel attenuation of a millimeter-wave signal is severe and a path loss is large. Therefore, signal attenuation in a transmission process is compensated for by using a directional beamforming (BF) technology in millimeter-wave communication.

Because the beamforming technology in the 802.11ay standard uses a beam sweep process to align beams at a receive device and a transmit device, and the beam sweep process facilitates detection of an ambient environment. Therefore, how to combine the WLAN sensing technology with the beamforming technology and perform WLAN sensing without affecting normal communication becomes an urgent problem to be resolved.

SUMMARY

Embodiments of this application provide a MIMO beamforming-based sensing method and a related apparatus, to combine a WLAN sensing technology and a MIMO beamforming technology, and implements sensing and training on a beam for sensing in addition to original MIMO beamforming training, with no need to specially design a related process for sensing and training on the beam for sensing, so that overheads are low, and compatibility is good.

The following describes this application from different aspects. It should be understood that mutual reference may be made to the following implementations and beneficial effect of the different aspects.

According to a first aspect, this application provides a MIMO beamforming-based sensing method. The method is applied to a single user (Single user, SU) MIMO beamforming training scenario. SU MIMO beamforming training includes a single input single output (SISO) phase and a MIMO phase. The MIMO beamforming-based sensing method includes: A first device sends a first beam refinement protocol (BRP) frame, where the first BRP frame indicates a second device to evaluate a variation of channel state information (channel state information, CSI) from the first device to the second device in an initiator beam refinement protocol (BRP) transmit sector sweep (TXSS) procedure. The first device sends a plurality of first BRP transmit (TX) physical layer protocol data units (Physical Layer (PHY) Protocol Data Units, PPDUs) in a sector sweep manner, where the plurality of first BRP-TX PPDUs are used to evaluate the variation of the CSI from the first device to the second device. The first device receives a second BRP frame carrying a first sector information list. The first sector information list is used to feed back one or more sending sectors whose variation of the CSI from the first device to the second device is greater than a CSI variation threshold.

The first device is an initiator (initiator), and the second device is a responder (responder). The first device performs sector sweep for at least two cycles. In other words, the first device performs sending for at least two times by using a same sending sector (one first BRP-TX PPDU is sent each time).

It can be learned that in this solution, WLAN sensing is introduced in the initiator beam refinement protocol transmit sector sweep procedure of SU MIMO beamforming training. A related frame format of the initiator beam refinement protocol transmit sector sweep procedure is modified, and whether there is a moving target in an area is determined by using a variation of a CSI value obtained when sweep is performed by using a same beam for a plurality of times. This can implement sensing and training on a sending/receiving beam for sensing in addition to SU MIMO beamforming training, and a related process does not need to be specially designed for sensing and training on the sending/receiving beam for sensing, so that overheads are low, and compatibility is good.

With reference to the first aspect, in a possible design, before the first device sends the plurality of first BRP-TX PPDUs, the method further includes: The first device receives a third BRP frame. The third BRP frame indicates the first device to evaluate a variation of CSI from the second device to the first device in a responder beam refinement protocol transmit sector sweep procedure. After the first device receives the second BRP frame carrying the first sector information list, the method further includes: The first device quasi-omnidirectionally receives a plurality of second BRP-TX PPDUs, and evaluates the variation of the CSI from the second device to the first device based on the plurality of second BRP-TX PPDUs. The first device sends a fourth BRP frame carrying a second sector information list. The second sector information list is used to feed back one or more sending sectors whose variation of the CSI from the second device to the first device is greater than a CSI variation threshold.

It can be learned that in this solution, WLAN sensing is also introduced in the responder beam refinement protocol transmit sector sweep procedure of SU MIMO beamforming training, and an optimal sending sector used by the responder for sensing can be obtained through training.

With reference to the first aspect, in a possible design, after the first device receives the second BRP frame carrying the first sector information list, the method further includes: The first device sends a first multiple input multiple output (MIMO) beamforming (BF) setup frame, where the first MIMO BF setup frame includes first indication information, and the first indication information indicates the second device to evaluate the variation of the CSI from the first device to the second device in an initiator single user multiple input multiple output beamforming training (SMBT) procedure. The first device sends a plurality of first BRP TX/RX PPDUs in the sector sweep manner, where the plurality of first BRP TX/RX PPDUs are used to evaluate the variation of the CSI from the first device to the second device. The first device receives a first MIMO BF feedback frame carrying a third sector information list. The third sector information list is used to feed back a sending sector in one or more sending and receiving sector pairs whose variation of the CSI from the first device to the second device is greater than the CSI variation threshold.

Because a receive device only needs to know an optimal receiving sector of the receive device and to perform receiving by using the optimal receiving sector in a subsequent application process, and does not need to notify the transmit device of the optimal receiving sector, the third sector information list only needs to feed back a sending sector in an optimal sending and receiving sector pair. It should be understood that the sending sector fed back in the third sector information list may be different from or the same as the sending sector fed back in the first sector information list.

It can be learned that this solution combines WLAN sensing and SU MIMO beamforming training, and can implement sensing of the transmit device and the receive device and training on an optimal sending/receiving beam for sensing of the transmit device and the receive device in addition to original SU MIMO beamforming training, with no need to specially design a related process for sensing and training on the beam for sensing, so that overheads are low, and compatibility is good.

With reference to the first aspect, in a possible design, before the first device sends the plurality of first BRP TX/RX PPDUs, the method further includes: The first device receives a second MIMO BF setup frame. The second MIMO BF setup frame includes second indication information. The second indication information indicates the first device to evaluate the variation of the CSI from the second device to the first device in a responder SMBT procedure. After the first device sends the plurality of first BRP TX/RX PPDUs, the method further includes: The first device receives a plurality of second BRP TX/RX PPDUs in the sector sweep manner, and evaluating the variation of the CSI from the second device to the first device based on the plurality of second BRP TX/RX PPDUs. The first device sends a second MIMO BF feedback frame carrying a fourth sector information list. The fourth sector information list is used to feed back a sending sector in one or more sending and receiving sector pairs whose variation of the CSI from the second device to the first device is greater than the CSI variation threshold.

It should be understood that the sending sector fed back in the fourth sector information list may be different from or the same as the sending sector fed back in the second sector information list.

It can be learned that in this solution, WLAN sensing is also introduced in the responder SMBT procedure of SU MIMO beamforming training, and an optimal sending/receiving sector used by the responder for sensing can be obtained through training.

According to a second aspect, this application provides a MIMO beamforming-based sensing method. The method is applied to an SU MIMO beamforming training scenario. SU MIMO beamforming training includes a SISO phase and a MIMO phase. The MIMO beamforming-based sensing method includes: A second device receives a first BRP frame, where the first BRP frame indicates the second device to evaluate a variation of CSI from a first device to the second device in an initiator beam refinement protocol transmit sector sweep procedure. The second device quasi-omnidirectionally receives a plurality of first BRP-TX PPDUs, and evaluates the variation of the CSI from the first device to the second device based on the plurality of first BRP-TX PPDUs. The second device sends a second BRP frame carrying a first sector information list. The first sector information list is used to feed back one or more sending sectors whose variation of the CSI from the first device to the second device is greater than a CSI variation threshold.

The first device is an initiator, and the second device is a responder (responder).

With reference to the second aspect, in a possible design, before the second device quasi-omnidirectionally receives the plurality of first BRP-TX PPDUs, the method further includes: The second device sends a third BRP frame. The third BRP frame indicates the first device to evaluate a variation of CSI from the second device to the first device in a responder beam refinement protocol transmit sector sweep procedure. After the second device sends the second BRP frame carrying the first sector information list, the method further includes: The second device sends a plurality of second BRP-TX PPDUs in a sector sweep manner, where the plurality of second BRP-TX PPDUs are used to evaluate the variation of the CSI from the second device to the first device. The second device receives a fourth BRP frame carrying a second sector information list. The second sector information list is used to feed back one or more sending sectors whose variation of the CSI from the second device to the first device is greater than a CSI variation threshold.

The second device performs sector sweep for at least two cycles. In other words, the second device performs sending for at least two times by using a same sending sector (one second BRP-TX PPDU is sent each time).

With reference to the second aspect, in a possible design, after the second device sends the second BRP frame carrying the first sector information list, the method further includes: The second device receives a first MIMO BF setup frame, where the first MIMO BF setup frame includes first indication information, and the first indication information indicates the second device to evaluate the variation of the CSI from the first device to the second device in an initiator SMBT procedure. The second device receives a plurality of first BRP TX/RX PPDUs in the sector sweep manner, and evaluates the variation of the CSI from the first device to the second device based on the plurality of first BRP TX/RX PPDUs. The second device sends a first MIMO BF feedback frame carrying a third sector information list. The third sector information list is used to feed back a sending sector in one or more sending and receiving sector pairs whose variation of the CSI from the first device to the second device is greater than the CSI variation threshold.

It should be understood that the sending sector fed back in the third sector information list may be different from or the same as the sending sector fed back in the first sector information list.

With reference to the second aspect, in a possible design, before the second device receives the plurality of first BRP TX/RX PPDUs, the method further includes: The second device sends a second MIMO BF setup frame. The second MIMO BF setup frame includes second indication information. The second indication information indicates the first device to evaluate the variation of the CSI from the second device to the first device in a responder SMBT procedure. After the second device receives the plurality of first BRP TX/RX PPDUs, the method further includes: The second device sends a plurality of second BRP TX/RX PPDUs in the sector sweep manner, where the plurality of second BRP TX/RX PPDUs are used to evaluate the variation of the CSI from the second device to the first device. The second device receives a second MIMO BF feedback frame carrying a fourth sector information list. The fourth sector information list is used to feed back a sending sector in one or more sending and receiving sector pairs whose variation of the CSI from the second device to the first device is greater than the CSI variation threshold.

It should be understood that the sending sector fed back in the fourth sector information list may be different from or the same as the sending sector fed back in the second sector information list.

According to a third aspect, this application provides a first device or a chip in the first device, for example, a Wi-Fi chip. The first device includes: a sending unit and a receiving unit. The sending unit is configured to send a first beam refinement protocol (BRP) frame, where the first BRP frame indicates a second device to evaluate a variation of channel state information (CSI) from the first device to the second device in an initiator beam refinement protocol transmit sector sweep procedure. The sending unit is further configured to send a plurality of first BRP-TX PPDUs, where the plurality of first BRP-TX PPDUs are used to evaluate the variation of the CSI from the first device to the second device. The receiving unit is configured to receive a second BRP frame carrying a first sector information list. The first sector information list is used to feed back one or more sending sectors whose variation of the CSI from the first device to the second device is greater than a CSI variation threshold.

Optionally, the first device further includes a processing unit, configured to generate the first BRP frame, and further configured to generate the plurality of first BRP-TX PPDUs.

With reference to the third aspect, in a possible design, the receiving unit is further configured to receive a third BRP frame, where the third BRP frame indicates the first device to evaluate a variation of CSI from the second device to the first device in a responder beam refinement protocol transmit sector sweep procedure. The receiving unit is further configured to quasi-omnidirectionally receive a plurality of second BRP-TX PPDUs. The processing unit is further configured to evaluate the variation of the CSI from the second device to the first device based on the plurality of second BRP-TX PPDUs. The sending unit is further configured to send a fourth BRP frame carrying a second sector information list. The second sector information list is used to feed back one or more sending sectors whose variation of the CSI from the second device to the first device is greater than a CSI variation threshold.

Optionally, the processing unit is further configured to generate the fourth BRP frame carrying the second sector information list.

With reference to the third aspect, in a possible design, the sending unit is further configured to send a first MIMO BF setup frame, where the first MIMO BF setup frame includes first indication information, and the first indication information indicates the second device to evaluate the variation of the CSI from the first device to the second device in an initiator single user multiple input multiple output beamforming training (SMBT) procedure. The sending unit is further configured to send a plurality of first BRP TX/RX PPDUs, where the plurality of first BRP TX/RX PPDUs are used to evaluate the variation of the CSI from the first device to the second device. The receiving unit is further configured to receive a first MIMO BF feedback frame carrying a third sector information list. The third sector information list is used to feed back a sending sector in one or more sending and receiving sector pairs whose variation of the CSI from the first device to the second device is greater than the CSI variation threshold.

Optionally, the processing unit is further configured to generate the first MIMO BF setup frame. The processing unit is further configured to generate the plurality of first BRP TX/RX PPDUs.

It should be understood that the sending sector fed back in the third sector information list may be different from or the same as the sending sector fed back in the first sector information list.

With reference to the third aspect, in a possible design, the receiving unit is further configured to receive a second MIMO BF setup frame, where the second MIMO BF setup frame includes second indication information, and the second indication information indicates the first device to evaluate the variation of the CSI from the second device to the first device in a responder SMBT procedure. The receiving unit is further configured to receive a plurality of second BRP TX/RX PPDUs. The processing unit is further configured to evaluate the variation of the CSI from the second device to the first device based on the plurality of second BRP TX/RX PPDUs. The sending unit is further configured to send a second MIMO BF feedback frame carrying a fourth sector information list. The fourth sector information list is used to feed back a sending sector in one or more sending and receiving sector pairs whose variation of the CSI from the second device to the first device is greater than the CSI variation threshold.

Optionally, the processing unit is further configured to generate the second MIMO BF feedback frame carrying the fourth sector information list.

It should be understood that the sending sector fed back in the fourth sector information list may be different from or the same as the sending sector fed back in the second sector information list.

According to a fourth aspect, this application provides a second device or a chip in the second device, for example, a Wi-Fi chip. The second device includes: a receiving unit, a processing unit, and a sending unit. The receiving unit is configured to receive a first BRP frame, where the first BRP frame indicates the second device to evaluate a variation of CSI from a first device to the second device in an initiator beam refinement protocol transmit sector sweep procedure. The receiving unit is further configured to quasi-omnidirectionally receive a plurality of first BRP-TX PPDUs. The processing unit is configured to evaluate the variation of the CSI from the first device to the second device based on the plurality of first BRP-TX PPDUs. The sending unit is configured to send a second BRP frame carrying a first sector information list. The first sector information list is used to feed back one or more sending sectors whose variation of the CSI from the first device to the second device is greater than a CSI variation threshold.

Optionally, the processing unit is further configured to generate the second BRP frame carrying the first sector information list.

With reference to the fourth aspect, in a possible design, the sending unit is further configured to send a third BRP frame, where the third BRP frame indicates the first device to evaluate a variation of CSI from the second device to the first device in a responder beam refinement protocol transmit sector sweep procedure. The sending unit is further configured to send a plurality of second BRP-TX PPDUs, where the plurality of second BRP-TX PPDUs are used to evaluate the variation of the CSI from the second device to the first device. The receiving unit is further configured to receive a fourth BRP frame carrying a second sector information list. The second sector information list is used to feed back one or more sending sectors whose variation of the CSI from the second device to the first device is greater than a CSI variation threshold.

Optionally, the processing unit is further configured to generate the third BRP frame. The processing unit is further configured to generate the plurality of second BRP-TX PPDUs.

With reference to the fourth aspect, in a possible design, the receiving unit is further configured to receive a first MIMO BF setup frame, where the first MIMO BF setup frame includes first indication information, and the first indication information indicates the second device to evaluate the variation of the CSI from the first device to the second device in an initiator SMBT procedure. The receiving unit is further configured to receive a plurality of first BRP TX/RX PPDUs. The processing unit is further configured to evaluate the variation of the CSI from the first device to the second device based on the plurality of first BRP TX/RX PPDUs. The sending unit is further configured to send a first MIMO BF feedback frame carrying a third sector information list. The third sector information list is used to feed back a sending sector in one or more sending and receiving sector pairs whose variation of the CSI from the first device to the second device is greater than the CSI variation threshold.

Optionally, the processing unit is further configured to generate the first MIMO BF feedback frame carrying the third sector information list.

It should be understood that the sending sector fed back in the third sector information list may be different from or the same as the sending sector fed back in the first sector information list.

With reference to the fourth aspect, in a possible design, the sending unit is further configured to send a second MIMO BF setup frame, where the second MIMO BF setup frame includes second indication information, and the second indication information indicates the first device to evaluate the variation of the CSI from the second device to the first device in a responder SMBT procedure. The sending unit is further configured to send a plurality of second BRP TX/RX PPDUs, where the plurality of second BRP TX/RX PPDUs are used to evaluate the variation of the CSI from the second device to the first device. The receiving unit is further configured to receive a second MIMO BF feedback frame carrying a fourth sector information list. The fourth sector information list is used to feed back a sending sector in one or more sending and receiving sector pairs whose variation of the CSI from the second device to the first device is greater than the CSI variation threshold.

Optionally, the processing unit is further configured to generate the second MIMO BF setup frame. The processing unit is further configured to generate the plurality of second BRP TX/RX PPDUs.

It should be understood that the sending sector fed back in the fourth sector information list may be different from or the same as the sending sector fed back in the second sector information list.

In any design of any one of the foregoing aspects, the first BRP frame includes a CSI measurement request field and a number of self-beam-sweep cycles field. When a value of the CSI measurement request field is a first value, it indicates a peer device (herein indicating the second device or the responder) to measure the CSI in the initiator BRP TXSS procedure. When a value of the CSI measurement request field is a second value, it indicates the peer device (herein indicating the second device or the responder) not to measure the CSI in the initiator BRP TXSS procedure. The first value is 1, and the second value is 0. Alternatively, the first value is 0, and the second value is 1. The number of self-beam-sweep cycles field indicates a number of sweep cycles of a sending beam in the initiator BRP TXSS procedure. When the receive device (herein indicating the second device or the responder) receives BRP-TX PPDUs that are sent by using a same sending beam/sending sector and that are of the number of sweep cycles, the receive device (herein indicating the second device or the responder) starts to calculate a CSI difference.

Optionally, the first BRP frame further includes one or more of the following fields: a sensing BRP-transmit sector sweep (Transmit Sector Sweep, TXSS) field, a sensing transmit antenna identifier mask field, a CSI variation threshold field, and an evaluation algorithm field. When a value of the sensing BRP-TXSS field is 1, it indicates either a request to perform a sensing BRP TXSS process or to acknowledge a request to perform the sensing BRP TXSS process. The sensing transmit sector identifier field indicates a sector identifier that needs to be trained in the initiator beam refinement protocol transmit sector sweep procedure. The sensing transmit antenna identifier mask field indicates an antenna bitmap that needs to be trained in the initiator beam refinement protocol transmit sector sweep procedure. The CSI variation threshold field indicates the CSI variation threshold. The evaluation algorithm field indicates an evaluation algorithm of the CSI.

It can be learned that in this solution, some fields are added to the first BRP frame to indicate the second device to evaluate the variation of the CSI from the first device to the second device in the initiator BRP TXSS procedure. The initiator BRP TXSS procedure may be reused to obtain an optimal sending beam for communication of the initiator. Alternatively, WLAN sensing may be combined with the initiator BRP TXSS procedure, to implement two functions of communication beam training and sensing, and provide a basis for subsequent WLAN sensing application.

In any design of any one of the foregoing aspects, the first sector information list includes a plurality of groups of first sector identifiers, and one group of first sector identifiers includes one antenna weight vector (AWV) feedback identifier and one transmit antenna identifier. A sending sector determined by an AWV feedback identifier and a transmit antenna identifier in one group of first sector identifiers and a value of a BRP down counter corresponding to the AWV feedback identifier is a sending sector that is in all sending sectors of the first device and in which a CSI difference between any two CSI measurements on a same sending sector is greater than the CSI variation threshold.

Optionally, the group of first sector identifiers may further include a receive antenna identifier (RX Antenna ID), to indicate a receiving antenna. In this application, the RX antenna ID included in the first sector information list is a reserved bit or is not used.

Optionally, the first sector information list is located in a sensing measurement feedback element whose element identifier in the second BRP frame is a reserved value.

It can be learned that in this solution, a sending beam whose variation of CSI is greater than a threshold in all sending beams of the first device, that is, an optimal sending beam for sensing of the initiator, is fed back by using an AWV feedback identifier, a transmit antenna identifier, and a value of a BRP down counter corresponding to the AWV feedback identifier, and air interface overheads are low.

In any design of any one of the foregoing aspects, the third BRP frame includes a CSI measurement request field and a number of self-beam-sweep cycles field. When a value of the CSI measurement request field is a first value, it indicates a peer device (herein indicating the first device or the initiator) to measure the CSI in the responder beam refinement protocol transmit sector sweep procedure. When a value of the CSI measurement request field is a second value, it indicates the peer device (herein indicating the first device or the initiator) not to measure the CSI in the responder beam refinement protocol transmit sector sweep procedure. The first value is 1, and the second value is 0. Alternatively, the first value is 0, and the second value is 1. The number of self-beam-sweep cycles field indicates a number of sweep cycles of a sending beam in the responder beam refinement protocol transmit sector sweep procedure. When the receive device (herein indicating the first device or the initiator) receives BRP-TX PPDUs that are sent by using a same sending beam/sending sector and that are of the number of sweep cycles, the receive device (herein indicating the first device or the initiator) starts to calculate a CSI difference.

Optionally, the third BRP frame further includes one or more of the following fields: a sensing BRP-transmit sector sweep (TXSS) field, a sensing transmit antenna identifier mask field, a CSI variation threshold field, and an evaluation algorithm field. When a value of the sensing BRP-TXSS field is 1, it indicates either a request to perform a sensing BRP TXSS process or to acknowledge a request to perform the sensing BRP TXSS process. The sensing transmit sector identifier field indicates a sector identifier that needs to be trained in the responder beam refinement protocol transmit sector sweep procedure. The sensing transmit antenna identifier mask field indicates an antenna bitmap that needs to be trained in the responder beam refinement protocol transmit sector sweep procedure. The CSI variation threshold field indicates the CSI variation threshold. The evaluation algorithm field indicates an evaluation algorithm of the CSI.

It can be learned that in this solution, some fields are added to the third BRP frame to indicate the first device to evaluate the variation of the CSI from the second device to the first device in the responder BRP TXSS procedure. The responder BRP TXSS procedure may be reused to obtain an optimal sending beam for communication of the responder. Alternatively, WLAN sensing may be combined with the responder BRP TXSS procedure, to implement two functions of communication beam training and sensing, and provide a basis for subsequent WLAN sensing application.

In any design of any one of the foregoing aspects, the second sector information list includes a plurality of groups of second sector identifiers, and one group of second sector identifiers includes one AWV feedback identifier and one transmit antenna identifier. A sending sector determined by an AWV feedback identifier and a transmit antenna identifier in one group of second sector identifiers and a value of a BRP down counter corresponding to the AWV feedback identifier is a sending sector that is in all sending sectors of the second device and in which a CSI difference between any two CSI measurements on a same sending sector is greater than the CSI variation threshold.

Optionally, the group of second sector identifiers may further include a receive antenna identifier (RX Antenna ID), to indicate a receiving antenna. In this application, the RX antenna ID included in the second sector information list is a reserved bit or is not used.

Optionally, the second sector information list is located in a sensing measurement feedback element whose element identifier in the third BRP frame is a reserved value.

It can be learned that in this solution, a sending beam whose variation of CSI is greater than a threshold in all sending beams of the first device is fed back by using an AWV feedback identifier, a transmit antenna identifier, and a value of a BRP down counter corresponding to the AWV feedback identifier. This can obtain an optimal sending beam for sensing of the responder, and provide a basis for subsequent WLAN sensing application.

In any design of any one of the foregoing aspects, the first indication information is located in a reserved bit in a MIMO setup control element in the first MIMO BF setup frame. The first indication information includes a number of beam sweep cycles field, indicating a number of sweep cycles of a receiving beam in the initiator SMBT procedure. The first indication information further includes a CSI variation threshold field and an evaluation algorithm field. The CSI variation threshold field indicates the CSI variation threshold, and the evaluation algorithm field indicates an evaluation algorithm of the CSI.

It can be learned that in this solution, the first indication information is carried in the reserved bit in the MIMO setup control element in the MIMO BF setup frame. This can reuse another field in the MIMO BF setup frame without changing a frame length of an original MIMO BF setup frame, to implement communication beam training and training on a beam for sensing, so that a design is flexible, and compatibility is good.

In any design of any one of the foregoing aspects, the first MIMO BF setup frame further includes third indication information, and the third indication information indicates that the first MIMO BF setup frame includes the first indication information. The third indication information is located in a reserved bit in a setup control element in the first MIMO BF setup frame.

It can be learned that in this solution, the third indication information is carried in the MIMO BF setup frame to indicate whether the MIMO BF setup frame includes the first indication information, so that a design is more flexible.

In any design of any one of the foregoing aspects, the second indication information is located in a reserved bit in the MIMO setup control element in the second MIMO BF setup frame. The second indication information includes a number of beam sweep cycles field, indicating a number of sweep cycles of a receiving beam in the responder SMBT procedure. The second indication information further includes a CSI variation threshold field and an evaluation algorithm field. The CSI variation threshold field indicates the CSI variation threshold, and the evaluation algorithm field indicates an evaluation algorithm of the CSI.

In any design of any one of the foregoing aspects, the second MIMO BF setup frame further includes fourth indication information, and the fourth indication information indicates that the second MIMO BF setup frame includes the second indication information. The fourth indication information is located in a reserved bit in the setup control element in the second MIMO BF setup frame.

According to a fifth aspect, this application provides a MIMO beamforming-based sensing method. The method is applied to a multiple user (Multiple user, MU) MIMO beamforming training scenario. MU MIMO beamforming training also includes a SISO phase and a MIMO phase. The MIMO beamforming-based sensing method includes: A first device sends a plurality of short sector sweep (short sector sweep, Short SSW) frames in a sector sweep manner. The first device sends a first BRP frame, where the first BRP frame indicates a second device to evaluate a variation of CSI from the first device to the second device based on the plurality of short SSW frames. The first device receives a second BRP frame carrying a first sector information list. The first sector information list is used to feed back one or more sending sectors whose variation of the CSI from the first device to the second device is greater than a CSI variation threshold.

The first device is an initiator (initiator), and the second device is a responder (responder). The first device performs sector sweep for at least two cycles. In other words, the first device performs sending for at least two times by using a same sending sector (one short SSW frame is sent each time).

It can be learned that in this solution, WLAN sensing is introduced in the SISO phase of MU MIMO beamforming training. A frame format of the BRP frame in a SISO feedback procedure is modified, and whether there is a moving target in an area is determined by using a variation of a CSI value obtained when sweep is performed by using a same beam for a plurality of times. This can implement sensing and training on a sending/receiving beam for sensing in addition to MU MIMO beamforming training, with no need to specially design a related process for sensing and training on the sending/receiving beam for sensing, so that overheads are low, and compatibility is good.

With reference to the fifth aspect, in a possible design, after the first device receives the second BRP frame carrying the first sector information list, the method further includes: The first device sends a first MIMO BF setup frame, where the first MIMO BF setup frame includes first indication information, and the first indication information indicates the second device to evaluate the variation of the CSI from the first device to the second device in a multiple user MIMO beamforming training procedure. The first device sends a plurality of first BRP TX/RX PPDUs in the sector sweep manner, where the plurality of first BRP TX/RX PPDUs are used to evaluate the variation of the CSI from the first device to the second device. The first device receives a first MIMO BF feedback frame carrying a third sector information list. The third sector information list is used to feed back a sending sector in one or more sending and receiving sector pairs whose variation of the CSI from the first device to the second device is greater than the CSI variation threshold.

The first device performs sector sweep for at least two cycles. In other words, the first device performs sending for at least two times by using a same sending sector (one first BRP TX/RX PPDU is sent each time). Because a receive device only needs to know an optimal receiving sector of the receive device and to perform receiving by using the optimal receiving sector in a subsequent application process, and does not need to notify the transmit device of the optimal receiving sector, the third sector information list only needs to feed back a sending sector in an optimal sending and receiving sector pair. It should be understood that the sending sector fed back in the third sector information list may be different from or the same as the sending sector fed back in the first sector information list.

It can be learned that this solution combines WLAN sensing and MU MIMO beamforming training. A frame format of a related frame of the MU MIMO beamforming training procedure is modified, and whether there is a moving target in an area is determined by using a variation of a CSI value obtained when sweep is performed by using a same beam for a plurality of times. This can implement sensing of the transmit device and the receive device and training on an optimal sending/receiving beam for sensing of the transmit device and the receive device in addition to original MU MIMO beamforming training, with no need to specially design a related process for sensing and training on the beam for sensing, so that overheads are low, and compatibility is good. In addition, this can provide a basis for subsequent WLAN sensing application.

According to a sixth aspect, this application provides a MIMO beamforming-based sensing method. The method is applied to an MU MIMO beamforming training scenario. MU MIMO beamforming training also includes a SISO phase and a MIMO phase. The MIMO beamforming-based sensing method includes: A second device quasi-omnidirectionally receives a plurality of short SSW frames. The second device receives a first BRP frame, where the first BRP frame indicates the second device to evaluate a variation of CSI from a first device to the second device based on the plurality of short SSW frames. The second device sends a second BRP frame carrying a first sector information list. The first sector information list is used to feed back one or more sending sectors whose variation of the CSI from the first device to the second device is greater than a CSI variation threshold.

The first device is an initiator (initiator), and the second device is a responder (responder).

With reference to the sixth aspect, in a possible design, after the second device sends the second BRP frame carrying the first sector information list, the method further includes: The second device receives a first MIMO BF setup frame, where the first MIMO BF setup frame includes first indication information, and the first indication information indicates the second device to evaluate the variation of the CSI from the first device to the second device in a multiple user MIMO beamforming training procedure. The second device receives a plurality of first BRP TX/RX PPDUs in the sector sweep manner, and evaluates the variation of the CSI from the first device to the second device based on the plurality of first BRP TX/RX PPDUs. The second device sends a first MIMO BF feedback frame carrying a third sector information list. The third sector information list is used to feed back a sending sector in one or more sending and receiving sector pairs whose variation of the CSI from the first device to the second device is greater than the CSI variation threshold.

The second device performs sector sweep for at least two cycles. In other words, the second device performs receiving for at least two times by using a same receiving sector (one first BRP TX/RX PPDU is received each time).

According to a seventh aspect, this application provides a first device or a chip in the first device, for example, a Wi-Fi chip. The first device includes: a sending unit and a receiving unit. The sending unit is configured to send a plurality of short sector sweep (sector sweep, SSW) frames. The sending unit is further configured to send a first BRP frame, where the first BRP frame indicates a second device to evaluate a variation of CSI from the first device to the second device based on the plurality of short SSW frames. The receiving unit is configured to receive a second BRP frame carrying a first sector information list. The first sector information list is used to feed back one or more sending sectors whose variation of the CSI from the first device to the second device is greater than a CSI variation threshold.

Optionally, the first device further includes a processing unit, configured to generate the plurality of short SSW frames, and further configured to generate the first BRP frame.

With reference to the seventh aspect, in a possible design, the sending unit is further configured to send a first MIMO BF setup frame, where the first MIMO BF setup frame includes first indication information, and the first indication information indicates the second device to evaluate the variation of the CSI from the first device to the second device in a multiple user MIMO beamforming training procedure. The sending unit is further configured to send a plurality of first BRP TX/RX PPDUs, where the plurality of first BRP TX/RX PPDUs are used to evaluate the variation of the CSI from the first device to the second device. The receiving unit is further configured to receive a first MIMO BF feedback frame carrying a third sector information list. The third sector information list is used to feed back a sending sector in one or more sending and receiving sector pairs whose variation of the CSI from the first device to the second device is greater than the CSI variation threshold.

Optionally, the processing unit is further configured to generate the first MIMO BF setup frame. The processing unit is further configured to generate the plurality of first BRP TX/RX PPDUs.

According to an eighth aspect, this application provides a second device or a chip in the second device, for example, a Wi-Fi chip. The second device includes: a receiving unit and a sending unit. The receiving unit is configured to quasi-omnidirectionally receive a plurality of short SSW frames. The receiving unit is further configured to receive a first BRP frame, where the first BRP frame indicates the second device to evaluate a variation of CSI from a first device to the second device based on the plurality of short SSW frames. The sending unit is configured to send a second BRP frame carrying a first sector information list. The first sector information list is used to feed back one or more sending sectors whose variation of the CSI from the first device to the second device is greater than a CSI variation threshold.

Optionally, the second device further includes a processing unit, configured to generate the second BRP frame carrying the first sector information list.

With reference to the eighth aspect, in a possible design, the receiving unit is further configured to receive a first MIMO BF setup frame, where the first MIMO BF setup frame includes first indication information, and the first indication information indicates the second device to evaluate the variation of the CSI from the first device to the second device in a multiple user MIMO beamforming training procedure. The receiving unit is further configured to receive a plurality of first BRP TX/RX PPDUs. The processing unit is further configured to evaluate the variation of the CSI from the first device to the second device based on the plurality of first BRP TX/RX PPDUs. The sending unit is further configured to send a first MIMO BF feedback frame carrying a third sector information list. The third sector information list is used to feed back a sending sector in one or more sending and receiving sector pairs whose variation of the CSI from the first device to the second device is greater than the CSI variation threshold.

Optionally, the processing unit is further configured to generate the first MIMO BF feedback frame carrying the third sector information list.

In any design of any one of the foregoing aspects, the first BRP frame includes a directional multi-gigabit (directional multi-gigabit, DMG) beam refinement element. The DMG beam refinement element includes a CSI variation calculation field and a target sector identifier order requested field. The CSI variation calculation field indicates whether the second device calculates a CSI difference. When the CSI variation calculation field is set to a first value, it indicates the second device to calculate the CSI difference. When the CSI variation calculation field is set to a second value, it indicates the second device not to calculate the CSI difference. In this application, the CSI variation calculation field in the first BRP frame is set to the first value. The target sector identifier order requested field is set to the first value, to indicate the second device to feed back an evaluation result or a target sector identifier order subfield. The first value may be 1, and the second value is 0. Alternatively, the first value is 0, and the second value is 1.

Optionally, the DMG beam refinement element further includes one or more of the following fields: a CSI variation threshold field and an evaluation algorithm field. The CSI variation threshold field indicates the CSI variation threshold, that is, a variation of the CSI indicating that there is a moving target. The evaluation algorithm field indicates an evaluation algorithm of the CSI. The evaluation algorithm is used to evaluate (or calculate) a CSI value.

It can be learned that in this solution, a sensing operation is introduced based on an MU MIMO architecture by using the DMG beam refinement element in the BRP frame, to obtain an optimal downlink sending beam for sensing through training, and provide a basis for subsequent WLAN sensing application.

In any design of any one of the foregoing aspects, the first sector information list includes a plurality of groups of first sector identifiers, and one group of first sector identifiers includes one down counter value and one transmit antenna identifier. A sending sector determined by a down counter value and a transmit antenna identifier in one group of first sector identifiers is a sending sector that is in all sending sectors of the first device and in which a CSI difference between any two CSI measurements on a same sending sector is greater than the CSI variation threshold.

Optionally, the second BRP frame includes a sensing measurement feedback element, and the first sector information list is located in the sensing measurement feedback element.

In any design of any one of the foregoing aspects, the second BRP frame further includes a DMG beam refinement element, and a CSI variation calculation field and a target sector identifier order requested field in the DMG beam refinement element are set to a second value, for example, 0, indicating reserved or another. The DMG beam refinement element further includes a target sector identifier order present field. The target sector identifier order present field is set to the first value, to indicate that the sensing measurement feedback element included in the second BRP frame includes a target sector identifier order subfield.

In any design of any one of the foregoing aspects, the first indication information is located in a reserved bit in a MIMO setup control element in the first MIMO BF setup frame. The first indication information includes a number of beam sweep cycles field, indicating a number of sweep cycles of a receiving beam in an initiator SMBT procedure. The first indication information further includes a CSI variation threshold field and an evaluation algorithm field. The CSI variation threshold field indicates the CSI variation threshold, and the evaluation algorithm field indicates an evaluation algorithm of the CSI.

In any design of any one of the foregoing aspects, the first MIMO BF setup frame further includes third indication information, and the third indication information indicates that the first MIMO BF setup frame includes the first indication information. The third indication information is located in a reserved bit in a setup control element in the first MIMO BF setup frame.

According to a ninth aspect, this application provides a first device, including a transceiver and optionally a processor.

In a design, the transceiver is configured to send a first beam refinement protocol (beam refinement protocol, BRP) frame, where the first BRP frame indicates a second device to evaluate a variation of channel state information (channel state information, CSI) from the first device to the second device in an initiator beam refinement protocol transmit sector sweep procedure. The transceiver is further configured to send a plurality of first BRP-TX PPDUs, where the plurality of first BRP-TX PPDUs are used to evaluate the variation of the CSI from the first device to the second device. The transceiver is further configured to receive a second BRP frame carrying a first sector information list. The first sector information list is used to feed back one or more sending sectors whose variation of the CSI from the first device to the second device is greater than a CSI variation threshold.

Optionally, the processor is configured to generate the first BRP frame. The processor is further configured to generate the plurality of first BRP-TX PPDUs.

In another design, the transceiver is configured to send a plurality of short sector sweep (sector sweep, SSW) frames. The transceiver is further configured to send a first BRP frame, where the first BRP frame indicates a second device to evaluate a variation of CSI from the first device to the second device based on the plurality of short SSW frames. The transceiver is further configured to receive a second BRP frame carrying a first sector information list. The first sector information list is used to feed back one or more sending sectors whose variation of the CSI from the first device to the second device is greater than a CSI variation threshold.

Optionally, the processor is configured to generate the plurality of short SSW frames. The processor is further configured to generate the first BRP frame.

According to a tenth aspect, this application provides a second device, including a transceiver and optionally a processor.

In a design, the transceiver is configured to receive a first BRP frame, where the first BRP frame indicates the second device to evaluate a variation of CSI from a first device to the second device in an initiator beam refinement protocol transmit sector sweep procedure. The transceiver is further configured to quasi-omnidirectionally receive a plurality of first BRP-TX PPDUs. The processor is configured to evaluate the variation of the CSI from the first device to the second device based on the plurality of first BRP-TX PPDUs. The transceiver is further configured to send a second BRP frame carrying a first sector information list. The first sector information list is used to feed back one or more sending sectors whose variation of the CSI from the first device to the second device is greater than a CSI variation threshold.

Optionally, the processor is further configured to generate the second BRP frame carrying the first sector information list.

In another design, the transceiver is configured to quasi-omnidirectionally receive a plurality of short SSW frames. The transceiver is further configured to receive a first BRP frame, where the first BRP frame indicates the second device to evaluate a variation of CSI from a first device to the second device based on the plurality of short SSW frames. The transceiver is further configured to send a second BRP frame carrying a first sector information list. The first sector information list is used to feed back one or more sending sectors whose variation of the CSI from the first device to the second device is greater than a CSI variation threshold.

Optionally, the processor is configured to generate the second BRP frame carrying the first sector information list.

According to an eleventh aspect, this application provides a first device. The first device may exist in a product form of a chip. A structure of the first device includes an input/output interface and a processing circuit.

In a design, the input/output interface is configured to send a first beam refinement protocol (BRP) frame, where the first BRP frame indicates a second device to evaluate a variation of channel state information (CSI) from the first device to the second device in an initiator beam refinement protocol transmit sector sweep procedure. The input/output interface is further configured to send a plurality of first BRP-TX PPDUs, where the plurality of first BRP-TX PPDUs are used to evaluate the variation of the CSI from the first device to the second device. The input/output interface is further configured to receive a second BRP frame carrying a first sector information list. The first sector information list is used to feed back one or more sending sectors whose variation of the CSI from the first device to the second device is greater than a CSI variation threshold.

Optionally, the processing circuit is configured to generate the first BRP frame. The processing circuit is further configured to generate the plurality of first BRP-TX PPDUs.

In another design, the input/output interface is configured to send a plurality of short sector sweep (SSW) frames. The input/output interface is further configured to send a first BRP frame, where the first BRP frame indicates a second device to evaluate a variation of CSI from the first device to the second device based on the plurality of short SSW frames. The input/output interface is further configured to receive a second BRP frame carrying a first sector information list. The first sector information list is used to feed back one or more sending sectors whose variation of the CSI from the first device to the second device is greater than a CSI variation threshold.

Optionally, the processing circuit is configured to generate the plurality of short SSW frames. The processing circuit is further configured to generate the first BRP frame.

According to a twelfth aspect, this application provides a second device. The second device may exist in a product form of a chip. A structure of the second device includes an input/output interface and a processing circuit.

In a design, the input/output interface is configured to receive a first BRP frame, where the first BRP frame indicates the second device to evaluate a variation of CSI from a first device to the second device in an initiator beam refinement protocol transmit sector sweep procedure. The input/output interface is further configured to quasi-omnidirectionally receive a plurality of first BRP-TX PPDUs.

The processing circuit is configured to evaluate the variation of the CSI from the first device to the second device based on the plurality of first BRP-TX PPDUs. The input/output interface is further configured to send a second BRP frame carrying a first sector information list. The first sector information list is used to feed back one or more sending sectors whose variation of the CSI from the first device to the second device is greater than a CSI variation threshold.

Optionally, the processing circuit is further configured to generate the second BRP frame carrying the first sector information list.

In another design, the input/output interface is configured to quasi-omnidirectionally receive a plurality of short SSW frames. The input/output interface is further configured to receive a first BRP frame, where the first BRP frame indicates the second device to evaluate a variation of CSI from a first device to the second device based on the plurality of short SSW frames. The input/output interface is further configured to send a second BRP frame carrying a first sector information list. The first sector information list is used to feed back one or more sending sectors whose variation of the CSI from the first device to the second device is greater than a CSI variation threshold.

Optionally, the processing circuit is configured to generate the second BRP frame carrying the first sector information list.

According to a thirteenth aspect, this application provides a computer-readable storage medium. The computer-readable storage medium stores program instructions. When the program instructions are run on a computer, the computer is enabled to perform the method according to the first aspect, the second aspect, the fifth aspect, or the sixth aspect.

According to a fourteenth aspect, this application provides a computer program product including program instructions. When the computer program product runs on a computer, the computer is enabled to perform the method according to the first aspect, the second aspect, the fifth aspect, or the sixth aspect.

Embodiments of this application are implemented to combine a WLAN sensing technology and a MIMO beamforming technology, and implements sensing and training on a beam for sensing in addition to original MIMO beamforming training, with no need to specially design a related process for sensing and training on the beam for sensing, so that overheads are low, and compatibility is good.

BRIEF DESCRIPTION OF THE DRAWINGS

To describe technical solutions in embodiments of this application more clearly, the following briefly describes the accompanying drawings used for describing embodiments.

FIG. 4 is a flowchart of a nonreciprocal MIMO phase in SU MIMO BF;

FIG. 8A and FIG. 8B are a schematic diagram of a frame format of a BRP sensing request element according to an embodiment of this application;

FIG. 11A and FIG. 11B are a schematic diagram of a frame format of a MIMO setup control element according to an embodiment of this application;

FIG. 13A and FIG. 13B are a schematic diagram of a frame format of a DMG beam refinement element according to an embodiment of this application;

DETAILED DESCRIPTION OF ILLUSTRATIVE EMBODIMENTS

Figure 1A:
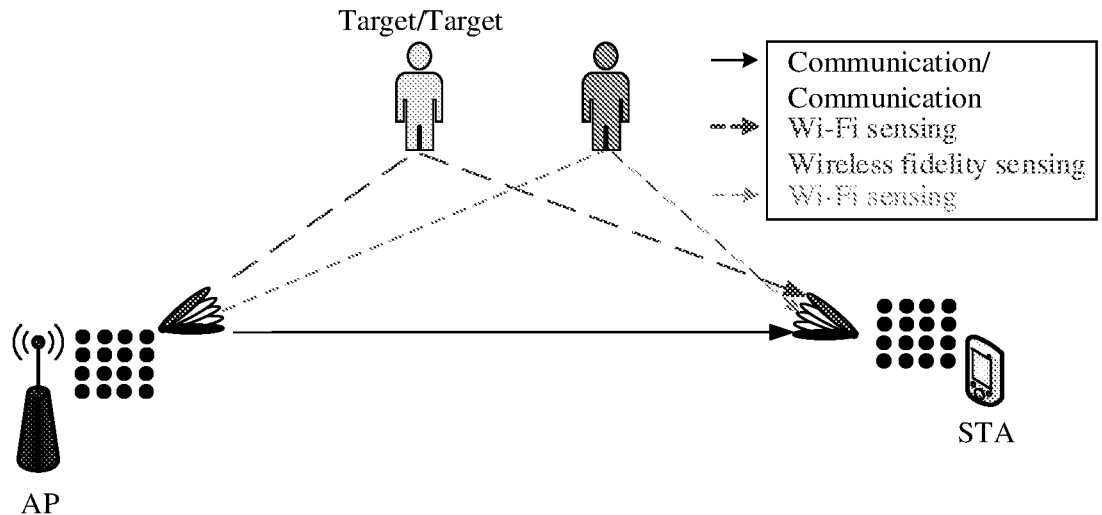
FIG. 1a is a schematic diagram of a system architecture according to an embodiment of this application.

The following clearly and describes technical solutions in embodiments of this application with reference to the accompanying drawings in embodiments of this application.

In descriptions of this application, unless otherwise specified, "/" means "or". For example, A/B may indicate A or B. A term "and/or" in this specification describes only an association relationship between associated objects and indicates that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

In this application, the word such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word "example", "for example", or the like is intended to present a relative concept in a specific manner.

To facilitate understanding of the technical solutions in embodiments of this application, the following describes an application scenario of a MIMO beamforming-based sensing method provided in embodiments of this application. It may be understood that scenarios described in embodiments of this application are intended to describe the technical solutions in embodiments of this application more clearly, and do not constitute a limitation on the technical solutions provided in embodiments of this application.

Embodiments of this application provides a MIMO beamforming-based sensing method. An existing single user (SU)/multiple user (MU) MIMO beamforming training mechanism in the 802.11ay standard is combined with WLAN Sensing. A related frame structure in a high-frequency beamforming process is modified based on a MIMO architecture, and whether there is a moving target in a beam sweep area is determined by using a change of a CSI value obtained when a same location is swept by using a same beam for a plurality of times. This can implement sensing and training on a beam for sensing in addition to original MIMO beamforming training, with no need to specially design a related process for sensing and training on the beam for sensing, so that overheads are low, and compatibility is good. The method may be applied to a wireless communication system, and the wireless communication system may be a wireless local area network or a cellular network. The method may be implemented by a communication device, or a chip or a processor in the communication device in the wireless communication system. The communication device may be an access point (access point, AP) device or a station (STA) device. The access point device and the station device each may be a single-link device or a multi-link device.

FIG. 1a is a schematic diagram of a system architecture according to an embodiment of this application. As shown in FIG. 1a, the system architecture includes at least two WLAN devices (for example, an AP and a STA in FIG. 1a). One WLAN device (for example, the AP) may perform SU MIMO beamforming training with another WLAN device (for example, the STA). Optionally, there may be a plurality of targets shown in FIG. 1a, and all the targets are moving objects.

Figure 1B:
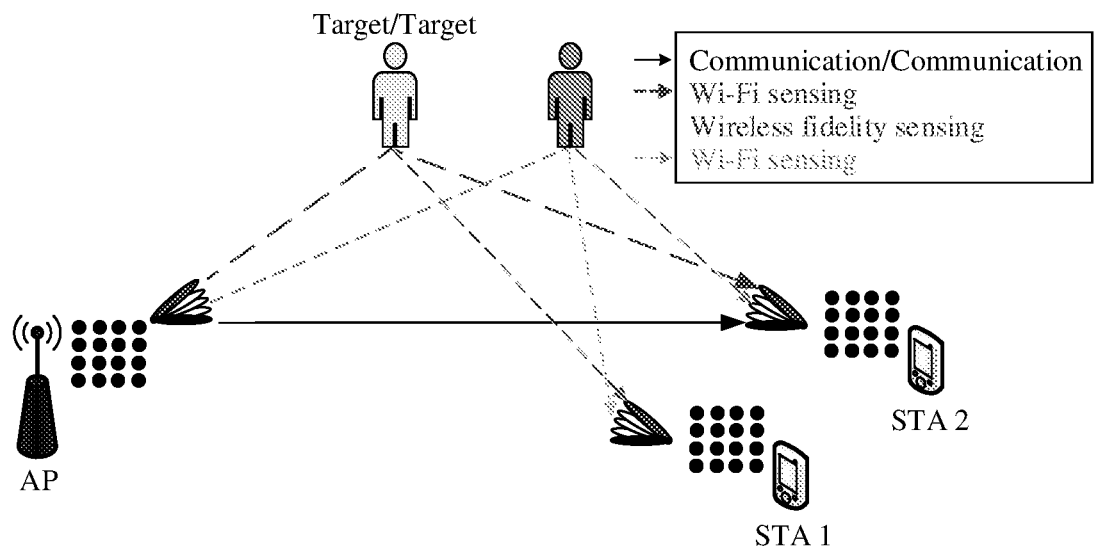
FIG. 1b is a schematic diagram of another system architecture according to an embodiment of this application.

FIG. 1b is a schematic diagram of another system architecture according to an embodiment of this application. As shown in FIG. 1b, the system architecture includes at least three WLAN devices (for example, an AP, a STA 1, and a STA 2 in FIG. 1b). One WLAN device (for example, the AP) may perform MU MIMO beamforming training with two other WLAN devices (for example, the STA 1 and the STA 2). Optionally, there may be a plurality of targets shown in FIG. 1b, and all the targets are moving objects.

The WLAN devices shown in FIG. 1a and FIG. 1b may support 802.11 standards. The 802.11 standards may include 802.11ay, and may further include standards such as 802.11be, 802.11ax, and 802.11ac. Certainly, such a communication protocol may further include a next-generation 802.11 standard and the like with continuous evolution and development of communication technologies. In this application, an apparatus for implementing the method in this application may be an AP or a STA in a WLAN, or a chip or a processing system disposed in the AP or the STA.

The access point (AP) is an apparatus having a wireless communication function, supports communication by using a WLAN protocol, has a function of communicating with another device (for example, a station or another access point) in a WLAN network, and certainly, may further have a function of communicating with another device. In a WLAN system, the access point may be referred to as an access point station (AP STA). The apparatus having a wireless communication function may be an entire device, or may be a chip or a processing system installed in an entire device. A device in which the chip or the processing system is installed may implement the method and the function in embodiments of this application under control of the chip or the processing system. The AP in embodiments of this application is an apparatus that provides a service for a STA, and may support the 802.11 series protocols. For example, the AP may be a communication entity, for example, a communication server, a router, a switch, or a bridge. The AP may include a macro base station, a micro base station, a relay station, and the like in various forms. Certainly, the AP may alternatively be a chip or a processing system in these devices in various forms, to implement the method and the function in embodiments of this application.

The station (STA) is an apparatus having a wireless communication function, supports communication by using a WLAN protocol, and has a capability of communicating with another station or an access point in the WLAN network. In the WLAN system, the station may be referred to as a non-access point station (non-access point station, non-AP STA). For example, the STA is any user communication device that allows a user to communicate with an AP and further communicate with a WLAN. The apparatus having a wireless communication function may be an entire device, or may be a chip or a processing system installed in the entire device. A device in which the chip or the processing system is installed may implement the method and the function in embodiments of this application under control of the chip or the processing system. For example, the STA may be user equipment that can connect to the internet, for example, a tablet computer, a desktop computer, a laptop computer, a notebook computer, an ultra-mobile personal computer (UMPC), a handheld computer, a netbook, a personal digital assistant (PDA), or a mobile phone. Alternatively, the STA may be an internet of things node in the internet of things, a vehicle-mounted communication apparatus in the internet of vehicles, an entertainment device, a game device or system, a global positioning system device, or the like. The STA may alternatively be a chip and a processing system in the foregoing terminals.

Figure 2:
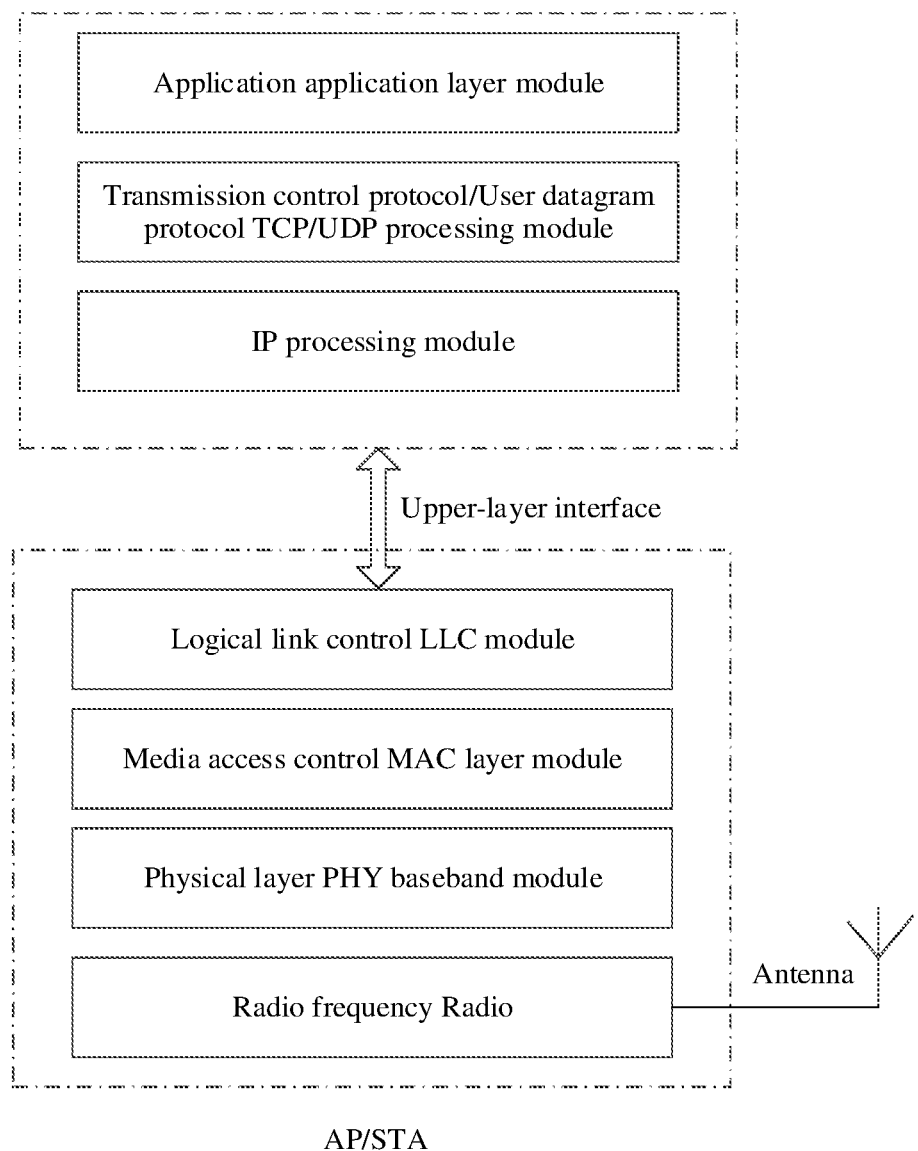
FIG. 2 is a schematic diagram of a structure of an AP or a STA according to an embodiment of this application.

Specifically, this application focuses on a method for implementing WLAN sensing by using an SU/MU MIMO beamforming training process in the 802.11ay standard. The method may be implemented by a controller of a wireless communication network device. In other words, the controller sends or receives signaling and an interaction process designed in this application, to implement a WLAN sensing function in this application. This application focuses on an interaction process and negotiation between two WLAN sensing devices, that is, an AP and a STA, and does not improve internal structures of the AP and the STA. Structures of the AP and the STA are briefly described below. FIG. 2 is a schematic diagram of a structure of an AP or a STA according to an embodiment of this application. As shown in FIG. 2, the AP or the STA may include an application layer module, a transmission control protocol (TCP)/user datagram protocol (UDP) processing module, an internet protocol (IP) processing module, a logical link control (LLC) module, a media access control (MAC) layer module, a physical (PHY) layer baseband module, radio frequency radio, an antenna, and the like. The AP or the STA shown in FIG. 2 may be of a single-antenna structure, or may be of a multi-antenna structure. This is not limited in this embodiment of this application.

A WLAN system can provide high-speed and low-latency transmission. With continuous evolution of WLAN application scenarios, the WLAN system is to be applied to more scenarios or industries, for example, the internet of things industry, the internet of vehicles industry, the banking industry, enterprise offices, exhibition halls of stadiums, concert halls, hotel rooms, dormitories, wards, classrooms, supermarkets, squares, streets, production workshops, and warehousing. Certainly, a device (such as an access point or a station) that supports WLAN communication may be a sensor node (for example, a smart water meter, a smart electricity meter, or a smart air detection node) in a smart city, a smart device (for example, a smart camera, a projector, a display, a television, a stereo, a refrigerator, or a washing machine) in a smart home, a node in the internet of things, an entertainment terminal (for example, augmented reality (AR), virtual reality (VR), or another wearable device), a smart device in smart office (for example, a printer, a projector, a loudspeaker, or a stereo), an internet of vehicle device in the internet of vehicle, an infrastructure (for example, a vending machine, a self-service navigation station of a supermarket, a self-service cash register device, or a self-service ordering machine) in daily life scenarios, a device in a large sports and music venue, and the like. Specific forms of the STA and the AP are not limited in embodiments of this application, and are merely examples for description herein.

The foregoing briefly describes the system architecture provided in this application. To better understand the technical solutions provided in this application, the following briefly describes a beamforming (BF) technology in the 802.11ay standard.

1. Single User Multiple Input Multiple Output Beamforming (SU MIMO BF)

The beamforming technology in the 802.11ay standard supports an SU MIMO architecture. SU MIMO can implement single user MIMO communication, that is, MIMO communication between an initiator and a responder. The initiator herein may be an access point or a station, and the responder may be an access point or a station. SU MIMO BF includes two consecutive phases: a single input single output (SISO) phase and a multiple input multiple output (MIMO) phase.

1-1. SISO Phase in SU MIMO BF

Figure 3:
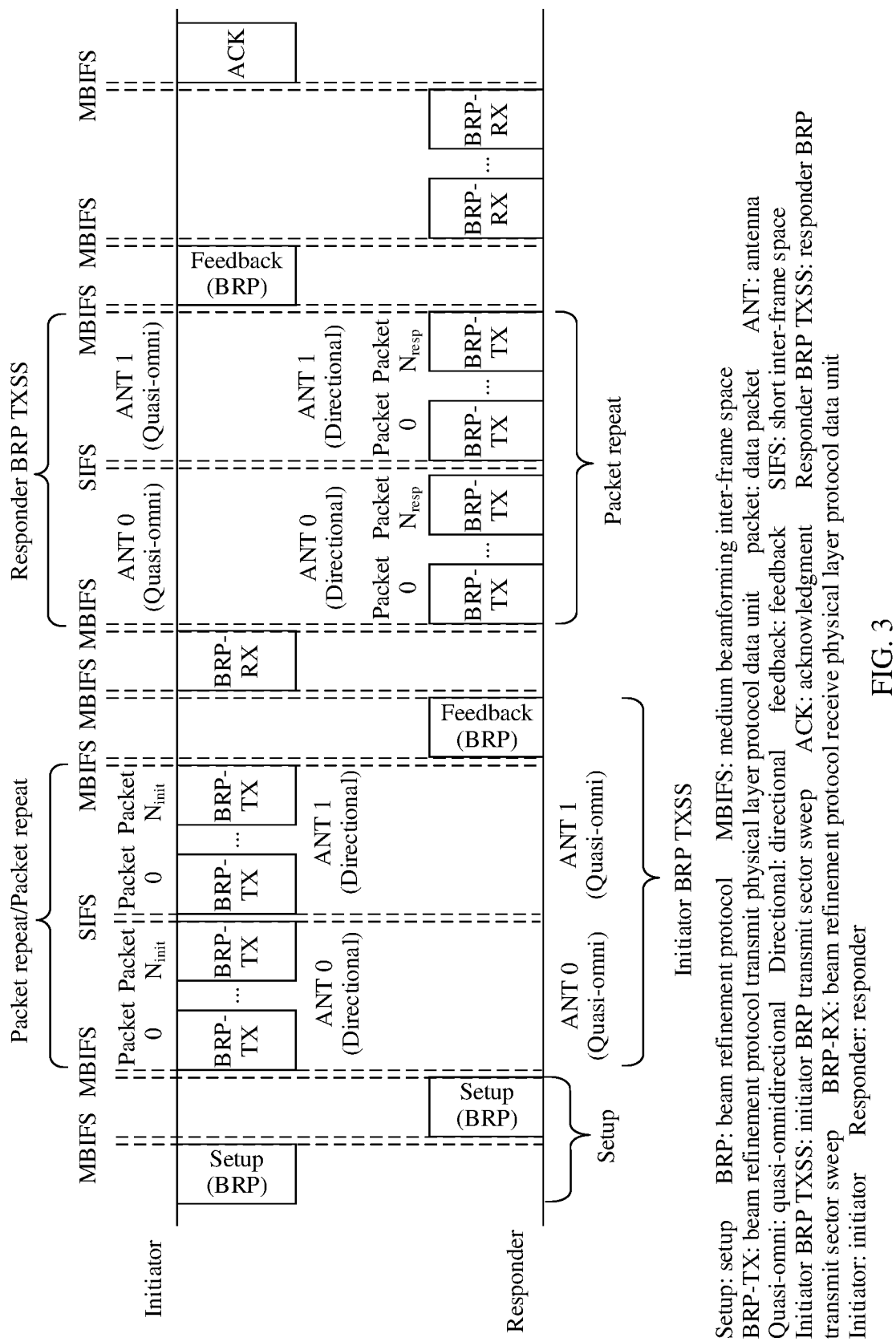
FIG. 3 is a flowchart of BRP TXSS in the 802.11ay standard.

The SISO phase in SU MIMO BF is also referred to as a beam refinement protocol (BRP) transmit sector sweep (TXSS) process. FIG. 3 is a flowchart of BRP TXSS in the 802.11ay standard. As shown in FIG. 3, a SISO phase in SU MIMO BF includes at most six procedures: a setup procedure, an initiator beam refinement protocol (BRP) transmit sector sweep (TXSS) procedure, a responder receive training procedure, a responder BRP TXSS procedure, an initiator receive training procedure, and an acknowledgment (ACK) procedure. The SISO phase in SU MIMO BF is also referred to as a BRP TXSS process.

Setup procedure: An initiator sends a BRP frame to request the BRP TXSS procedure. Then, a responder replies with the BRP frame to acknowledge performance of the BRP TXSS procedure.

Initiator BRP TXSS procedure: The initiator continuously sends $R_{resp}+1$ periods (FIG. 3 shows only two periods as an example), and sends $N_{init}+1$ enhanced directional multi-gigabit (EDMG) BRP transmit (TX) physical layer protocol data units (Physical Layer (PHY) Protocol Data Units, PPDUs) in each period, that is, sends $N_{init}+1$ repeated EDMG BRP-TX PPDUs in each period. Values of $R_{resp}$ and $N_{init}$ are negotiated in the setup procedure. When the responder receives, in an $N^{th}$ ($1 \leq N \leq R_{resp}+1$) period, a training (TRN) field of $N_{init}+1$ EDMG BRP-TX PPDUs in the same period, a same directional multi-gigabit (DMG) antenna or DMG antenna set is used. In other words, for all EDMG BRP-TX PPDUs in a period, the responder performs quasi-omnidirectional reception by using a same antenna or a same antenna set. Feedback of the responder includes one BRP frame. The BRP frame includes an EDMG channel measurement feedback element (EDMG Channel Measurement Feedback element), and feeds back a measurement result performed during reception of the EDMG BRP-TX PPDUs. An EDMG sector identifier order (EDMG Sector ID Order) field in the EDMG channel measurement feedback element includes an antenna weight vector (Antenna Weight Vector, AWV) feedback identifier subfield, a transmit antenna (TX antenna) identifier subfield, a receive antenna (RX antenna) identifier subfield, a BRP down counter (BRP CDOWN) subfield, a signal-to-noise ratio (signal-noise ratio, SNR) subfield, and the like. The AWV feedback identifier subfield and the BRP CDOWN subfield jointly indicate a sector. The TX antenna identifier subfield and the RX antenna identifier subfield respectively indicate a sending antenna identifier and a receiving antenna identifier of the sector that is jointly indicated by the AWV feedback identifier subfield and the BRP CDOWN subfield. The SNR subfield indicates an SNR value of the sector jointly indicated by the AWV feedback identifier subfield and the BRP CDOWN subfield. It should be understood that the initiator BRP TXSS procedure is used to train an optimal sending sector (the sector in this application may also be referred to as a beam) of the initiator and a receiving antenna of the responder corresponding to the optimal sending sector.

Responder receive training procedure: If the procedure exists, after an initiator BRP TXSS procedure, the initiator immediately sends an EDMG BRP receive (Receive, RX) PPDU, and the responder receives the EDMG BRP RX PPDU by using a receiving antenna configuration determined in the preceding initiator BRP TXSS procedure. It should be understood that this procedure is used to train an optimal receiving sector (or beam) of the responder.

Responder BRP TXSS procedure: If this procedure exists, the procedure is similar to the initiator BRP TXSS procedure. The responder continuously sends $R_{init}+1$ periods (FIG. 3 shows only two periods as an example), and sends $N_{resp}+1$ EDMG BRP-TX PPDUs in each period, that is, sends $N_{resp}+1$ repeated EDMG BRP-TX PPDUs in each period. Values of $R_{init}$ and $N_{resp}$ are negotiated in the setup procedure. When the initiator receives, in an $N^{th}$ ($1 \leq N \leq R_{resp}+1$) period, a TRN field of $N_{resp}+1$ EDMG BRP-TX PPDUs in the same period, a same DMG antenna or DMG antenna set is used. In other words, for all EDMG BRP-TX PPDUs in a period, the initiator performs quasi-omnidirectional reception by using a same antenna or a same antenna set. Feedback of the initiator includes one BRP frame. The BRP frame includes an EDMG channel measurement feedback element, and feeds back a measurement result performed during reception of the EDMG BRP-TX PPDUs. An EDMG sector identifier order field in the EDMG channel measurement feedback element includes an AWV feedback identifier subfield, a TX antenna identifier subfield, an RX antenna identifier subfield, a BRP CDOWN subfield, an SNR subfield, and the like. The AWV feedback identifier subfield and the BRP CDOWN subfield jointly indicate a sector. The TX antenna identifier subfield and the RX antenna identifier subfield respectively indicate a sending antenna identifier and a receiving antenna identifier of the sector that is jointly indicated by the AWV feedback identifier subfield and the BRP CDOWN subfield. The SNR subfield indicates an SNR value of the sector jointly indicated by the AWV feedback identifier subfield and the BRP CDOWN subfield. It should be understood that the responder BRP TXSS procedure is used to train an optimal sending sector (or beam) of the responder and a receiving antenna of the initiator corresponding to the optimal sending sector.

Initiator receive training procedure: If the procedure exists, the procedure is similar to the responder receive training procedure. After the responder BRP TXSS procedure, the responder immediately sends one or more EDMG BRP-RX PPDUs, and the initiator receives the EDMG BRP-RX PPDUs by using a receiving antenna configuration determined in the preceding responder BRP TXSS procedure. It should be understood that this procedure is used to train an optimal receiving sector (or beam) of the initiator. In initiator receive training, a number of transmitted EDMG BRP-RX PPDUs depends on reciprocity between the initiator and the responder.

Acknowledgment procedure: An entire BRP TXSS process ends by sending a BRP frame with an ACK.

1-2. MIMO Phase in SU MIMO BF

FIG. 4 is a schematic flowchart of a nonreciprocal MIMO phase in SU MIMO BF. As shown in FIG. 4, the nonreciprocal MIMO phase in SU MIMO BF includes at most four procedures: an SU MIMO BF setup procedure, an initiator single user multiple input multiple output beamforming training (Single user Multiple input Multiple output Beamforming Training, SMBT) procedure, a responder SMBT procedure, and an SU MIMO BF feedback (feedback) procedure.

SU MIMO BF setup procedure: This procedure is mandatory. A MIMO setup control element (MIMO Setup Control element) in a MIMO BF setup frame indicates a subsequent process. Table 1 shows sizes and meanings of fields in the MIMO setup control element. An L-TX-RX subfield and a requested EDMG training unit M (Requested EDMG TRN-Unit M) subfield in the MIMO setup control element in the MIMO BF setup frame jointly indicate a

TABLE 1

MIMO setup control element

| Field | Size (bits) | Meaning |
|---|---|---|
| Element ID | 8 | |
| Length | 8 | |
| Element ID extension | 8 | |
| SU/MU | 1 | A value 0 of this field indicates SU MIMO BF, and a value 1 indicates MU MIMO BF. |
| Nonreciprocal/Reciprocal MIMO phase | 1 | A value 0 of this field indicates the nonreciprocal MIMO phase, and a value 1 indicates the reciprocal MIMO phase. |
| EDMG group ID | 8 | Indicates an EDMG group ID in a target multiple user group (target MU group). When a value of the SU/MU field is 0, this field is a reserved field. |
| Group user mask | 32 | The group user mask field is a bitmap indicating whether an EDMG STA in a target multiple user group is requested to participate in subsequent MU MIMO BF training. A first bit (that is, a least significant bit) of the group user mask field corresponds to a first EDMG STA in the MU group, a second bit corresponds to a second EDMG STA in the MU group, and so on. When a bit is set to 1, it indicates that a corresponding EDMG STA is requested to participate in subsequent MU MIMO BF training. Otherwise, the bit is set to 0. |
| L-TX-RX | 8 | Indicates a number of consecutive training units (TRN-units) that use a same AWV in last M TRN subdomains of each TRN-unit. |

TABLE 1-continued

MIMO setup control element

| Field | Size (bits) | Meaning |
|---|---|---|
| Requested EDMG TRN-unit M | 4 | A value of this field is increased by 1 to indicate a number of TRN subfields that can be used for sending training in a requested TRN-unit. |
| Initiator | 1 | A value 1 of this field indicates that a sender is the initiator. Otherwise, a value is 0. When the SU/MU field is set to 1, this field is 1. |
| MIMO FBCK-REQ | 10 | Requested channel measurement feedback content. |
| Reserved | 7 | |

Initiator SMBT procedure: The initiator sends an EDMG BRP-RX/TX PPDU to the responder. Each time interval between EDMG BRP-RX/TX PPDUs should be short inter-frame space (Short Inter-frame Space, SIFS). It should be understood that the initiator SMBT procedure is used for pairing of a downlink optimal sending/receiving sector/optimal sending/receiving beam.

Responder SMBT procedure: The responder sends an EDMG BRP-RX/TX PPDU to the initiator. Each time interval between EDMG BRP-RX/TX PPDUs should be SIFS. It should be understood that the responder SMBT procedure is used for pairing of an uplink optimal sending/receiving sector/optimal sending/receiving beam.

SU MIMO BF feedback procedure: A MIMO feedback control element (MIMO Feedback Control element) in a MIMO BF feedback frame indicates feedback content. It should be understood that this procedure is used to feed back a result of pairing of the downlink optimal sending/receiving sector/optimal sending/receiving beam in the initiator SMBT procedure and a result of pairing of the uplink optimal sending/receiving sector/optimal sending/receiving beam in the responder SMBT procedure. Table 2 shows a frame format of a MIMO BF feedback frame. Table 3 shows meanings and sizes of fields in a MIMO feedback control element in a MIMO BF feedback frame.

TABLE 2

MIMO feedback frame action field format (MIMO Feedback frame Action field format)

| Order | Information |
|---|---|
| 1 | Category |
| 2 | Unprotected DMG action |
| 3 | Dialog token |
| 4 | MIMO feedback control element |
| 5 | Zero or more channel measurement feedback elements |
| 6 | Zero or more EDMG channel measurement feedback elements |
| 7 | Zero or more digital BF feedback elements |

TABLE 3

MIMO feedback control element

| Field | Size (bits) | Meaning |
|---|---|---|
| Element ID | 8 | |
| Length | 8 | |
| Element ID extension | 8 | |

TABLE 3-continued

MIMO feedback control element

| Field | Size (bits) | Meaning |
|---|---|---|
| SU/MU | 1 | A value 0 of this field indicates SU MIMO BF, and a value 1 indicates MU MIMO BF. |
| Link type | 1 | A value 0 of this field indicates an initiator link. Otherwise, a value of this field is 1. When the SU/MU field is set to 1, this field is 0. |
| Comeback delay | 3 | This field indicates that a STA may not be ready to perform feedback within a beam refinement protocol inter-frame space (beam refinement protocol inter-frame space, BRPIFS) time. A value in this field indicates a time when a device is ready for feedback. |
| MIMO FBCK-TYPE | 18 | Indicates a type of MIMO feedback. |
| Digital FBCK control | 30 | Defines a requirement for a digital feedback type. |
| Reserved | 3 | |

2. Multiple User Multiple Input Multiple Output Beamforming (MU MIMO BF)

A beamforming technology in the 802.11ay standard supports a downlink (downlink, DL) MU MIMO architecture. MU MIMO can implement multiple user MIMO communication, that is, MIMO communication between an initiator and one or more responders. The initiator herein may be an access point or a station, and the responder may be an access point or a station. MU MIMO BF also includes two consecutive phases: a SISO phase and a MIMO phase.

2-1. SISO Phase in MU MIMO BF

Figure 5:
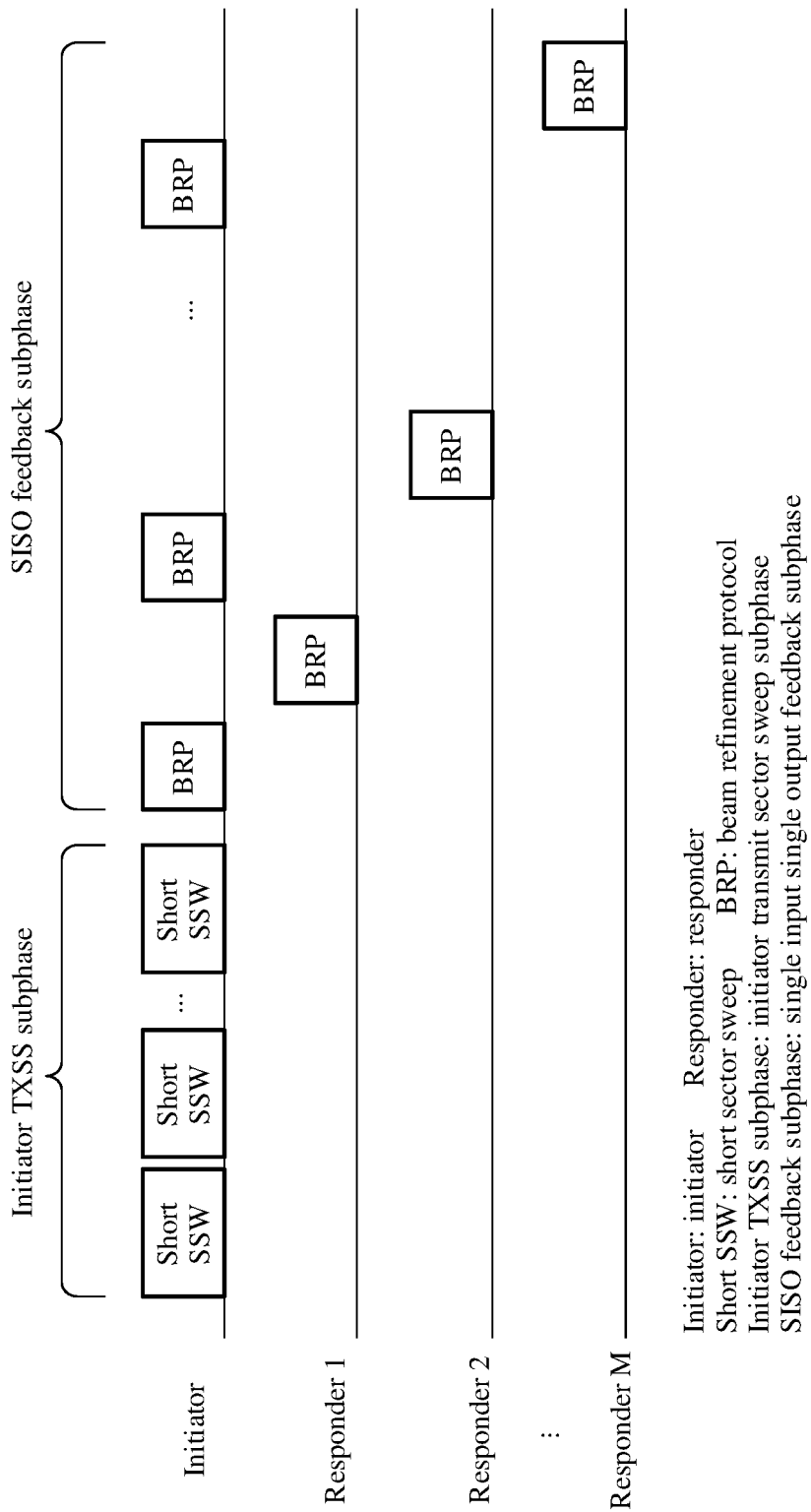
FIG. 5 is a schematic flowchart of a SISO phase in MU MIMO BF.

FIG. 5 is a schematic flowchart of a SISO phase in MU MIMO BF. As shown in FIG. 5, the SISO phase in MU MIMO BF includes two procedures: an initiator TXSS procedure and a SISO feedback procedure.

Initiator TXSS procedure: An initiator performs the initiator TXSS procedure by using a short sector sweep (Short Sector Sweep, Short SSW) frame. The short SSW frame carries a radio frequency link identifier to indicate an antenna identifier of a sending beam, and carries a down counter (CDOWN) value to identify a sector identifier (ID). In addition, the short SSW frame carries a target association identifier (AID) to identify an associated station, and is used to identify a responder herein.

SISO feedback procedure: If the initiator TXSS procedure exists, the SISO feedback procedure is performed after the initiator TXSS procedure and then after medium beamforming inter-frame space (medium beamforming inter-frame space, MBIFS). In the SISO feedback procedure, an initiator sends a BRP frame to poll measurement results of all responders in a multiple user group (MU Group). The responder feeds back a BRP frame including an EDMG Channel Measurement Feedback element to the initiator to feed back the measurement result.

It should be understood that the SISO phase in MU MIMO BF is intended to collect feedback information of one or more suitable initiator TX and responder RX DMG antennas and sectors between the initiator and each responder in the MU Group. The information is used to perform the subsequent MIMO phase.

2-2. MIMO Phase in MU MIMO BF

Figure 6:
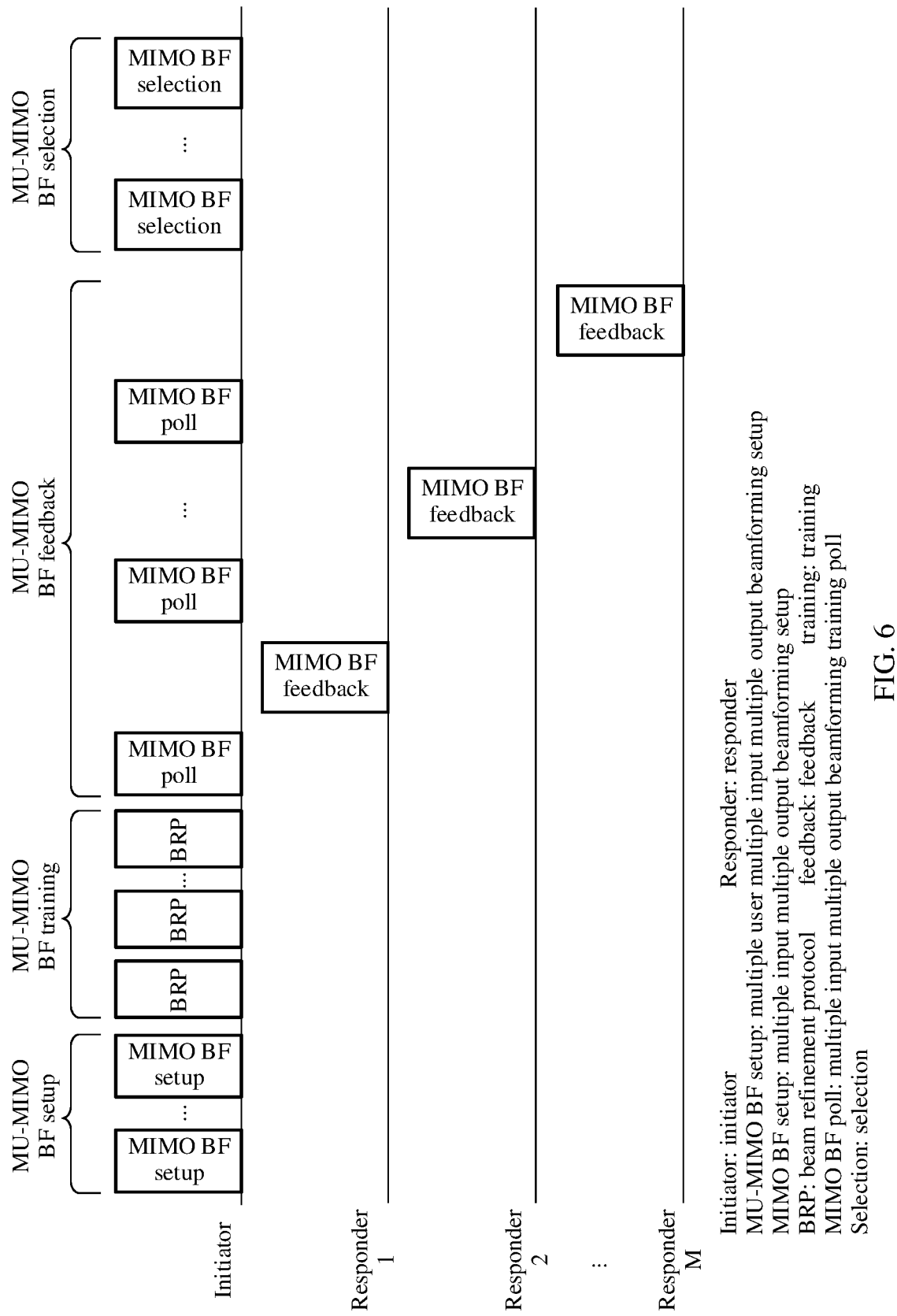
FIG. 6 is a schematic flowchart of a MIMO phase in MU MIMO BF.

FIG. 6 is a schematic flowchart of a MIMO phase in MU MIMO BF. As shown in FIG. 6, the MIMO phase in MU MIMO BF includes four procedures: an MU MIMO BF setup procedure, an MU MIMO BF training procedure, an MU MIMO BF feedback (feedback) procedure, and an MU MIMO BF selection procedure.

MU MIMO BF setup procedure: This procedure is mandatory. An initiator sends a MIMO BF setup frame to each responder to indicate a subsequent process. It should be understood that, because a beamforming technology in the 802.11ay standard supports only DL MU MIMO, the responder does not reply with a MIMO BF setup frame in this case.

MU MIMO BF training procedure: The initiator sends a plurality of EDMG BRP-RX/TX PPDUs. Each time interval between EDMG BRP-RX/TX PPDUs should be SIFS. It should be understood that the MU MIMO BF training procedure is used for pairing a downlink optimal sending/receiving sector/optimal sending/receiving beam.

MU MIMO BF feedback procedure: The initiator sends a MIMO BF feedback poll frame to poll measurement results of all responders in an MU group. The responder indicates feedback content by using a MIMO feedback control element in the MIMO BF feedback frame. It should be understood that this procedure is used to feed back a result of pairing of downlink optimal sending/receiving sectors/optimal sending/receiving beams between the initiator and responders in an initiator SMBT procedure.

MU MIMO BF selection procedure: In the MU MIMO BF selection subphase, the initiator should send one or more MIMO BF selection frames to each responder in the MU group. The initiator should send a minimum number of MIMO BF selection frames to all the responders in the MU group. A transmitter address field in the MIMO BF selection frame should be set to a basic service set identifier of the initiator, and a receiver address field should be set to a broadcast address. Each MIMO BF selection frame includes a dialog token in a dialog token (Dialog Token) field, to identify MU MIMO BF training.

It can be learned that, regardless of SU MIMO BF or MU MIMO BF, only an optimal beam used for communication transmission (or transmission in a downlink direction of communication) can be obtained, an environment condition in a beam sweep range of the SU MIMO BF or the MU MIMO BF cannot be obtained, and whether there is a moving target in an environment cannot be determined. In addition, beam sweep facilitates sensing an ambient environment. Therefore, how to combine a WLAN sensing technology with the beamforming technology and perform WLAN sensing without affecting normal communication becomes an urgent problem to be resolved.

The WLAN sensing technology can be classified into two types. One uses a radar technology, in which a wireless device sends a radar signal to sense a detected target. The other measures channel state information (CSI) to obtain channel characteristic changes at different moments to sense a detected target. This application focuses on a manner of sensing a detected target by using CSI.

Embodiments of this application provides a MIMO beamforming-based sensing method. A variation of a CSI value measured through sweep by using a same beam for a plurality of times is used for sensing. A related frame structure is modified based on an SU/MU MIMO beamforming training process in the 802.11ay standard, to combine a conventional SU/MU MIMO beamforming training mechanism in 802.11ay with WLAN sensing. Therefore, one or more targets are sensed, and a beam for sensing is trained in addition to original SU/MU MIMO communication beam training, with no need to specially design a related process for sensing and training the beam for sensing, so that overheads are low, and compatibility is good.

The following describes in detail the technical solutions provided in this application with reference to more accompanying drawings.

The technical solutions provided in this application are described in detail by using two embodiments. Embodiment 1 describes how to design a related frame structure based on an SU MIMO architecture to implement both SU MIMO communication beam training and WLAN sensing. Embodiment 2 describes how to design a related frame structure based on a DL MU MIMO structure to implement both MU MIMO communication beam training and WLAN sensing.

It may be understood that a first device in this application may indicate an initiator (initiator). The initiator may be the AP in FIG. 1a or FIG. 1b, or may be any STA in FIG. 1a or FIG. 1b. In other words, the first device may be an AP or a STA. A second device in this application may indicate a responder (responder). The responder may be the AP in FIG. 1a or FIG. 1b, or may be any STA in FIG. 1a or FIG. 1b. In other words, the second device may be a STA or an AP.

It may be further understood that both the first device and the second device in this application support an 802.11 standard, for example, the 802.11ay standard, and may further support another 802.11 standard, for example, 802.11be, 802.11ax, or a next-generation standard of 802.11be.

Embodiment 1

Embodiment 1 of this application is designed for an SU MIMO BF procedure. An ambient environment is swept by using a beam training mode for sending a BRP-TX PPDU, to determine whether there is a moving target in the ambient environment. Embodiment 1 of this application mainly describes how to modify a frame format in an SU MIMO beamforming-based training process to implement both SU MIMO communication beam training and WLAN sensing.

It should be understood that the MIMO beamforming-based sensing method provided in this embodiment of this application includes two phases: a SISO phase and a MIMO phase. The SISO phase includes at least a setup procedure, an initiator BRP TXSS procedure, and an acknowledgment procedure. Optionally, the SISO phase further includes one or more of a responder receive training procedure, a responder BRP TXSS procedure, and an initiator receive training procedure. The MIMO phase includes at least an SU MIMO BF setup procedure, an initiator SMBT procedure, and an SU MIMO BF feedback procedure. Optionally, the MIMO phase further includes a responder SMBT procedure.

Figure 7A:
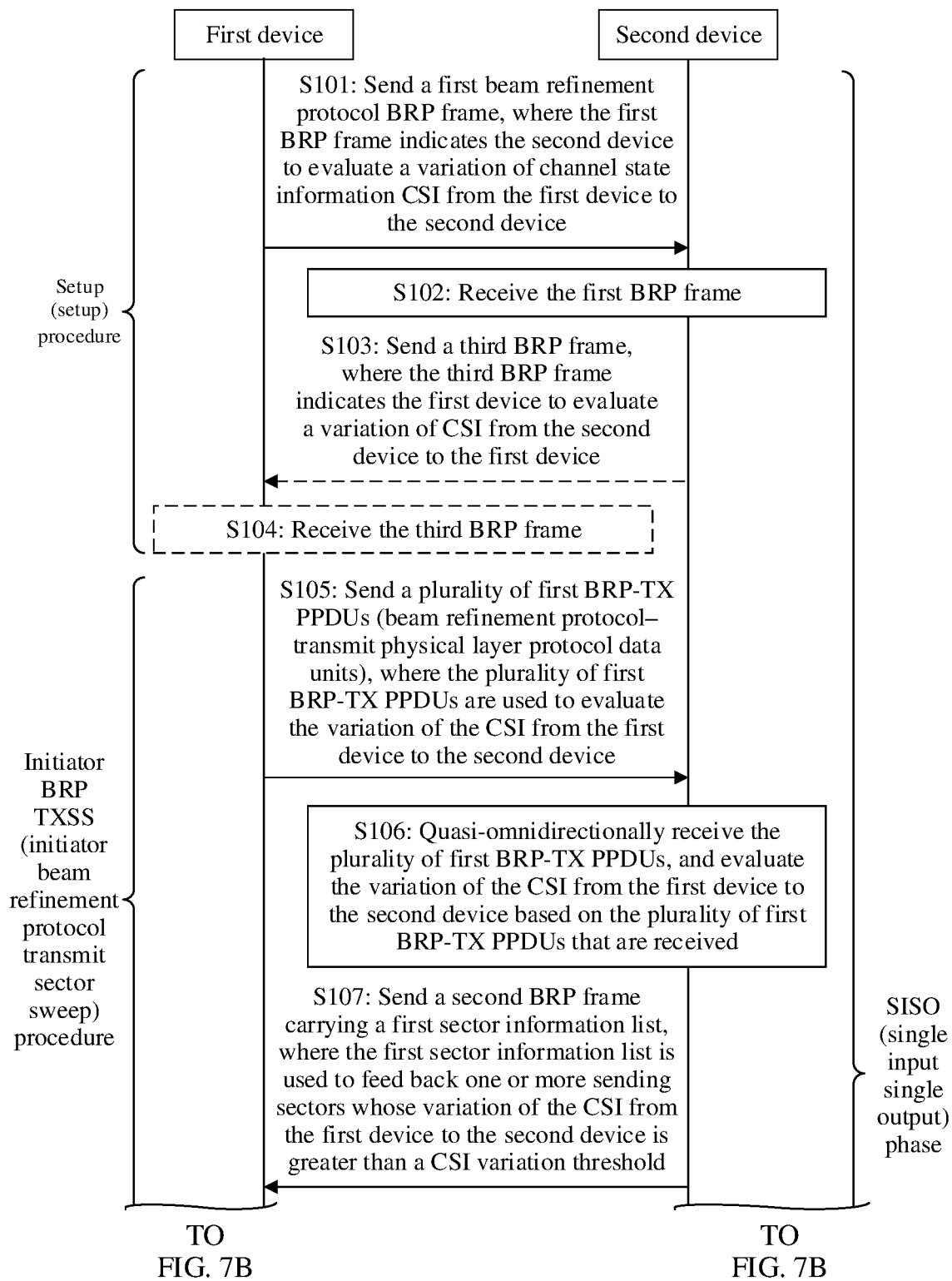
FIG. 7A and FIG. 7B are a schematic flowchart of a MIMO beamforming-based sensing method according to an embodiment of this application.
Figure 7B:
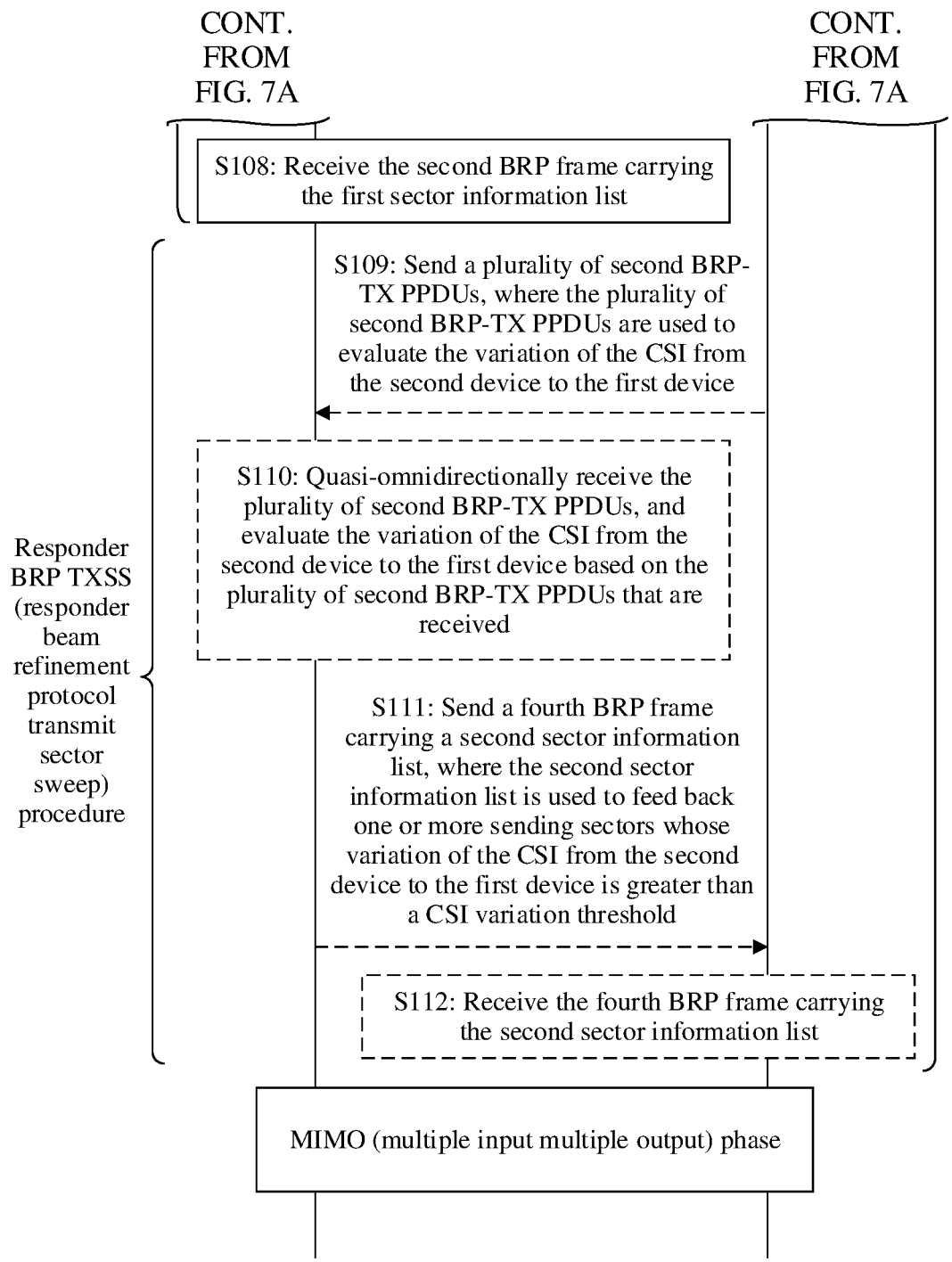

FIG. 7A and FIG. 7B are a schematic flowchart of the MIMO beamforming-based sensing method according to this embodiment of this application. As shown in FIG. 7A and FIG. 7B, the setup procedure includes step S101 to step S104, the initiator BRP TXSS procedure includes step S105 to step S108, the responder BRP TXSS procedure includes step S109 to step S112, and the acknowledgment procedure is the same as an acknowledgment procedure of SU MIMO BF in the 802.11ay standard. Details are not described in this embodiment of this application. The MIMO beamforming-based sensing method in FIG. 7A and FIG. 7B includes but is not limited to the following steps.

S101: A first device sends a first beam refinement protocol BRP frame, where the first BRP frame indicates a second device to evaluate a variation of channel state information CSI from the first device to the second device.

S102: The second device receives the first BRP frame.

Optionally, the first device sends the first BRP frame, to indicate the second device to evaluate the variation of the CSI from the first device to the second device in the initiator BRP TXSS procedure. In other words, the first device sends the first BRP frame, to indicate that a subsequent initiator BRP TXSS procedure is a sensing procedure, to sense a moving object in an ambient environment, and indicate a specific sensing operation. Correspondingly, the second device receives the first BRP frame.

Optionally, an element field is added to the first BRP frame based on a frame format of an original BRP frame (that is, a BRP frame sent by an initiator in a setup procedure in a SISO phase of SU MIMO beamforming training in the 802.11ay standard), to indicate the second device to evaluate the variation of the CSI from the first device to the second device in the initiator BRP TXSS procedure. In this application, the added element is referred to as a BRP sensing request element (BRP Sensing Request element). It should be understood that the added element may have another name. This is not limited in this application. In other words, the first BRP frame includes the BRP sensing request element. The BRP sensing request element indicates the second device (or a responder) to evaluate the variation of the CSI from the first device to the second device in the initiator BRP TXSS procedure, or indicates that a subsequent initiator BRP TXSS procedure is a sensing procedure and indicates a specific sensing operation. An element identifier (Element ID) of the BRP sensing request element is a reserved value, for example, 12.

Optionally, the BRP sensing request element (BRP Sensing Request element) includes a CSI measurement request field and a number of self-beam-sweep cycles field. When a value of the CSI measurement request field is a first value, it indicates a peer device (herein indicating the second device or the responder) to measure the CSI in the initiator BRP TXSS procedure. When a value of the CSI measurement request field is a second value, it indicates the peer device (herein indicating the second device or the responder) not to measure the CSI in the initiator BRP TXSS procedure. In this embodiment of this application, the CSI measurement request field in the first BRP frame is set to the first value. The first value is 1, and the second value is 0. Alternatively, the first value is 0, and the second value is 1. The number of self-beam-sweep cycles field indicates a number of sweep cycles of a sending beam in the initiator BRP TXSS procedure. When the receive device (herein indicating the second device or the responder) receives BRP-TX PPDUs that are sent by using a same sending beam/sending sector and that are of the number of sweep cycles, the receive device (herein indicating the second device or the responder) starts to calculate a CSI difference. For example, if a value indicated by the number of self-beam-sweep cycles field is 2, after receiving two BRP-TX PPDUs sent by using the same sending beam/sending sector in the initiator BRP TXSS procedure, the responder starts to calculate the CSI difference.

It should be understood that in this case, a value and a meaning of a BRP-TXSS field in the first BRP frame are the same as those of a BRP-TXSS field in the BRP frame sent by the initiator in the setup procedure of SU MIMO beamforming training in the 802.11ay standard. In other words, when the value of the BRP-TXSS field is 1, it indicates either a request to perform a sensing BRP TXSS process or to acknowledge a request to perform the sensing BRP TXSS process (the BRP-TXSS field is set to 1 to indicate either a request to perform BRP TXSS or to acknowledge a request to perform BRP TXSS). For details, refer to a related definition in the 802.11ay standard.

Optionally, the BRP sensing request element may further include one or more of the following fields: a sensing BRP-TXSS field, a sensing transmit sector identifier field, a sensing transmit antenna identifier mask field, a CSI variation threshold field, and an evaluation algorithm field. When a value of the sensing BRP-TXSS field is 1, it indicates either to acknowledge a request to perform a sensing BRP TXSS process or a request to perform the sensing BRP TXSS process. In other words, when the value of the sensing BRP-TXSS field is 1, it indicates that a current BRP-TXSS process is a sensing process, and is used to sense a moving object in an ambient environment. The sensing transmit sector identifier field indicates a sector identifier that needs to be trained in the initiator BRP TXSS procedure. The sensing transmit antenna identifier mask field indicates an antenna bitmap that needs to be trained in the initiator BRP TXSS procedure. The CSI variation threshold field indicates a CSI variation threshold. The evaluation algorithm field indicates an evaluation algorithm of the CSI.

It should be understood that each field included in the BRP sensing request element may further have another name. This is not limited in this embodiment of this application.

Figure 8B:
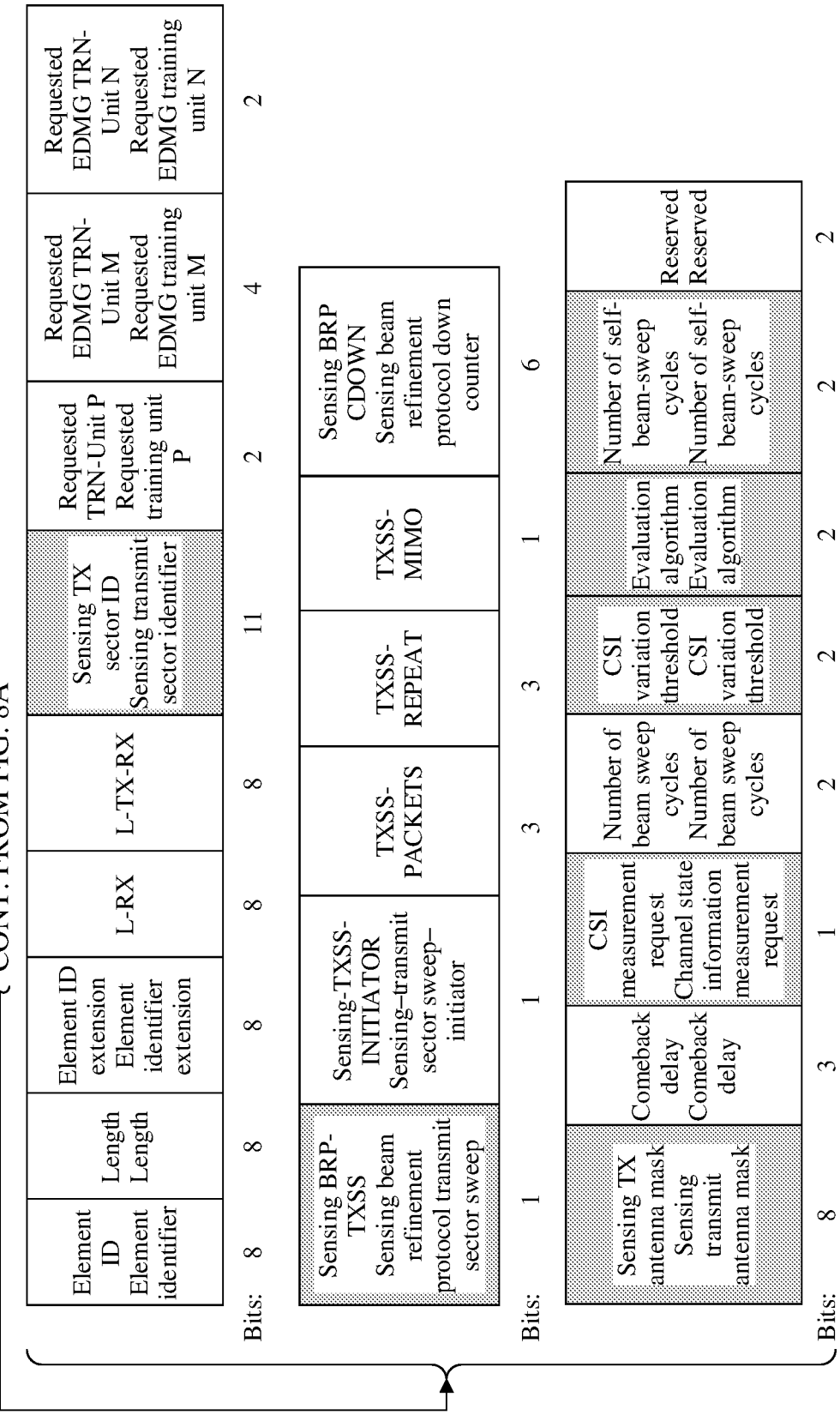

FIG. 8A and FIG. 8B are a schematic diagram of a frame format of a BRP sensing request element according to this embodiment of this application. As shown in FIG. 8A and FIG. 8B, the BRP sensing request element whose element identifier is a reserved value (for example, 12) is added based on a frame format of an original BRP frame. The BRP sensing request element includes a sensing BRP-TXSS (Sensing BRP-TXSS) field, a sensing transmit sector identifier (Sensing TX Sector ID) field, a sensing transmit antenna identifier mask (Sensing TX Antenna ID Mask) field, a CSI measurement request field, a number of self-beam-sweep cycles (Number of self-beam-sweep cycles) field, a CSI variation threshold field, an evaluation algorithm field, and the like.

The sensing BRP-TXSS field indicates that a current process is sensing BRP-TXSS. The sensing TX sector ID field indicates a sector identifier that needs to be trained by a transmit device in the initiator BRP TXSS procedure. The sensing TX antenna ID mask field indicates an antenna bitmap that needs to be trained by the transmit device in the initiator BRP TXSS procedure. It should be understood that the transmit device is a party that sends a radio frame in this interaction, and a receive device is a party that receives the radio frame in this interaction. In this application, the transmit device is not equivalent to an initiator, and the receive device is not equivalent to a responder.

The CSI measurement request field indicates whether the second device measures CSI or whether CSI measurement is enabled in the initiator BRP TXSS procedure. When a value of the CSI measurement request field is a first value, the second device is indicated to perform CSI measurement in the initiator BRP TXSS procedure by using a training unit (TRN Unit) included in a received BRP-TX PPDU. When a value of the CSI measurement request field is a second value, the second device is indicated not to perform CSI measurement in the initiator BRP TXSS procedure.

The evaluation algorithm field indicates an evaluation algorithm of the CSI. The evaluation algorithm of the CSI is used to evaluate (or calculate) a CSI value.

The number of self-beam-sweep cycles field indicates a number of sweep cycles of a sending beam in the initiator BRP TXSS procedure. When the receive device (herein indicating the second device or the responder) receives BRP-TX PPDUs that are sent by using a same sending beam/sending sector and that are of the number of sweep cycles in the initiator BRP TXSS procedure, the receive device (herein indicating the second device or the responder) starts to calculate a CSI difference.

The CSI variation threshold field indicates a CSI variation threshold, that is, a variation of the CSI indicating that there is a moving target. In a subsequent initiator BRP TXSS procedure, if a CSI difference between CSI values measured for a plurality of times by using a same sending beam/sector is greater than the CSI variation threshold, it indicates that there is a moving target in this beam sweep area, and the second device (the responder) stores a sending antenna identifier and a sending sector identifier that correspond to the sending beam. On the contrary, in the subsequent initiator BRP TXSS procedure, if a CSI difference between CSI values measured for a plurality of times by using a same sending beam/sector is less than or equal to the CSI variation threshold, it indicates that there is no moving target in this beam sweep area. Therefore, an optimal sending beam/sector of the initiator can be obtained from the initiator BRP TXSS procedure.

The BRP sensing request element shown in FIG. 8A and FIG. 8B further includes one or more of the following fields:

An element identifier (Element ID), a length, and an element identifier extension (Element ID Extension) are a general frame format of an element frame. In this embodiment of this application, the element ID is set to a reserved value 12, to indicate the BRP sensing request element.

L-RX: Indicates a number of TRN-units that are requested by a sending STA and that are used for receive beam training when the receive end beam training is used as a part of a beam refinement procedure. The number of TRN-units is equal to a value of L-RX multiplied by 4.

L-TX-RX: Indicates a number of consecutive TRN-units maintaining a same AWV configuration for a sending antenna weight vector (AWV) in a transmit (TX) and receive (RX) beam refinement procedure.

Requested training unit P (Requested TRN-Unit P): Indicates a number of TRN subfields that request to use a same AWV at the beginning of a TRN unit. The AWV is the same as an AWV used when preamble and data fields of a PPDU are transmitted.

Requested EDMG training unit M (Requested EDMG TRN-Unit M): A value of this field is increased by 1 to indicate a number of requests for TRN subfields that can be used for TX (transmit) training in a TRN-unit.

Requested EDMG training unit N (Requested EDMG TRN-Unit N): Indicates a number of requests for consecutive TRN subfields transmitted using a same AWV in the EDMG TRN-Unit M.

Sensing-transmit sector sweep-initiator (Sensing-TXSS-INITIATOR): If the sensing BRP-TXSS field is equal to 1, the sensing-TXSS-INITIATOR field is set to 1 to indicate that a sender of a BRP frame is the initiator of the BRP TXSS process, or the sensing-TXSS-INITIATOR field is set to 0 to indicate that the sender of the BRP frame is the responder of the BRP TXSS process. When the sensing BRP-TXSS field is 0, the sensing-TXSS-INITIATOR field is a reserved field.

TXSS-PACKETS: If both the sensing BRP-TXSS field and the sensing-TXSS-INITIATOR field are equal to 1, a value of the TXSS-PACKETS field is increased by 1 to indicate a number of EDMG BRP-TX PPDUs required by the initiator to perform sending sector training. If the sensing BRP-TXSS field is equal to 1, the sensing-TXSS-INITIATOR field is equal to 0, and a SISO procedure of SU MIMO beamforming training includes responder BRP TXSS, a value of the TXSS-PACKETS field is increased by 1 to indicate a number of EDMG BRP-TX PPDUs required by the responder to perform sending sector training. When the sensing BRP-TXSS field is equal to 0, the TXSS-PACKETS field is a reserved field.

TXSS-REPEAT: If both the sensing BRP-TXSS field and the sensing-TXSS-INITIATOR field are equal to 1, a value of the TXSS-REPEAT field is increased by 1 to indicate a number of times that an EDMG BRP-TX PPDU transmitted in responder BRP TXSS is repeated if the BRP TXSS process includes a responder BRP TXSS procedure. If sensing BRP-TXSS=1 and sensing-TXSS-INITIATOR=0, a value of the TXSS-REPEAT field is increased by 1 to indicate a number of times that an EDMG BRP-TX PPDU transmitted in initiator BRP TXSS is repeated. When BRP-TXSS=0, the TXSS-REPEAT field is a reserved field.

TXSS-MIMO: If both the sensing BRP-TXSS field and the sensing-TXSS-INITIATOR field are equal to 1, the TXSS-MIMO field is set to 1 to indicate that requested BRP TXSS is MIMO BRP TXSS, or the TXSS-MIMO field is set to 0 to indicate that requested BRP TXSS is SISO BRP TXSS. If neither the BRP-TXSS field nor the TXSS-INITIATOR field is equal to 1, the TXSS-MIMO field is reserved.

Sensing BRP down counter (Sensing BRP CDOWN): Indicates a number of remaining BRP-TX PPDUs to be sent, and is a reserved bit or is not used in a setup procedure.

Comeback delay (Comeback Delay) indicates that a station may not be ready to perform feedback after BRPIFS. A value in this field indicates when a device performs feedback.

Optionally, after step S102, the MIMO beamforming-based sensing method shown in FIG. 7A and FIG. 7B further includes step S103 and step S104.

S103: The second device sends a third BRP frame, where the third BRP frame indicates the first device to evaluate a variation of CSI from the second device to the first device.

S104: The first device receives the third BRP frame.

Optionally, after receiving the first BRP frame sent by the first device, the second device replies with the third BRP frame to the first device at an MBIFS interval, where the third BRP frame indicates the first device to evaluate the variation of the CSI from the second device to the first device in the responder BRP TXSS procedure. In other words, the third BRP frame returned by the second device indicates that a subsequent responder BRP TXSS procedure is also a sensing procedure, indicates a specific sensing operation, and acknowledge the first BRP frame sent by the first device. Correspondingly, the first device receives the third BRP frame. It should be understood that after receiving the third BRP frame sent by the second device, the first device starts to perform the initiator BRP TXSS procedure.

Optionally, an element field is added to the third BRP frame based on a frame format of an original BRP frame (that is, a BRP frame sent by the responder in the setup procedure in the SISO phase of SU MIMO beamforming training in the 802.11ay standard), to indicate the first device to evaluate the variation of the CSI from the second device to the first device in the responder BRP TXSS procedure. In this application, the added element is referred to as a BRP sensing request element (BRP Sensing Request element). It should be understood that the added element may have another name. This is not limited in this application. In other words, the third BRP frame includes the BRP sensing request element. The BRP sensing request element indicates the first device (or the initiator) to evaluate the variation of the CSI from the second device to the first device in the responder BRP TXSS procedure, or indicates that a subsequent responder BRP TXSS procedure is a sensing procedure and indicates a specific sensing operation. An element identifier (Element ID) of the BRP sensing request element is a reserved value, for example, 12.

Optionally, the BRP sensing request element (BRP Sensing Request element) in the third frame further includes a CSI measurement request field and a number of self-beam-sweep cycles field. When a value of the CSI measurement request field is a first value, it indicates a peer device (herein indicating the first device or the initiator) to measure the CSI in the responder BRP TXSS procedure. When a value of the CSI measurement request field is a second value, it indicates the peer device (herein indicating the first device or the initiator) not to measure the CSI in the responder BRP TXSS procedure. In this embodiment of this application, the CSI measurement request field in the third BRP frame is set to the first value. The first value is 1, and the second value is 0. Alternatively, the first value is 0, and the second value is 1. The number of self-beam-sweep cycles field indicates a number of sweep cycles of a sending beam in the responder BRP TXSS procedure. When the receive device (herein indicating the first device or the initiator) receives BRP-TX PPDUs that are sent by using a same sending beam/sending sector and that are of the number of sweep cycles, the receive device (herein indicating the first device or the initiator) starts to calculate a CSI difference. For example, if a value indicated by the number of self-beam-sweep cycles field is 2, after receiving two BRP-TX PPDUs sent by using the same sending beam/sending sector in the responder BRP TXSS procedure, the initiator starts to calculate the CSI difference.

It should be understood that in this case, a value and a meaning of a BRP-TXSS field in the third BRP frame are the same as those of a BRP-TXSS field in the BRP frame sent by the responder in the setup procedure of SU MIMO beamforming training in the 802.11ay standard. In other words, when the value of the BRP-TXSS field is 1, the BRP-TXSS field indicates either a request to perform a sensing BRP TXSS process or to acknowledge a request to perform the sensing BRP TXSS process (the BRP-TXSS field is set to 1 to indicate either a request to perform BRP TXSS or to acknowledge a request to perform BRP TXSS). For details, refer to a definition in the 802.11ay standard.

Optionally, the BRP sensing request element in the third frame may further include one or more of the following fields: a sensing BRP-TXSS field, a sensing transmit sector identifier field, a sensing transmit antenna identifier mask field, a CSI variation threshold field, and an evaluation algorithm field. When a value of the sensing BRP-TXSS field is 1, it indicates either to acknowledge a request to perform a sensing BRP TXSS process or a request to perform the sensing BRP TXSS process. In other words, when the value of the sensing BRP-TXSS field is 1, it indicates that a current BRP-TXSS process is a sensing process, and is used to sense a moving object in an ambient environment. The sensing transmit sector identifier field indicates a sector identifier that needs to be trained in the responder BRP TXSS procedure. The sensing transmit antenna identifier mask field indicates an antenna bitmap that needs to be trained in the responder BRP TXSS procedure. The CSI variation threshold field indicates a CSI variation threshold. The evaluation algorithm field indicates an evaluation algorithm of the CSI.

It should be understood that each field included in the BRP sensing request element may further have another name. This is not limited in this embodiment of this application.

Optionally, for a frame format of the BRP sensing request element, refer to related descriptions in FIG. 8A and FIG. 8B. Details are not described herein again. It should be understood that the BRP sensing request element in the first BRP frame indicates information in the initiator BRP TXSS procedure, and the BRP sensing request element in the third BRP frame indicates information in the responder BRP TXSS procedure.

S105: The first device sends a plurality of first BRP-TX PPDUs (beam refinement protocol-transmit physical layer protocol data units), where the plurality of first BRP-TX PPDUs are used to evaluate the variation of the CSI from the first device to the second device.

S106: The second device quasi-omnidirectionally receives the plurality of first BRP-TX PPDUs, and evaluates the variation of the CSI from the first device to the second device based on the plurality of first BRP-TX PPDUs that are received.

Optionally, the first device sends the first BRP-TX PPDUs in a sector sweep manner, and the second device quasi-omnidirectionally receives the first BRP-TX PPDUs. The second device compares, based on an indication of the first BRP frame in the setup procedure, variations of CSI values obtained when sweep is performed by using a same sending sector/beam of the first device for a plurality of times, to determine whether there is a moving target in this sector/beam sweep area. The second device records a sending sector/beam of a swept area in which there is a moving target. It should be understood that, that the first device sends the first BRP-TX PPDUs in the sector sweep manner may be understood as follows: In a period, the first device directionally sends the first BRP-TX PPDU by using a same DMG antenna or DMG antenna set each time by using a beam/sector of a specific width, and a DMG antenna ID field and a BRP CDOWN field are set in the first BRP-TX PPDU. A number of beam sweep cycles of the first device in the initiator BRP TXSS procedure is indicated by the number of self-beam-sweep cycles field in the first BRP frame. In other words, a number of times that sweeping needs to be performed by using all sectors/beams in a same DMG antenna or DMG antenna set in the initiator BRP TXSS procedure is determined by the number of self-beam-sweep cycles field in the first BRP frame. In this embodiment of this application, sweeping needs to be performed at least twice by using all sectors/beams of a same DMG antenna or DMG antenna set. Therefore, the first device sends a plurality of first BRP-TX PPDUs by using a same sending sector (or sending beam). The plurality of first BRP-TX PPDUs are used by the second device to evaluate the variation of the CSI from the first device to the second device. In other words, each time after receiving a first BRP-TX PPDU, the second device measures, based on an indication of a CSI measurement request field in the first BRP frame, a CSI value by using a TRN field included in the first BRP-TX PPDU. After the second device receives a plurality of first BRP-TX PPDUs from a same sending sector (or sending beam), the second device calculates a CSI difference by using two CSI values measured in TRN fields in any two first BRP-TX PPDUs sent by using the sending sector. If the CSI difference obtained by the second device through calculation is greater than the CSI variation threshold, it indicates that there is a moving target in the sending sector sweep area, and the second device may record a sending antenna identifier and an AWV feedback identifier of the sending sector and a receiving antenna identifier corresponding to the sending sector. It should be understood that the CSI difference in this application indicates a variation of CSI.

It should be further understood that a manner in which the second device receives the first BRP-TX PPDU is the same as a manner in which a responder receives the first BRP-TX PPDU in an initiator BRP TXSS procedure in the 802.11ay standard. In other words, when receiving TRN fields of all first BRP-TX PPDUs in a period, the second device uses a same DMG antenna or DMG antenna set in the period. In other words, for all first BRP-TX PPDUs in a period, the second device performs quasi-omnidirectional reception by using a same antenna or a same antenna set.

S107: The second device sends a second BRP frame carrying a first sector information list, where the first sector information list is used to feed back one or more sending sectors whose variation of the CSI from the first device to the second device is greater than a CSI variation threshold.

S108: The first device receives the second BRP frame carrying the first sector information list.

Optionally, in a feedback process of the initiator BRP TXSS procedure, the second device sends the second BRP frame carrying the first sector information list to the first device, and adds an element field based on a frame format of an original BRP frame to carry the first sector information list. An element identifier of the added element field may be a reserved value, for example, 13. In this application, the added element is referred to as a sensing measurement feedback element (Sensing Measurement feedback element). It should be understood that the added element may have another name. This is not limited in this application. The first sector information list is used to feed back one or more sending sectors whose variation of the CSI from the first device to the second device is greater than a CSI variation threshold. In other words, the initiator BRP TXSS procedure is used to train an optimal sending beam for sensing of the initiator.

It can be learned that this embodiment of this application combines WLAN sensing and a setup procedure and an initiator BRP TXSS procedure of SU MIMO beamforming training. This implements sensing of the initiator and training on a sending beam for sensing of the initiator in addition to original initiator BRP TXSS beamforming training, with no need to specially design a related process for sensing and training on the beam for sensing, so that overheads are low, and compatibility is good.

Optionally, the first sector information list includes a plurality of groups of first sector identifiers, and one group of first sector identifiers includes one AWV feedback identifier (AWV Feedback ID) and one transmit antenna identifier (TX Antenna ID). A sending sector determined by an AWV feedback ID and a TX antenna ID in one group of first sector identifiers and a BRP CDOWN value corresponding to the AWV feedback ID in the sensing measurement feedback element is a sending sector that is in all sending sectors of the first device and in which a CSI difference between any two CSI measurements on a same sending sector is greater than the CSI variation threshold. In other words, the sensing measurement feedback element includes the first sector information list and a BRP CDOWN value corresponding to each AWV Feedback ID.

The AWV feedback ID herein may be jointly calculated based on an index of a TRN in a first BRP-TX PPDU (the index index is not explicitly carried in the first BRP-TX PPDU, but when receiving the TRN, the receive device knows which TRN the TRN received by the receive device is) and a BRP CDOWN value (explicitly carried in the first BRP-TX PPDU). For a specific calculation manner, refer to descriptions in the 802.11ay standard. Details are not described herein.

Optionally, the group of first sector identifiers may further include a receive antenna identifier (RX Antenna ID), to indicate a receiving antenna. In this application, the RX antenna ID included in the first sector information list is a reserved bit or is not used.

Optionally, an element identifier of the sensing measurement feedback element (Sensing Measurement feedback element) may be a reserved value, for example, 13. It should be understood that the 802.11ay standard defines elements whose element identifiers (element ID) are 0 to 11. As shown in Table 4 below, based on this, in this embodiment of this application, a BRP sensing request element whose element identifier is 12 and a sensing measurement feedback element whose element identifier is 13 are defined. A frame format of the BRP sensing request element whose element identifier is 12 is shown in FIG. 8A and FIG. 8B, and details are not described herein again. The sensing measurement feedback element whose element identifier is 13 is located in the second BRP frame, and a frame format of the sensing measurement feedback element is shown in Table 5 below.

The sensing measurement feedback element shown in Table 5 includes a sensing sector identifier order (Sensing Sector ID Order) field and a sensing BRP CDOWN field. The sensing sector ID order field indicates a sending antenna ID, a sending sector ID, and a receiving antenna ID in a plurality of sending and receiving beam pairs whose CSI difference is greater than the CSI threshold. The sensing sector ID order field includes a plurality of groups of identifiers, and one group of identifiers is used to determine one sending sector and a receiving antenna corresponding to the sending sector. However, because the RX antenna ID included in the first sector information list in this application is a reserved bit or is not used, a group of identifiers in the sensing sector ID order field in this application is used to determine only one sending sector. As shown in Table 5, every three rows of the sensing sector ID order field are one group of identifiers. For example, a sector identifier 1 (Sector ID1)/a first value (indicated as CDOWN1) of a down counter (Down counter, CDOWN)/an AWV feedback identifier 1 (AWV Feedback ID1), a sending antenna identifier 1 (TX Antenna ID1), and a receiving antenna identifier 1 (RX Antenna ID1) are one group of identifiers; and sector identifier 2 (Sector ID2)/CDOWN2/a AWV feedback identifier 2 (AWV Feedback ID2), a sending antenna identifier 2 (TX Antenna ID2), and a receiving antenna identifier 2 (RX Antenna ID2) are another group of identifiers, and so on. It should be understood that a first row of every three rows of the sensing sector ID order field in the sensing measurement feedback element in this embodiment of this application is an AWV feedback identifier. An order of the plurality of groups of identifiers in the sensing sector ID order field is determined based on a variation of CSI (that is, a CSI difference) (different from communication, the plurality of groups of identifiers are sorted based on a value of SNR in communication). The plurality of groups of identifiers are sorted in descending order of variations of CSI, and an antenna ID and an AWV feedback ID that have a largest variation of CSI are in a first place, and so on.

The sensing BRP CDOWN field indicates a BRP CDOWN value corresponding to the AWV feedback ID. In addition, an element identifier (Element ID), a length (Length), and an element identifier extension (Element ID Extension) shown in Table 5 are a general frame format of an element frame. In this embodiment of this application, the element ID is set to a reserved value 13, to indicate the sensing measurement feedback element.

TABLE 4

BRP frame action field format (BRP frame Action field format)

| Order | Information |
|---|---|
| 1 | Category |
| 2 | Unprotected DMG action |
| 3 | Dialog token |
| 4 | BRP Request field |
| 5 | DMG Beam Refinement element |
| 6 | Zero or more Channel Measurement Feedback elements |
| 7 | Enhanced Beam Tracking element |
| 8 | SSW Report element |
| 9 | EDMG Partial Sector Level Sweep element (optional) |
| 10 | EDMG BRP Request element (optional) |
| 11 | Zero or more EDMG Channel Measurement Feedback elements |
| 12 | BRP Sensing Request element |
| 13 | Sensing Measurement Feedback element |

TABLE 5

Sensing measurement feedback element

| | Field | Length | Meaning |
|---|---|---|---|
| | Element ID | 8 bits | |
| | Length | 8 bits | |
| | Element ID extension | 8 bits | |
| Sensing sector ID order | Sector ID1 (sector identifier 1)/CDOWN1 (the first value of the down counter)/AWV Feedback ID1 (AWV feedback identifier 1) | 11 bits | Sector IDk/ CDOWNk/ AWV Feedback IDk— Sector ID/CDOWN/AWV feedback ID for SNRk being obtained, or sector ID/CDOWN/AWV feedback ID of the kth detected beam. (A $k^{th}$ sector ID/a $k^{th}$ CDOWN value/a $k^{th}$ AWV feedback identifier, corresponding to a beam corresponding to a $k^{th}$ SNR value; or the $k^{th}$ Sector ID/the $k^{th}$ CDOWN value/the $k^{th}$ AWV feedback identifier, corresponding to a $k^{th}$ detected beam) TX Antenna IDk—TX antenna ID corresponding to Sector IDk/CDOWNk/ AWV Feedback IDk. (A $k^{th}$ transmitting antenna identifier, corresponding to the $k^{th}$ sector ID/the $k^{th}$ CDOWN value/the $k^{th}$ AWV feedback identifier) RX Antenna IDk—RX antenna ID corresponding to Sector IDk/CDOWNk/ AWV Feedback IDK (A $k^{th}$ receiving antenna identifier, corresponding to the $k^{th}$ sector ID/the $k^{th}$ CDOWN value/the $k^{th}$ AWV feedback identifier) |
| | TX Antenna ID1 (sending antenna identifier 1) | 3 bits | |
| | RX Antenna ID1 (receiving antenna identifier 1) | 3 bits | |
| | Sector ID2/CDOWN2/ AWV feedback ID2 | 11 bits | |
| | TX antenna ID2 | 3 bits | |
| | RX antenna ID2 | 3 bits | |
| | . . . | . . . | |
| | Sector ID$_{Nmeas}$/ CDOWN$_{Nmeas}$/AWV feedback ID$_{Nmeas}$ | 11 bits | |
| | TX antenna ID$_{Nmeas}$ | 3 bits | |
| | RX antenna ID$_{Nmeas}$ | 3 bits | |
| Sensing BRP CDOWN | BRP CDOWN1 | 6 bits | BRP CDOWNk: BRP CDOWN corresponding to AWV feedback IDk (a $k^{th}$ BRP down counter value, corresponding to the $k^{th}$ AWV feedback identifier) |
| | BRP CDOWN2 | 6 bits | |
| | . . . | . . . | |
| | BRP CDOWN$_{Nmeas}$ | 6 bits | |
| . . . | . . . | . . . | . . . |

Optionally, after step S106, the MIMO beamforming-based sensing method may further include a responder receive training procedure. In an implementation, if the MIMO beamforming-based sensing method includes a responder receive training procedure, the procedure is the same as a responder receive training procedure of SU MIMO beamforming training in the 802.11ay standard. For details, refer to related descriptions in the 802.11ay standard. Details are not described herein again.

In another implementation, if the MIMO beamforming-based sensing method includes a responder receive training procedure, the procedure is as follows: The first device sends two first BRP-RX PPDUs. TRN fields in the two first BRP-RX PPDUs are sent in a same sector direction. The second device receives the two first BRP-RX PPDUs in a sector sweep manner. The second device compares variations of CSI values obtained when the TRN fields of the first BRP-RX PPDUs are received by using a same receiving sector/beam for a plurality of times, to determine whether there is a moving target in this beam sweep area. The second device records a receiving beam on which there is a moving target.

Optionally, after step S106, if a responder BRP TXSS procedure exists, the MIMO beamforming-based sensing method shown in FIG. 7A and FIG. 7B further includes step S109 to step S112.

S109: The second device sends a plurality of second BRP-TX PPDUs, where the plurality of second BRP-TX PPDUs are used to evaluate the variation of the CSI from the second device to the first device.

S110: The first device quasi-omnidirectionally receives the plurality of second BRP-TX PPDUs, and evaluates the variation of the CSI from the second device to the first device based on the plurality of second BRP-TX PPDUs that are received.

Optionally, the second device sends the second BRP-TX PPDUs in a sector sweep manner, and the first device quasi-omnidirectionally receives the second BRP-TX PPDUs. The first device compares, based on an indication of the third BRP frame in the setup procedure, variations of CSI values obtained when sweep is performed by using a same sending sector/beam of the second device for a plurality of times, to determine whether there is a moving target in this beam/sector sweep area. The first device records a sending sector/beam of a swept area in which there is a moving target. It should be understood that, that the second device sends the second BRP-TX PPDUs in the sector sweep manner may be understood as follows: In a period, the second device directionally sends the second BRP-TX PPDU by using a same DMG antenna or DMG antenna set each time by using a beam/sector of a specific width, and a DMG antenna ID field and a BRP CDOWN field are set in the second BRP-TX PPDU. A number of beam sweep cycles of the second device in the responder BRP TXSS procedure is indicated by the number of self-beam-sweep cycles field in the third BRP frame. In other words, a number of times that swept needs to be performed by using all sectors/beams in a same DMG antenna or DMG antenna set in the responder BRP TXSS procedure is determined by the number of self-beam-sweep cycles field in the third BRP frame. In this embodiment of this application, sweeping needs to be performed at least twice by using all sectors/beams of a same DMG antenna or DMG antenna set. Therefore, the second device sends a plurality of second BRP-TX PPDUs by using a same sending sector (or sending beam). The plurality of second BRP-TX PPDUs are used by the first device to evaluate the variation of the CSI from the second device to the first device. In other words, each time after receiving a second BRP-TX PPDU, the first device measures, based on an indication of a CSI measurement request field in the third BRP frame, a CSI value by using a TRN field included in the second BRP-TX PPDU. After the first device receives a plurality of second BRP-TX PPDUs from a same sending sector (or sending beam), the first device calculates a CSI difference by using two CSI values measured in TRN fields in any two second BRP-TX PPDUs sent by using the sending sector. If the CSI difference obtained by the first device through calculation is greater than the CSI variation threshold, it indicates that there is a moving target in the sending sector sweep area, and the first device may record a sending antenna identifier and an AWV feedback identifier of the sending sector and a receiving antenna identifier corresponding to the sending sector. It should be understood that the CSI difference in this application indicates a variation of CSI.

It should be further understood that a manner in which the first device receives the second BRP-TX PPDU is the same as a manner in which an initiator receives the second BRP-TX PPDU in a responder BRP TXSS procedure in the 802.11ay standard. In other words, when receiving TRN fields of all second BRP-TX PPDUs in a period, the first device uses a same DMG antenna or DMG antenna set in the period. In other words, for all second BRP-TX PPDUs in a period, the first device performs quasi-omnidirectional reception by using a same antenna or a same antenna set.

S111: The first device sends a fourth BRP frame carrying a second sector information list, where the second sector information list is used to feed back one or more sending sectors whose variation of the CSI from the second device to the first device is greater than a CSI variation threshold.

S112: The second device receives the fourth BRP frame carrying the second sector information list.

Optionally, in a feedback process of the responder BRP TXSS procedure, the first device sends the fourth BRP frame carrying the second sector information list to the second device, and adds an element field based on a frame format of an original BRP frame to carry the second sector information list. An element identifier of the added element field may be a reserved value, for example, 13. In this application, the added element is referred to as a sensing measurement feedback element (Sensing Measurement feedback element). It should be understood that the added element may have another name. This is not limited in this application. The second sector information list is used to feed back one or more sending sectors whose variation of the CSI from the second device to the first device is greater than a CSI variation threshold. In other words, the responder BRP TXSS procedure is used to train an optimal sending beam for sensing of the responder.

It can be learned that this embodiment of this application combines WLAN sensing and the setup procedure and the initiator BRP TXSS procedure of SU MIMO beamforming training, and combines WLAN sensing and the responder BRP TXSS procedure. This can implement sensing of the initiator and the responder and training on a sending beam for sensing of the initiator and the responder in addition to original initiator BRP TXSS and responder BRP TXSS beamforming training, with no need to specially design a related process for sensing and training on the beam for sensing, so that overheads are low, and compatibility is good.

Optionally, the second sector information list includes a plurality of groups of second sector identifiers, and one group of second sector identifiers includes one AWV Feedback ID and one TX Antenna ID. A sending sector determined by an AWV feedback ID and a TX antenna ID in one group of second sector identifiers and a BRP CDOWN value corresponding to the AWV feedback ID in the sensing measurement feedback element is a sending sector that is in all sending sectors of the second device and in which a CSI difference between any two CSI measurements on a same sending sector is greater than the CSI variation threshold. In other words, the sensing measurement feedback element includes the second sector information list and a BRP CDOWN value corresponding to each AWV Feedback ID.

The AWV feedback ID herein may be jointly calculated based on an index of a TRN in a second BRP-TX PPDU (the index index is not explicitly carried in the second BRP-TX PPDU, but when receiving the TRN, the receive device knows which TRN the TRN received by the receive device is) and a BRP CDOWN value (explicitly carried in the second BRP-TX PPDU). For a specific calculation manner, refer to descriptions in the 802.11ay standard. Details are not described herein.

Optionally, the group of second sector identifiers may further include a receive antenna identifier (RX Antenna ID), to indicate a receiving antenna. In this application, the RX antenna ID included in the second sector information list is a reserved bit or is not used.

Optionally, an element identifier of the sensing measurement feedback element (Sensing Measurement feedback element) may be a reserved value, for example, 13. It should be understood that the 802.11ay standard defines elements whose element identifiers (element ID) are 0 to 11. As shown in Table 4 above, based on this, in this embodiment of this application, a BRP sensing request element whose element identifier is 12 and a sensing measurement feedback element whose element identifier is 13 are defined. A frame format of the BRP sensing request element whose element identifier is 12 is shown in FIG. 8A and FIG. 8B, and details are not described herein again. The sensing measurement feedback element whose element identifier is 13 is located in the second BRP frame, and a frame format of the sensing measurement feedback element is shown in Table 5 above. Details are not described herein again.

Optionally, after step S112, the MIMO beamforming-based sensing method may further include initiator receive training. In an implementation, if the MIMO beamforming-based sensing method includes an initiator receive training procedure, the procedure is the same as an initiator receive training procedure of SU MIMO beamforming training in the 802.11ay standard. For details, refer to related descriptions in the 802.11ay standard. Details are not described herein again.

In another implementation, if the MIMO beamforming-based sensing method includes an initiator receive training procedure, the procedure is as follows: The second device continuously sends a plurality of second BRP-RX PPDUs. TRN fields in the plurality of second BRP-RX PPDUs are sent in a same sector direction. The first device receives the plurality of second BRP-RX PPDUs in a sector sweep manner. The first device compares variations of CSI values obtained when the TRN fields of the second BRP-RX PPDUs are received by using a same receiving sector/beam for a plurality of times, to determine whether there is a moving target in this beam sweep area. The first device records a receiving beam on which there is a moving target.

Optionally, the first device finally sends a BRP frame with an ACK to end an entire BRP TXSS process (or a SISO phase).

It can be learned that in this embodiment of this application, WLAN sensing is introduced in the SISO phase of SU MIMO beamforming training. A related frame format in a SISO phase is modified, and whether there is a moving target in an area is determined by using a variation of a CSI value obtained when sweep is performed by using a same beam for a plurality of times. This can implement sensing and training on a sending/receiving beam for sensing in addition to SU MIMO beamforming training, with no need to specially design a related process for sensing and training on the sending/receiving beam for sensing, so that overheads are low, and compatibility is good.

To better understand a SISO phase process of the method shown in FIG. 7A and FIG. 7B, the following uses an example for description.

Figure 9:
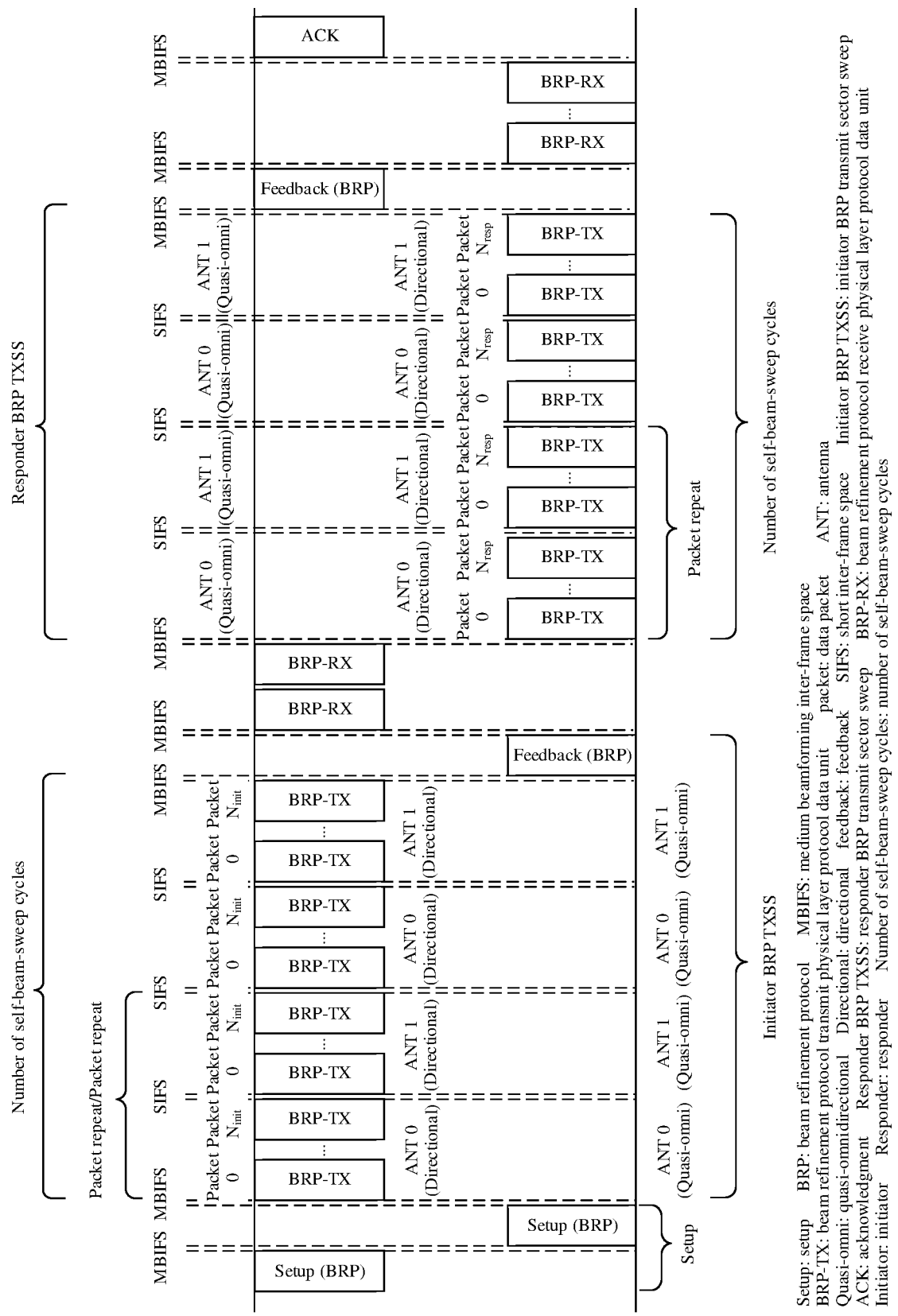
FIG. 9 is a schematic diagram of a time sequence of a SISO phase in SU MIMO BF according to an embodiment of this application.

In an example, FIG. 9 is a schematic diagram of a time sequence of the SISO phase in SU MIMO BF according to this embodiment of this application. As shown in FIG. 9, in a setup procedure, an initiator first sends a BRP frame including a BRP sensing request element, to indicate a responder to evaluate a variation of CSI from the initiator to the responder in a subsequent initiator BRP TXSS procedure. For a frame format of the BRP sensing request element, refer to the foregoing descriptions (FIG. 8A and FIG. 8B). Details are not described herein again. When a value of an added sensing BRP-TXSS field is 1, it indicates that a current BRP-TXSS process is a sensing BRP-TXSS process, and is used to sense a moving object in an ambient environment. In addition, a CSI measurement request field, a number of self-beam-sweep cycles field, a CSI variation threshold field, and an evaluation algorithm field in a BRP sensing request element indicate a specific sensing operation in the initiator BRP TXSS procedure. After an MBIFS interval, the responder also sends a BRP frame including the BRP sensing request element, and acknowledges, based on indicating a specific sensing operation in the responder BRP TXSS procedure, the BRP frame sent by the initiator.

Then, the initiator sends a BRP-TX PPDU based on indication information in the BRP sensing request element sent by the initiator in a setup procedure, for example, a direction (indicated by a requested EDMG TRN-unit M field, a requested EDMG TRN-unit N field, and a requested TRN-unit P field) of the BRP-TX PPDU, a number (indicated by a TX-PACKETS field) of sending in one period, a number (indicated by a TX-REPEAT field) of antenna switching times, and a number (indicated by the Number of self-beam-sweep cycles field) of sweep cycles. After receiving the BRP-TX PPDU sent by the initiator, the responder performs CSI measurement based on an indication of the CSI measurement request field in the setup procedure, determines a number of beam sweep times of the initiator at a same location based on the number of self-beam-sweep cycles field, and determines, based on the CSI variation threshold field, whether a variation of CSI in a current area exceeds a threshold. If the variation of the CSI exceeds the threshold, the responder feeds back a feedback result to the initiator by using a BRP frame including a sensing measurement feedback element.

Then, the initiator continuously sends two (different from communication, only one BRP-RX PPDU is sent in communication) BRP-RX PPDUs, TRN sequences in BRP-RX are sent in a same sector direction, and the responder receives the BRP-RX PPDUs in a sector sweep manner.

Then, the responder sends a BRP-TX PPDU based on indication information in the BRP sensing request element sent by the initiator in a setup phase, for example, a direction (indicated by a requested EDMG TRN-unit M field, a requested EDMG TRN-unit N field, and a requested TRN-unit P field) of the BRP-TX PPDU, a number (indicated by a TX-PACKETS field) of sending in one period, a number (indicated by a TX-REPEAT field) of antenna switching times, and a number (indicated by the Number of self-beam-sweep cycles field) of sweep cycles. After receiving the BRP-TX PPDU sent by the responder, the initiator performs CSI measurement based on an indication of the CSI measurement request field in the setup procedure, determines a number of beam sweep times of the responder at a same location based on the number of self-beam-sweep cycles field, and determines, based on the CSI variation threshold field, whether a variation of CSI in a current area exceeds a threshold. If the variation of the CSI exceeds the threshold, the initiator feeds back a feedback result to the responder by using a BRP frame including a sensing measurement feedback element.

The responder continuously sends a plurality of BRP-RX PPDUs, TRN sequences in BRP-RX are sent in a same sector direction, and the initiator receives the plurality of BRP-RX PPDUs in a sector sweep manner.

Finally, the initiator sends a BRP frame with an ACK to end an entire BRP TXSS process (or end the SISO phase).

It should be understood that, in the method shown in this embodiment of this application, compared with a process of the SISO phase of SU MIMO BF in the 802.11ay standard, sending is performed by using a same sector for a plurality of times in the initiator BRP TXSS procedure and the responder BRP TXSS procedure. In other words, packet repeat (packet repeat) is separately performed for a plurality of times in the initiator BRP TXSS procedure and the responder BRP TXSS procedure.

After the step S112, the MIMO beamforming-based sensing method provided in this embodiment of this application further includes the MIMO phase. The following describes in detail the MIMO phase of the MIMO beamforming-based sensing method provided in this embodiment of this application.

In an implementation, the MIMO phase in the method shown in FIG. 7A and FIG. 7B may be the same as a MIMO phase of SU MIMO beamforming training in the 802.11ay standard. For a specific procedure and a related frame format, refer to descriptions in the 802.11ay standard. Details are not described herein again. In other words, the MIMO beamforming-based sensing method provided in this embodiment of this application is applied only to the SISO phase of SU MIMO beamforming training, and the MIMO phase of the SU MIMO beamforming training does not change. To be specific, according to the MIMO beamforming-based sensing method provided in this embodiment of this application, optimal sending and receiving beams of both a transmit device and a receive device (the initiator and the responder) in a sensing scenario can be obtained, but an optimal sending and receiving beam pair of both the transmit device and the receive device (the initiator and the responder) in the sensing scenario cannot be obtained.

In another implementation, an interaction process in the MIMO phase in the method shown in FIG. 7A and FIG. 7B is the same as an interaction process in the MIMO phase of SU MIMO beamforming training in the 802.11ay standard, and frame formats are different. The following describes the MIMO phase in FIG. 7A and FIG. 7B in detail.

Figure 10A:
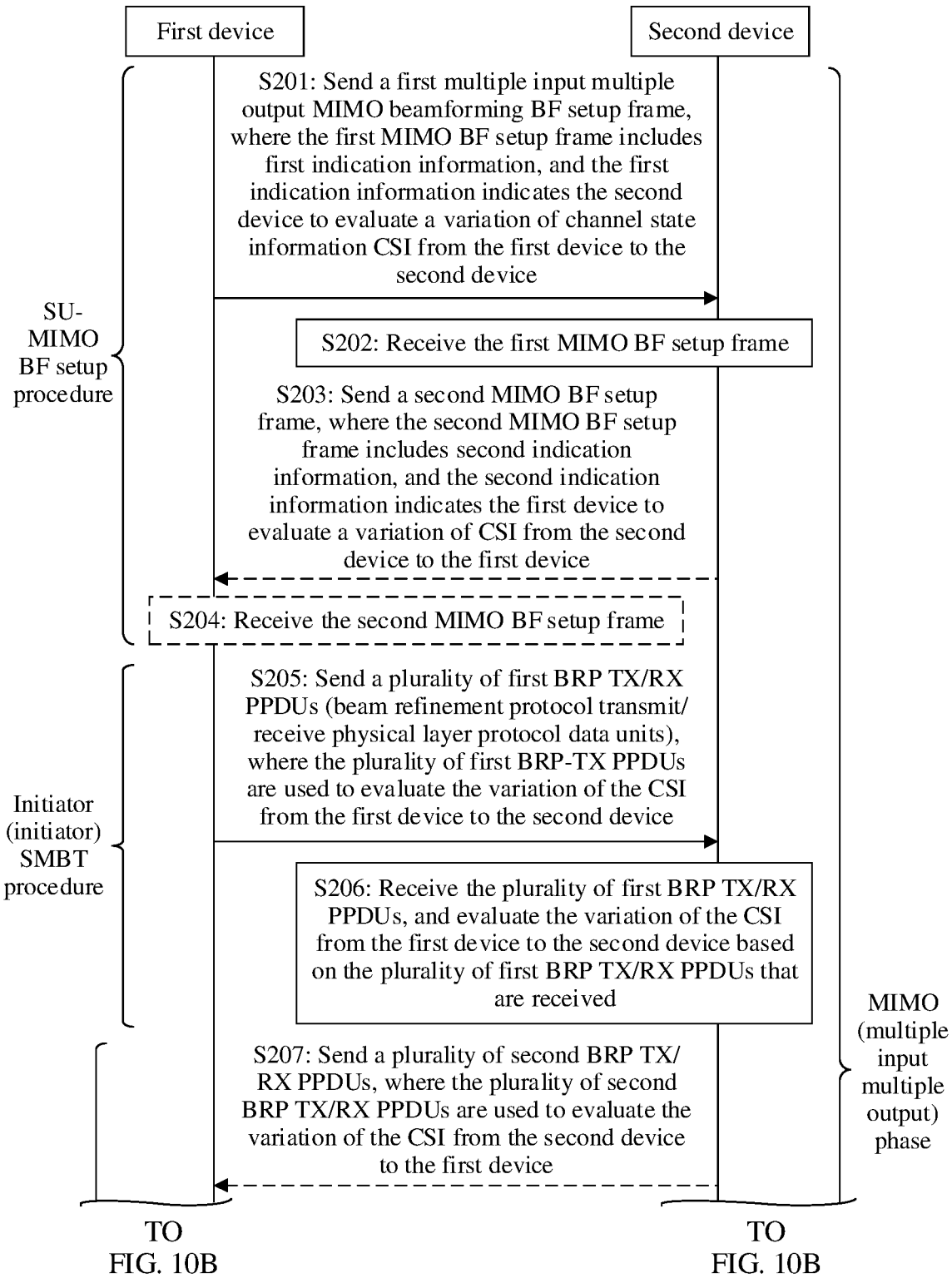
FIG. 10A and FIG. 10B are a schematic flowchart of a MIMO phase in a MIMO beamforming-based sensing method according to an embodiment of this application.
Figure 10B:
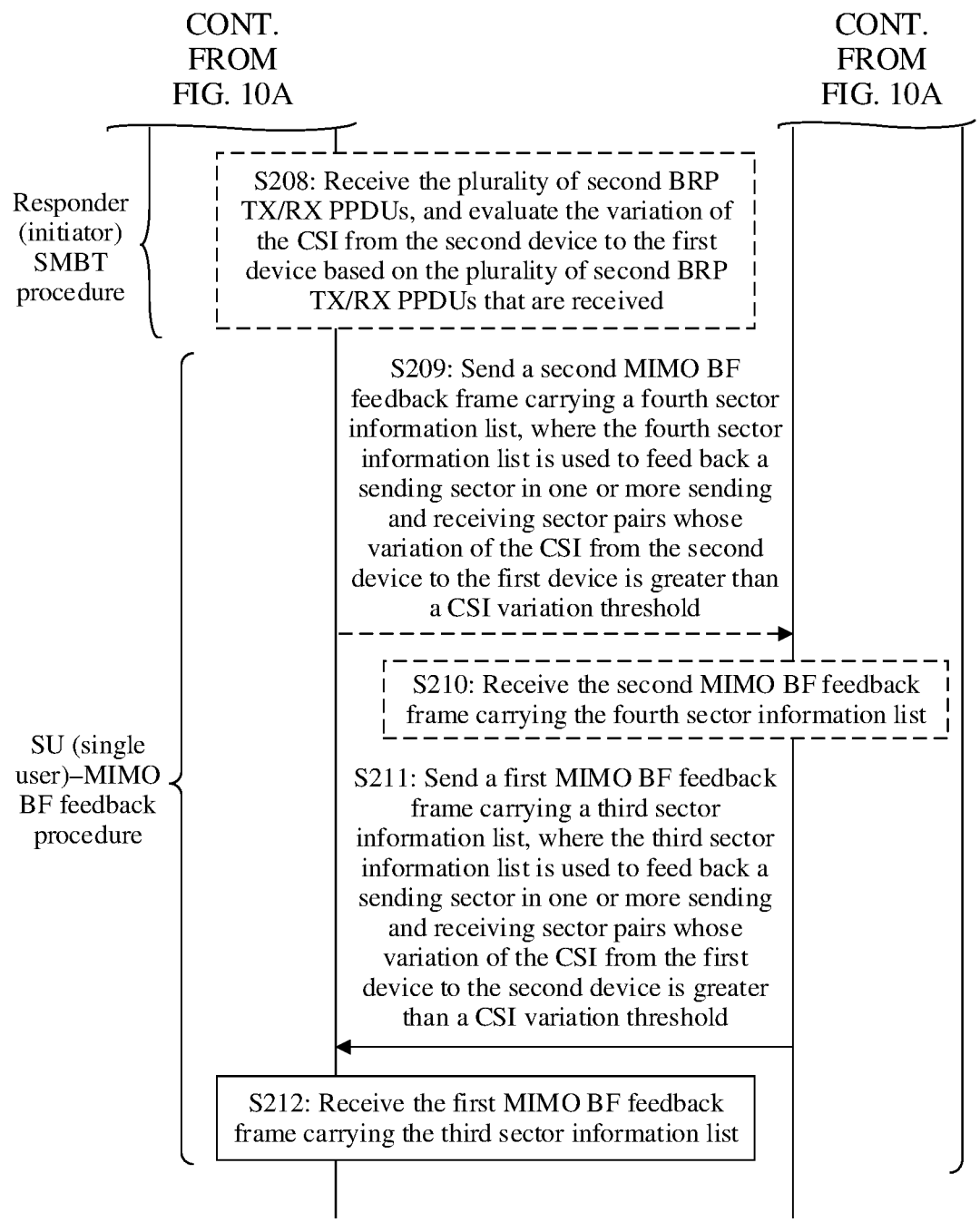

FIG. 10A and FIG. 10B are a schematic flowchart of the MIMO phase in the MIMO beamforming-based sensing method according to this embodiment of this application. An SU MIMO BF setup procedure includes step S201 to step S204, an initiator SMBT procedure includes step S205 and step S206, a responder SMBT procedure includes step S207 and step S208, and an SU MIMO BF feedback procedure includes step S209 to step S212. The MIMO phase in the MIMO beamforming-based sensing method shown in FIG. 10A and FIG. 10B includes but is not limited to the following steps.

S201: The first device sends a first multiple input multiple output MIMO beamforming BF setup frame, where the first MIMO BF setup frame includes first indication information, and the first indication information indicates the second device to evaluate the variation of the CSI from the first device to the second device.

S202: The second device receives the first MIMO BF setup frame.

Optionally, in the SU MIMO BF setup procedure, the first device sends the first MIMO BF setup frame. The first MIMO BF setup frame includes the first indication information, to indicate the second device to evaluate the variation of the CSI from the first device to the second device in the initiator SMBT procedure. In other words, the first indication information indicates that a sensing operation needs to be performed in the current MIMO phase and specific sensing operation information. Correspondingly, the second device receives the first MIMO BF setup frame.

Optionally, the first indication information is carried by using a reserved bit in a MIMO setup control element (MIMO Setup Control element) in the MIMO BF setup frame. The first indication information indicates a peer device (herein indicating the second device or the responder) to evaluate the variation of the CSI from the first device to the second device in the initiator SMBT procedure. In other words, the first MIMO BF setup frame in this embodiment of this application additionally has first indication information compared with a MIMO BF setup frame sent by an initiator in the 802.11ay standard.

Optionally, the first indication information includes a number of beam sweep cycles field, indicating a number of sweep cycles of a receiving beam in the initiator SMBT procedure. When the receive device (herein indicating the second device or the responder) receives BRP TX/RX PPDUs of the number of sweep cycles by using a same receiving beam/receiving sector, the receive device (herein indicating the second device or the responder) starts to calculate a CSI difference. The first indication information further includes one or more of the following fields: an evaluation algorithm field and a CSI variation threshold field. The evaluation algorithm field indicates an evaluation algorithm of the CSI, and the CSI variation threshold field indicates the CSI variation threshold. It should be understood that the evaluation algorithm of the CSI is used to calculate a CSI value, and the CSI variation threshold is used to compare with a variation of a CSI value measured when a same location is swept by using a same beam/sector for a plurality of times, to determine whether there is a moving target (target) in this beam scanning area.

It should be understood that each field included in the first indication information may further have another name. This is not limited in this embodiment of this application.

Optionally, the first MIMO BF setup frame further includes third indication information, to indicate that the first MIMO BF setup frame includes the first indication information. The third indication information is located in a reserved bit in the MIMO setup control element in the first MIMO BF setup frame.

FIG. 11A and FIG. 11B are a schematic diagram of a frame format of the MIMO setup control element according to this embodiment of this application. As shown in FIG. 11A and FIG. 11B, the MIMO setup control element includes a 1-bit sensing measurement (sensing Measurement) field and a 6-bit MIMO feedback request extension (MIMO FBCK-REQ Extension) field.

The sensing measurement field indicates whether a sensing operation needs to be performed in the current MIMO phase. When the sensing measurement field is set to 1, it indicates that a sensing operation needs to be performed in the current MIMO phase, and specific indication information is indicated by the MIMO FBCK-REQ extension field. In other words, when the sensing measurement field is set to 1, it indicates that the MIMO FBCK-REQ extension field is valid. When the sensing measurement field is set to 0, it indicates that subsequent six bits are reserved, that is, the MIMO FBCK-REQ extension field is reserved.

The MIMO FBCK-REQ extension field includes the CSI variation threshold (CSI Variation Threshold) field, the evaluation algorithm (Evaluation algorithm) field, and the number of beam sweep cycles (Number of beam sweep cycles) field. The evaluation algorithm field has a length of two bits, and indicates the evaluation algorithm of the CSI. The CSI variation threshold field has a length of two bits, and indicates the CSI variation threshold. When a variation of a CSI value measured through sweep by using a same beam for a plurality of times is greater than the CSI variation threshold, it indicates that there is a moving target (target) in this beam sweep area. On the contrary, when a variation of a CSI value measured through sweep by using a same beam for a plurality of times is less than or equal to the CSI variation threshold, it indicates that there is no moving target in this beam sweep area. The number of beam sweep cycles field indicates a number of sweep cycles of a receiving beam. When the receive device (herein indicating the second device or the responder) receives BRP TX/RX PPDUs of the number of sweep cycles by using a same receiving beam/receiving sector, the receive device (herein indicating the second device or the responder) starts to calculate a CSI difference.

It should be understood that in this embodiment of this application, the first indication information may be equivalent to a MIMO FBCK-REQ extension field, and the third indication information may be equivalent to a sensing measurement field whose value is 1.

It should be further understood that each field included in the MIMO setup control element shown in FIG. 11A and FIG. 11B may further have another name. This is not limited in this embodiment of this application.

Optionally, after step S202, the MIMO phase in the MIMO beamforming-based sensing method further includes step S203 and step S204.

S203: The second device sends a second MIMO BF setup frame, where the second MIMO BF setup frame includes second indication information, and the second indication information indicates the first device to evaluate the variation of the CSI from the second device to the first device in the responder SMBT procedure.

S204: The first device receives the second MIMO BF setup frame.

Optionally, after receiving the first MIMO BF setup frame sent by the first device, the second device replies with the second MIMO BF setup frame to the first device. The second MIMO BF setup frame includes second indication information, to indicate the first device to evaluate the variation of the CSI from the second device to the first device in the responder SMBT procedure. In other words, the second indication information indicates that a sensing operation needs to be performed in the current MIMO phase and specific sensing operation information. Correspondingly, the first device receives the second MIMO BF setup frame.

Optionally, the second indication information is carried by using a reserved bit in a MIMO setup control element (MIMO Setup Control element) in the MIMO BF setup frame. The second indication information indicates a peer device (herein indicating the first device or the initiator) to evaluate the variation of the CSI from the second device to the first device in the responder SMBT procedure. In other words, the second MIMO BF setup frame in this embodiment of this application additionally has second indication information compared with a MIMO BF setup frame sent by a responder in the 802.11ay standard.

Optionally, the second indication information includes a number of beam sweep cycles field, indicating a number of sweep cycles of a receiving beam in the responder SMBT procedure. When the receive device (herein indicating the first device or the initiator) receives BRP TX/RX PPDUs of the number of sweep cycles by using a same receiving beam/receiving sector, the receive device (herein indicating the first device or the initiator) starts to calculate a CSI difference. The second indication information further includes one or more of the following fields: an evaluation algorithm field and a CSI variation threshold field. The evaluation algorithm field indicates an evaluation algorithm of the CSI, and the CSI variation threshold field indicates the CSI variation threshold. It should be understood that the evaluation algorithm of the CSI is used to calculate a CSI value, and the CSI variation threshold is used to compare with a variation of a CSI value measured when a same location is swept by using a same beam/sector for a plurality of times, to determine whether there is a moving target (target) in this beam scanning area.

It should be understood that each field included in the second indication information may further have another name. This is not limited in this embodiment of this application.

Optionally, the second MIMO BF setup frame further includes fourth indication information, to indicate that the second MIMO BF setup frame includes the second indication information. The fourth indication information is located in a reserved bit in the MIMO setup control element in the second MIMO BF setup frame.

Optionally, a frame format of the MIMO setup control element is shown in FIG. 11A and FIG. 11B. Details are not described herein again. It should be understood that in this embodiment of this application, the second indication information may be equivalent to a MIMO FBCK-REQ extension field in the MIMO setup control element, and the fourth indication information may be equivalent to a sensing measurement field whose value is 1 in the MIMO setup control element.

S205: The first device sends a plurality of first BRP TX/RX PPDUs (beam refinement protocol transmit/receive physical layer protocol data units), where the plurality of first BRP TX/RX PPDUs are used to evaluate the variation of the CSI from the first device to the second device.

S206: The second device receives the plurality of first BRP TX/RX PPDUs, and evaluates the variation of the CSI from the first device to the second device based on the plurality of first BRP TX/RX PPDUs that are received.

Optionally, in the initiator SMBT procedure, the first device sends the first BRP TX/RX PPDUs in a sector sweep manner. Each time interval between first BRP-RX/TX PPDUs should be SIFS. The second device further receives the first BRP TX/RX PPDUs in a sector sweep manner. The second device compares, based on an indication of the first MIMO BF setup frame in the SU MIMO BF setup procedure, variations of CSI values obtained when sweep is performed by using a same sending/receiving sector/beam for a plurality of times, to determine whether there is a moving target in this sector/beam sweep area. The second device records a sending/receiving sector/beam of a swept area in which there is a moving target. It should be understood that, that the first device sends the first BRP TX/RX PPDUs in the sector sweep manner may be understood as follows: In a period, the first device directionally sends the first BRP TX/RX PPDU by using a same DMG antenna or DMG antenna set each time by using a beam/sector of a specific width, and a DMG antenna ID field and a BRP CDOWN field are set in the first BRP TX/RX PPDU. A number of beam sweep cycles of the receive device (herein indicating the second device or the responder) in the initiator SMBT procedure is indicated by the number of beam sweep cycles field in the first MIMO BF setup frame. In this embodiment of this application, sweeping needs to be performed at least twice by using all sectors/beams of a same DMG antenna or DMG antenna set. Therefore, the first device sends a plurality of first BRP TX/RX PPDUs by using a same sending sector (or sending beam). The plurality of first BRP TX/RX PPDUs are used by the second device to evaluate the variation of the CSI from the first device to the second device. In other words, each time after receiving a first BRP TX/RX PPDU, the second device measures a CSI value by using a TRN field included in the first BRP TX/RX PPDU. When the second device receives, by using a same receiving beam/receiving sector, first BRP TX/RX PPDUs of the number of sweep cycles that is indicated by the number of beam sweep cycles field in the first MIMO BF setup frame, the second device starts to calculate a CSI difference. If the CSI difference calculated by the second device is greater than the CSI variation threshold, it indicates that there is a moving target in this receiving sector sweep area, and the second device can record this sending/receiving sector in this case. It should be understood that the CSI difference in this application indicates a variation of CSI.

It should be further understood that, that the second device receives the first BRP TX/RX PPDUs in the sector sweep manner may be understood as follows: In a period, the second device directionally receives the first BRP TX/RX PPDU by using a same DMG antenna or DMG antenna set each time by using a beam/sector of a specific width.

Optionally, after step S206, if a responder SMBT procedure exists, the MIMO phase in the MIMO beamforming-based sensing method further includes step S207 to step S210.

S207: The second device sends a plurality of second BRP TX/RX PPDUs, where the plurality of second BRP TX/RX PPDUs are used to evaluate the variation of the CSI from the second device to the first device.

S208: The first device receives the plurality of second BRP TX/RX PPDUs, and evaluates the variation of the CSI from the second device to the first device based on the plurality of second BRP TX/RX PPDUs that are received.

Optionally, in the responder SMBT procedure, the second device sends the second BRP TX/RX PPDUs in a sector sweep manner. Each time interval between second BRP-RX/TX PPDUs should be SIFS. The first device further receives the second BRP TX/RX PPDUs in a sector sweep manner. The second device compares, based on an indication of the second MIMO BF setup frame in the SU MIMO BF setup procedure, variations of CSI values obtained when sweep is performed by using a same sending/receiving sector/beam for a plurality of times, to determine whether there is a moving target in this sector/beam sweep area. The first device records a sending/receiving sector/beam of a swept area in which there is a moving target. It should be understood that, that the second device sends the second BRP TX/RX PPDUs in the sector sweep manner may be understood as follows: In a period, the second device directionally sends the second BRP TX/RX PPDU by using a same DMG antenna or DMG antenna set each time by using a beam/sector of a specific width, and a DMG antenna ID field and a BRP CDOWN field are set in the second BRP TX/RX PPDU. A number of beam sweep cycles of the receive device (herein indicating the first device or the initiator) in the responder SMBT procedure is indicated by the number of beam sweep cycles field in the second MIMO BF setup frame. In this embodiment of this application, sweeping needs to be performed at least twice by using all sectors/beams of a same DMG antenna or DMG antenna set. Therefore, the second device sends a plurality of second BRP TX/RX PPDUs by using a same sending sector (or sending beam). The plurality of second BRP TX/RX PPDUs are used by the first device to evaluate the variation of the CSI from the second device to the first device. In other words, each time after receiving a second BRP TX/RX PPDU, the first device measures a CSI value by using a TRN field included in the second BRP TX/RX PPDU. When the first device receives, by using a same receiving beam/receiving sector, second BRP TX/RX PPDUs of the number of sweep cycles that is indicated by the number of beam sweep cycles field in the second MIMO BF setup frame, the first device starts to calculate a CSI difference. If the CSI difference calculated by the first device is greater than the CSI variation threshold, it indicates that there is a moving target in this receiving sector sweep area, and the first device can record this sending/receiving sector in this case. It should be understood that the CSI difference in this application indicates a variation of CSI.

It should be further understood that, that the first device receives the second BRP TX/RX PPDUs in the sector sweep manner may be understood as follows: In a period, the first device directionally receives the second BRP TX/RX PPDU by using a same DMG antenna or DMG antenna set each time by using a beam/sector of a specific width.

S209: The first device sends a second MIMO BF feedback frame carrying a fourth sector information list, where the fourth sector information list is used to feed back a sending sector in one or more sending and receiving sector pairs whose variation of the CSI from the second device to the first device is greater than a CSI variation threshold.

S210: The second device receives the second MIMO BF feedback frame carrying the fourth sector information list.

Optionally, in the SU MIMO BF feedback procedure, the first device sends the second MIMO BF feedback frame carrying the fourth sector information list to the second device. To feed back a complete sensing result without affecting a communication feedback result, an element field is added based on a frame format of an original MIMO BF feedback frame to carry the fourth sector information list. An element identifier of the added element field may be a reserved value, for example, 8. In this application, the added element is referred to as a sensing measurement feedback element (Sensing Measurement feedback element). It should be understood that the added element may have another name. This is not limited in this application. The fourth sector information list is used to feed back a sending sector in one or more sending and receiving sector pairs whose variation of the CSI from the second device to the first device is greater than the CSI variation threshold. In other words, the responder SMBT procedure is used to train an optimal uplink sending and receiving sector pair for sensing of the receive device and the transmit device. However, because a receive device only needs to know an optimal receiving sector of the receive device and to perform receiving by using the optimal receiving sector in a subsequent application process, and does not need to notify the transmit device of the optimal receiving sector, the fourth sector information list only needs to feed back a sending sector in an optimal sending and receiving sector pair. It should be understood that the sending sector fed back in the fourth sector information list may be different from or the same as the sending sector fed back in the second sector information list. In other words, sending sectors fed back in the SISO phase and the MIMO phase may be different or the same.

Optionally, the fourth sector information list includes a plurality of groups of fourth sector identifiers, and one group of fourth sector identifiers is used to identify a sending sector in a sending and receiving sector pair whose variation of the CSI from the second device to the first device is greater than the CSI variation threshold. One group of fourth sector identifiers includes one AWV Feedback ID and one TX Antenna ID. A sending sector determined by an AWV feedback ID and a TX antenna ID in one group of fourth sector identifiers and a BRP CDOWN value corresponding to the AWV feedback ID in the sensing measurement feedback element is a sending sector that is in all sending sectors of the second device and in which a CSI difference between any two CSI measurements on a same sending sector is greater than the CSI variation threshold. In other words, the sensing measurement feedback element includes the fourth sector information list and a BRP CDOWN value corresponding to each AWV Feedback ID.

The AWV feedback ID herein may be jointly calculated based on an index of a TRN in a first BRP TX/RX PPDU (the index index is not explicitly carried in the first BRP TX/RX PPDU, but when receiving the TRN, the receive device knows which TRN the TRN received by the receive device is) and a BRP CDOWN value (explicitly carried in the first BRP TX/RX PPDU). For a specific calculation manner, refer to descriptions in the 802.11ay standard. Details are not described herein.

Optionally, the group of fourth sector identifiers may further include a receive antenna identifier (RX Antenna ID), to indicate a receiving antenna. In this application, the RX antenna ID included in the fourth sector information list is a reserved bit or is not used.

Optionally, an element identifier of the sensing measurement feedback element (Sensing Measurement feedback element) may be a reserved value, for example, 8. It should be understood that the 802.11ay standard defines elements whose element identifiers (element IDs) are 0 to 7 in the MIMO BF feedback frame. Based on this, in this embodiment of this application, a sensing measurement feedback element whose element identifier is 8 is defined, as shown in Table 6 below. A frame format of the sensing measurement feedback element whose element identifier is 8 is shown in Table 5 above. Details are not described herein again.

TABLE 6

New MIMO BF feedback frame action field format (New MIMO Feedback frame Action field format)

| Order | Information |
| --- | --- |
| 1 | Category |
| 2 | Unprotected DMG action |

TABLE 6-continued

New MIMO BF feedback frame action field format (New MIMO Feedback frame Action field format)

| Order | Information |
| --- | --- |
| 3 | Dialog token |
| 4 | MIMO feedback control element |
| 5 | Zero or more Channel Measurement Feedback elements |
| 6 | Zero or more EDMG Channel Measurement Feedback elements |
| 7 | Zero or more digital BF feedback elements |
| 8 | Zero or more Sensing Measurement feedback elements |

S211: The second device sends a first MIMO BF feedback frame carrying a third sector information list, where the third sector information list is used to feed back a sending sector in one or more sending and receiving sector pairs whose variation of the CSI from the first device to the second device is greater than the CSI variation threshold.

S212: The first device receives the first MIMO BF feedback frame carrying the third sector information list.

Optionally, in the SU MIMO BF feedback procedure, the second device needs to send the first MIMO BF feedback frame carrying the third sector information list to the first device. To feed back a complete sensing result without affecting a communication feedback result, an element field is added based on a frame format of an original MIMO BF feedback frame to carry the third sector information list. An element identifier of the added element field may be a reserved value, for example, 8. In this application, the added element is referred to as a sensing measurement feedback element (Sensing Measurement feedback element). It should be understood that the added element may have another name. This is not limited in this application. The third sector information list is used to feed back a sending sector in one or more sending and receiving sector pairs whose variation of the CSI from the first device to the second device is greater than the CSI variation threshold. In other words, the initiator SMBT procedure is used to train an optimal downlink sending and receiving sector pair for sensing of the receive device and the transmit device. However, because a receive device only needs to know an optimal receiving sector of the receive device and to perform receiving by using the optimal receiving sector in a subsequent application process, and does not need to notify the transmit device of the optimal receiving sector, the third sector information list only needs to feed back a sending sector in an optimal sending and receiving sector pair. It should be understood that the sending sector fed back in the third sector information list may be different from or the same as the sending sector fed back in the first sector information list.

It can be learned that this embodiment of this application combines WLAN sensing and the SISO phase and the MIMO phase of SU MIMO beamforming training, and can implement sensing of the transmit device and the receive device and training on an optimal sending/receiving beam for sensing of the transmit device and the receive device in addition to original SU MIMO beamforming training, with no need to specially design a related process for sensing and training on the beam for sensing, so that overheads are low, and compatibility is good.

Optionally, the third sector information list includes a plurality of groups of third sector identifiers, and one group of third sector identifiers is used to identify a sending sector in a sending and receiving sector pair whose variation of the CSI from the second device to the first device is greater than the CSI variation threshold. One group of third sector identifiers includes one AWV Feedback ID and one TX Antenna ID. A sending sector determined by an AWV feedback ID and a TX antenna ID in one group of third sector identifiers and a BRP CDOWN value corresponding to the AWV feedback ID in the sensing measurement feedback element is a sending sector that is in all sending sectors of the first device and in which a CSI difference between any two CSI measurements on a same sending sector is greater than the CSI variation threshold. In other words, the sensing measurement feedback element includes the third sector information list and a BRP CDOWN value corresponding to each AWV Feedback ID.

The AWV feedback ID herein may be jointly calculated based on an index of a TRN in a first BRP-TX PPDU (the index index is not explicitly carried in the first BRP-TX PPDU, but when receiving the TRN, the receive device knows which TRN the TRN received by the receive device is) and a BRP CDOWN value (explicitly carried in the first BRP-TX PPDU). For a specific calculation manner, refer to descriptions in the 802.11ay standard. Details are not described herein.

Optionally, the group of third sector identifiers may further include a receive antenna identifier (RX Antenna ID), to indicate a receiving antenna. In this application, the RX antenna ID included in the third sector information list is a reserved bit or is not used.

Optionally, an element identifier of the sensing measurement feedback element (Sensing Measurement feedback element) may be a reserved value, for example, 8. It should be understood that the 802.11ay standard defines MIMO BF feedback frame behavior field formats whose element identifiers (element IDs) are from 0 to 7. Based on this, in this embodiment of this application, a MIMO BF feedback frame behavior field format whose element identifier is 8 is added, as shown in Table 6 above. Details are not described herein again. A frame format of the sensing measurement feedback element indicated by an element identifier of 8 is shown in Table 5 above. Details are not described herein again.

It can be learned that this embodiment of this application combines WLAN sensing and the SISO phase and the MIMO phase of SU MIMO beamforming training. A frame format of a related frame of the SISO phase and the MIMO phase is modified, and whether there is a moving target in an area is determined by using a variation of a CSI value obtained when sweep is performed by using a same beam for a plurality of times. This can implement sensing of the transmit device and the receive device and training on an optimal sending/receiving beam for sensing of the transmit device and the receive device in addition to original SU MIMO beamforming training, with no need to specially design a related process for sensing and training on the beam for sensing, so that overheads are low, and compatibility is good. In addition, this can provide a basis for subsequent WLAN sensing application.

To better understand a MIMO phase process of the method shown in FIG. 10A and FIG. 10B, the following uses an example for description.

In an example, as shown in FIG. 4, in the SU MIMO BF setup procedure, the initiator first sends the MIMO BF setup frame, and adds a sensing measurement field and a MIMO FBCK-REQ extension field by using a reserved bit in the MIMO setup control element in the MIMO BF setup frame. For a frame format of the MIMO setup control element, refer to the foregoing descriptions (FIG. 11A and FIG. 11B). Details are not described herein again. When a sensing measurement bit is set to 1, it indicates that a sensing operation needs to be performed in the current MIMO phase, and specific indication information is indicated by the MIMO FBCK-REQ extension field.

Then, in the initiator/responder SMBT procedure, the initiator and the responder send a BRP TX/RX PPDU based on an indication in the MIMO BF setup frame sent in the SU MIMO BF setup procedure.

Finally, in the SU MIMO BF feedback procedure, the initiator and the responder each send a MIMO BF feedback frame to feed back a result. To feed back a complete sensing result without affecting a communication feedback result, a subelement (subelement), that is, a sensing measurement feedback element, is added to the MIMO BF feedback frame, as shown in Table 5. Details are not described herein again.

Embodiment 2

Embodiment 2 of this application is designed for a MU MIMO BF process, and the MU MIMO BF process can implement beam training only in a downlink direction. In this architecture, an ambient environment is swept by using a beam training mode in which a short SSW frame is sent, to determine whether there is a moving target in the ambient environment. Embodiment 2 of this application mainly describes how to design a related frame format in a DL MU MIMO beamforming-based training process to implement both MU MIMO communication beam training and WLAN sensing.

It should be understood that the MIMO beamforming-based sensing method provided in this embodiment of this application includes two phases: a SISO phase and a MIMO phase. The SISO phase includes two procedures: an initiator TXSS procedure and a SISO feedback procedure. The MIMO phase includes four procedures: an MU MIMO BF setup procedure, an MU MIMO BF training procedure, an MU MIMO BF feedback procedure, and an MU MIMO BF selection procedure. This embodiment of this application does not relate to the MU MIMO BF selection procedure. Therefore, the MU MIMO BF selection procedure is not described in this embodiment of this application. For specific implementation, refer to descriptions in the 802.11ay standard.

Figure 12:
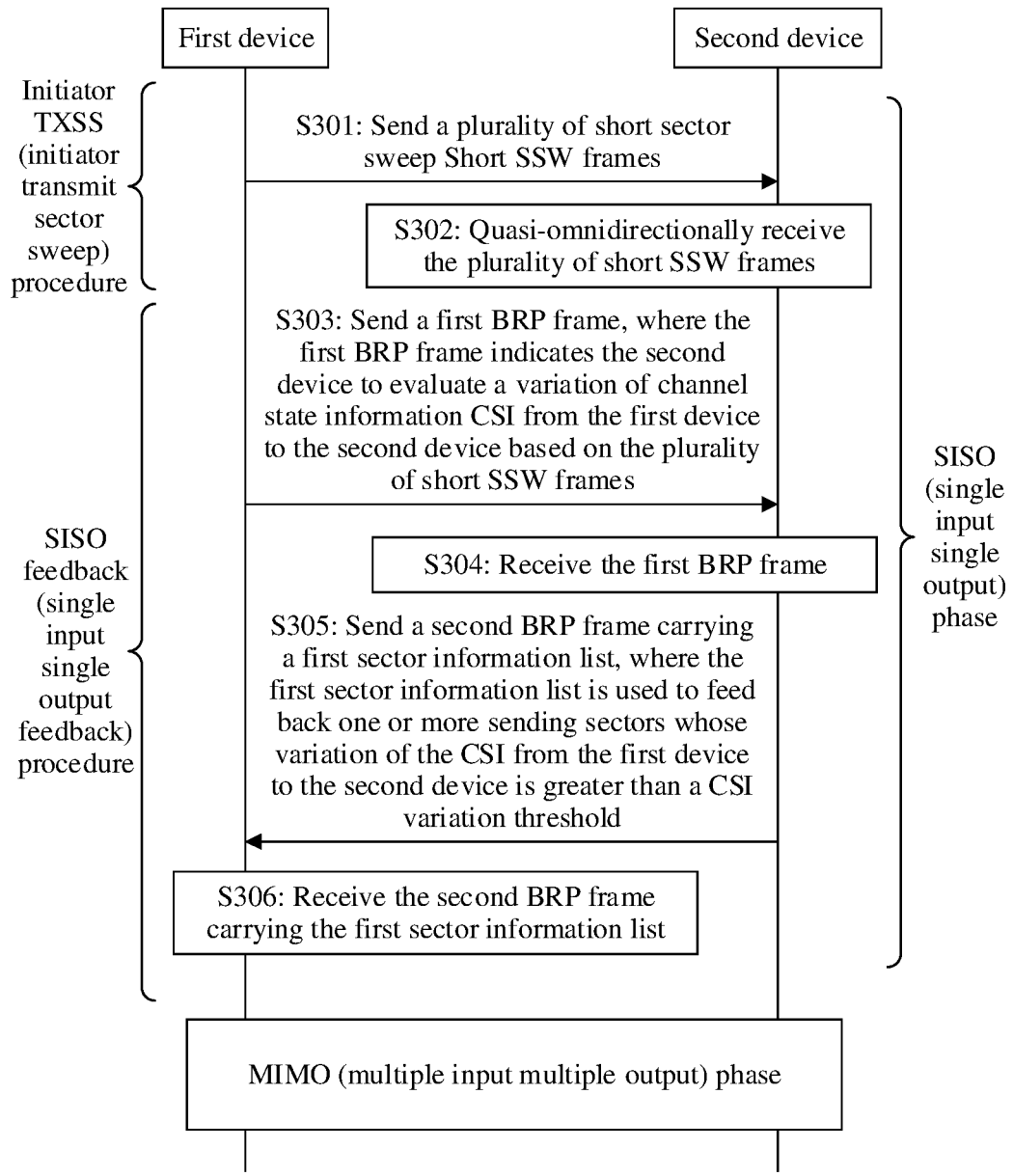
FIG. 12 is another schematic flowchart of a MIMO beamforming-based sensing method according to an embodiment of this application.

FIG. 12 is another schematic flowchart of the MIMO beamforming-based sensing method according to this embodiment of this application. As shown in FIG. 12, the initiator TXSS procedure includes step S301 and step S302, and the SISO feedback procedure includes step S303 to step S306. The MIMO beamforming-based sensing method in FIG. 12 includes but is not limited to the following steps.

S301: A first device sends a plurality of short sector sweep Short SSW frames.

S302: A second device quasi-omnidirectionally receives the plurality of short SSW frames.

Optionally, in the initiator TXSS procedure, the first device sends the short SSW frame in a sector sweep manner, and the second device quasi-omnidirectionally receives the short SSW frame. It should be understood that, that the first device sends the short SSW frame in the sector sweep manner may be understood as follows: In a period, the first device directionally sends the short SSW frame by using a same DMG antenna or DMG antenna set each time by using a beam/sector of a specific width. The short SSW frame includes a radio frequency link identifier and a CDOWN value. The radio frequency link identifier indicates an antenna identifier of a sending beam, and the CDOWN value is used to determine a sector identifier of the sending beam.

Sweeping needs to be performed at least twice by using all sectors/beams of a same DMG antenna or DMG antenna set. Therefore, the first device sends a plurality of short SSW frames by using a same sending sector (or sending beam). In other words, in the initiator TXSS procedure, if the initiator is intended to perform sensing to measure an ambient environment, the short SSW frame needs to be sent at least twice in a same sector direction/beam direction. In other words, the initiator TXSS procedure in the 802.11ay standard needs to be repeatedly performed twice or more.

It should be further understood that, that the second device quasi-omnidirectionally receives the short SSW frame may be understood as that the second device uses a same DMG antenna or DMG antenna set when receiving all short SSW frames in a period. In other words, for all short SSW frames in a period, the second device performs quasi-omnidirectional reception by using a same antenna or a same antenna set.

S303: The first device sends a first BRP frame, where the first BRP frame indicates the second device to evaluate a variation of channel state information CSI from the first device to the second device based on the plurality of short SSW frames.

S304: The second device receives the first BRP frame.

Optionally, if the initiator TXSS procedure exists, the SISO feedback procedure is performed after the initiator TXSS procedure and after MBIFS. In the SISO feedback procedure, the first device sends the first BRP frame to poll measurement results of all second devices (or responders) in a multiple user group (MU Group). The first BRP frame indicates the second device to evaluate the variation of the CSI from the first device to the second device based on the plurality of short SSW frames that are received. Correspondingly, the second device receives the first BRP frame, and compares, based on an indication of the first BRP frame and by using the plurality of received short SSW frames, variations of CSI values obtained when the first device performs sweep by using a same sending sector/beam for a plurality of times, to determine whether there is a moving target in this sector/beam sweep area.

Optionally, the first BRP frame includes a directional multi-gigabit (directional multi-gigabit, DMG) beam refinement element, and an element identifier of the DMG beam refinement element (DMG Beam Refinement element) is 5. The DMG beam refinement element includes a CSI variation calculation (CSI Variation Calculation) field and a target sector identifier order requested (Target Sector ID Order Requested) field. The CSI variation calculation field indicates whether the second device calculates a CSI difference. When the CSI variation calculation field is set to a first value, it indicates the second device to calculate the CSI difference. When the CSI variation calculation field is set to a second value, it indicates the second device not to calculate the CSI difference. In this embodiment of this application, the CSI variation calculation field in the first BRP frame is set to the first value. The target sector identifier order requested field is set to the first value, to indicate the second device to feed back an evaluation result/a target sector identifier order subfield. In other words, when the target sector identifier order requested field is set to the first value, it indicates that the target sector ID order subfield is used as a part of a sensing measurement feedback element returned by the second device. The first value may be 1, and the second value is 0. Alternatively, the first value is 0, and the second value is 1.

Optionally, the DMG beam refinement element further includes one or more of the following fields: a CSI variation threshold field and an evaluation algorithm field. The CSI variation threshold field indicates the CSI variation threshold, that is, a variation of the CSI indicating that there is a moving target. If a CSI difference between CSI values measured for a plurality of times by using a same sending beam/sector is greater than the CSI variation threshold, it indicates that there is a moving target in this beam sweep area. On the contrary, if a CSI difference between CSI values measured for a plurality of times by using a same sending beam/sector is less than or equal to the CSI variation threshold, it indicates that there is no moving target in this beam sweep area. The evaluation algorithm field indicates an evaluation algorithm of the CSI. The evaluation algorithm is used to evaluate (or calculate) a CSI value.

Figure 13B:
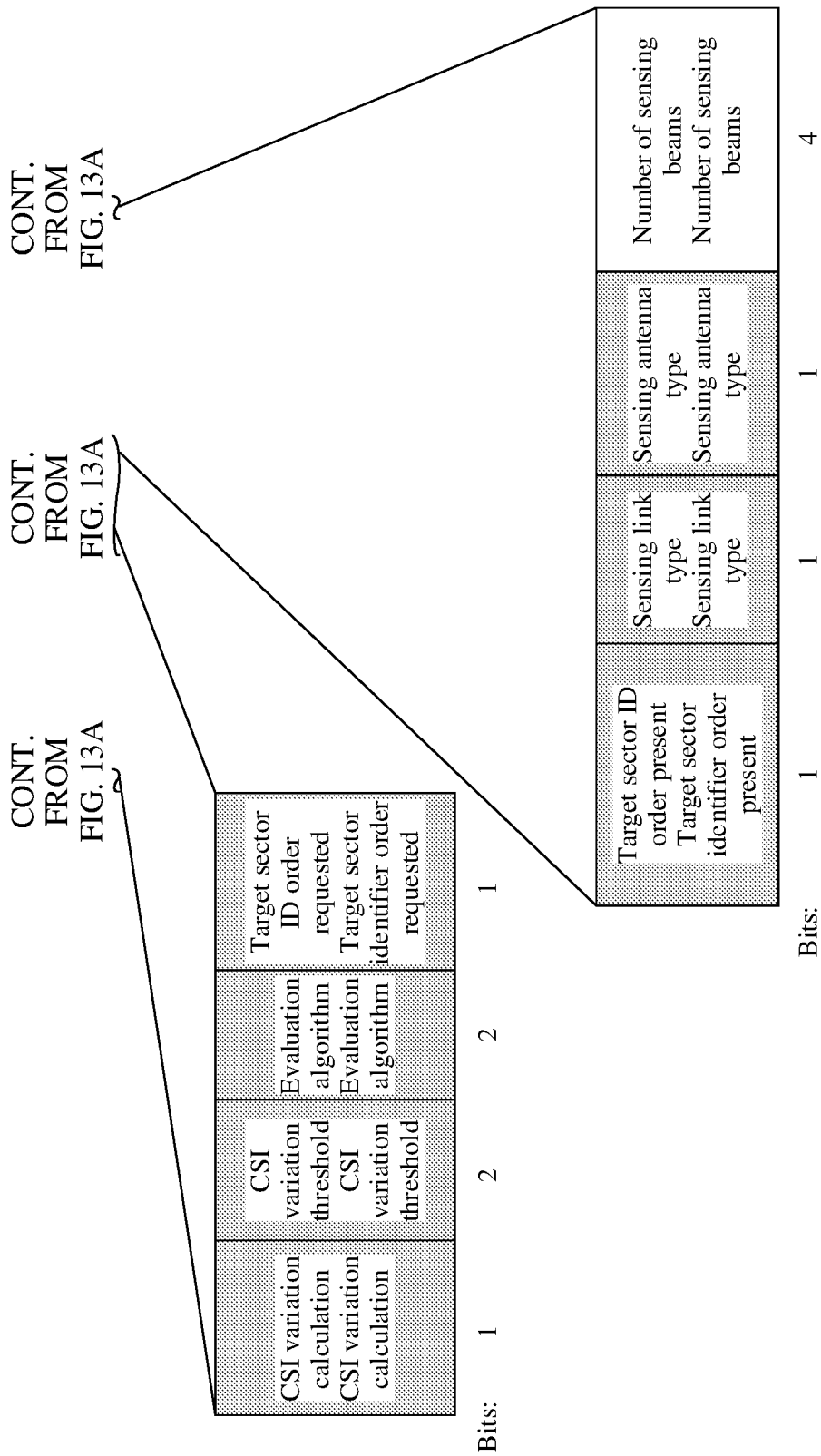

FIG. 13A and FIG. 13B are a schematic diagram of a frame format of the DMG beam refinement element according to this embodiment of this application. As shown in FIG. 13A and FIG. 13B, the DMG beam refinement element includes a sensing feedback request (sensing FBCK-REQ) field and a sensing feedback type (Sensing FBCK-TYPE) field. The sensing feedback request (sensing FBCK-REQ) field includes a CSI variation calculation (CSI Variation Calculation) field, a CSI variation threshold (CSI Variation Threshold) field, an evaluation algorithm (Evaluation algorithm) field, and a target sector identifier order requested (Target Sector ID Order Requested) field. Both the CSI variation calculation field and the target sector ID order requested field each are set to 1, respectively indicating that the second device calculates a CSI difference and feeds back a target sector identifier order subfield (or the target sector ID order subfield is used as a part of a sensing measurement feedback element returned by the second device). The sensing feedback type (Sensing FBCK-TYPE) field includes a target sector identifier order present (Target Sector ID Order Present) field, a sensing link type (Sensing Link Type) field, a sensing antenna type (Sensing Antenna Type) field, and a number of sensing beams (Number of Sensing Beams) field. When the target sector ID order present field is set to 1, it indicates that the second device feeds back a target sector identifier order subfield (or the target sector ID order subfield is used as a part of a sensing measurement feedback element returned by the second device). Otherwise, the target sector ID order present field is set to 0. The sensing link type field is set to 0 to indicate an initiator link, or set to 1 to indicate a responder link. The sensing antenna type field is set to 0 to indicate a transmitting antenna configuration, or set to 1 to indicate a receiving antenna configuration. The number of sensing beams field is a reserved bit or is not used in the SISO phase.

It should be understood that in the first BRP frame, both the CSI variation calculation field and the target sector ID order requested field each are set to 1, and the sensing FBCK-TYPE field is set to 0.

It should be further understood that each field included in the DMG beam refinement element in FIG. 13A and FIG. 13B may further have another name. This is not limited in this embodiment of this application. Alternatively, the DMG beam refinement element in FIG. 13A and FIG. 13B may not include a number of sensing beams field.

S305: The second device sends a second BRP frame carrying a first sector information list, where the first sector information list is used to feed back one or more sending sectors whose variation of the CSI from the first device to the second device is greater than a CSI variation threshold.

S306: The first device receives the second BRP frame carrying the first sector information list.

Optionally, the second device sends the second BRP frame carrying the first sector information list to the first device, and adds an element field based on a frame format of an original BRP frame to carry the first sector information list. An element identifier of the added element field may be a reserved value, for example, 13. In this application, the added element is referred to as a sensing measurement feedback element (Sensing Measurement feedback element). It should be understood that the added element may have another name. This is not limited in this application. The first sector information list is used to feed back one or more sending sectors whose variation of the CSI from the first device to the second device is greater than the CSI variation threshold. In other words, the SISO phase of the MU MIMO BF is used to collect one or more optimal sending beams suitable for sensing of the initiator between the initiator and each responder in the MU group.

Optionally, the first sector information list includes a plurality of groups of first sector identifiers, and one group of first sector identifiers includes one down counter (Down counter, CDOWN) value and one transmit antenna identifier (TX Antenna ID). A sending sector jointly determined by a CDOWN value and a TX antenna ID in one group of first sector identifiers is a sending sector that is in all sending sectors of the first device and in which a CSI difference between any two CSI measurements on a same sending sector is greater than the CSI variation threshold.

Optionally, the group of first sector identifiers may further include a receive antenna identifier (RX Antenna ID), to indicate a receiving antenna. In this application, the RX antenna ID included in the first sector information list is a reserved bit or is not used.

Optionally, an element identifier of the sensing measurement feedback element (Sensing Measurement feedback element) may be a reserved value, for example, 13. It should be understood that the 802.11ay standard defines elements whose element identifiers (element IDs) are 0 to 11. Based on this, in this embodiment of this application, a sensing measurement feedback element whose element identifier is 13 is defined. The sensing measurement feedback element whose element identifier is 13 is located in the second BRP frame, and a frame format of the sensing measurement feedback element is shown in Table 5 above. Details are not described herein again. It should be understood that the sensing measurement feedback element whose element identifier is 13 in the second BRP frame may not include a sensing BRP CDOWN field, or the sensing BRP CDOWN field is reserved or not used in this case.

Optionally, the second BRP frame further includes a DMG beam refinement element, and a CSI variation calculation field and a target sector identifier order requested field in the DMG beam refinement element are set to 0. A CSI variation threshold field and an evaluation algorithm field are also set to 0, indicating reserved. In other words, a sensing feedback request (sensing FBCK-REQ) field in the DMG beam refinement element in the second BRP frame is set to 0.

Optionally, a target sector identifier order present (Target Sector ID Order Present) field of the DMG beam refinement element in the second BRP frame is set to the first value (for example, 1), to indicate that the sensing measurement feedback element in the second BRP frame includes a target sector identifier order subfield, or that the target sector ID order subfield is used as a part of the returned sensing measurement feedback element.

Optionally, a frame format of the DMG beam refinement element is shown in FIG. 13A and FIG. 13B. Details are not described herein again.

It can be learned that in this embodiment of this application, WLAN sensing is introduced in the SISO phase of MU MIMO beamforming training. A frame format of the BRP frame in a SISO feedback procedure is modified, and whether there is a moving target in an area is determined by using a variation of a CSI value obtained when sweep is performed by using a same beam for a plurality of times. This can implement sensing and training on a sending/receiving beam for sensing in addition to MU MIMO beamforming training, with no need to specially design a related process for sensing and training on the sending/receiving beam for sensing, so that overheads are low, and compatibility is good.

To better understand a SISO phase process of the method shown in FIG. 12, the following uses an example for description.

Figure 14:
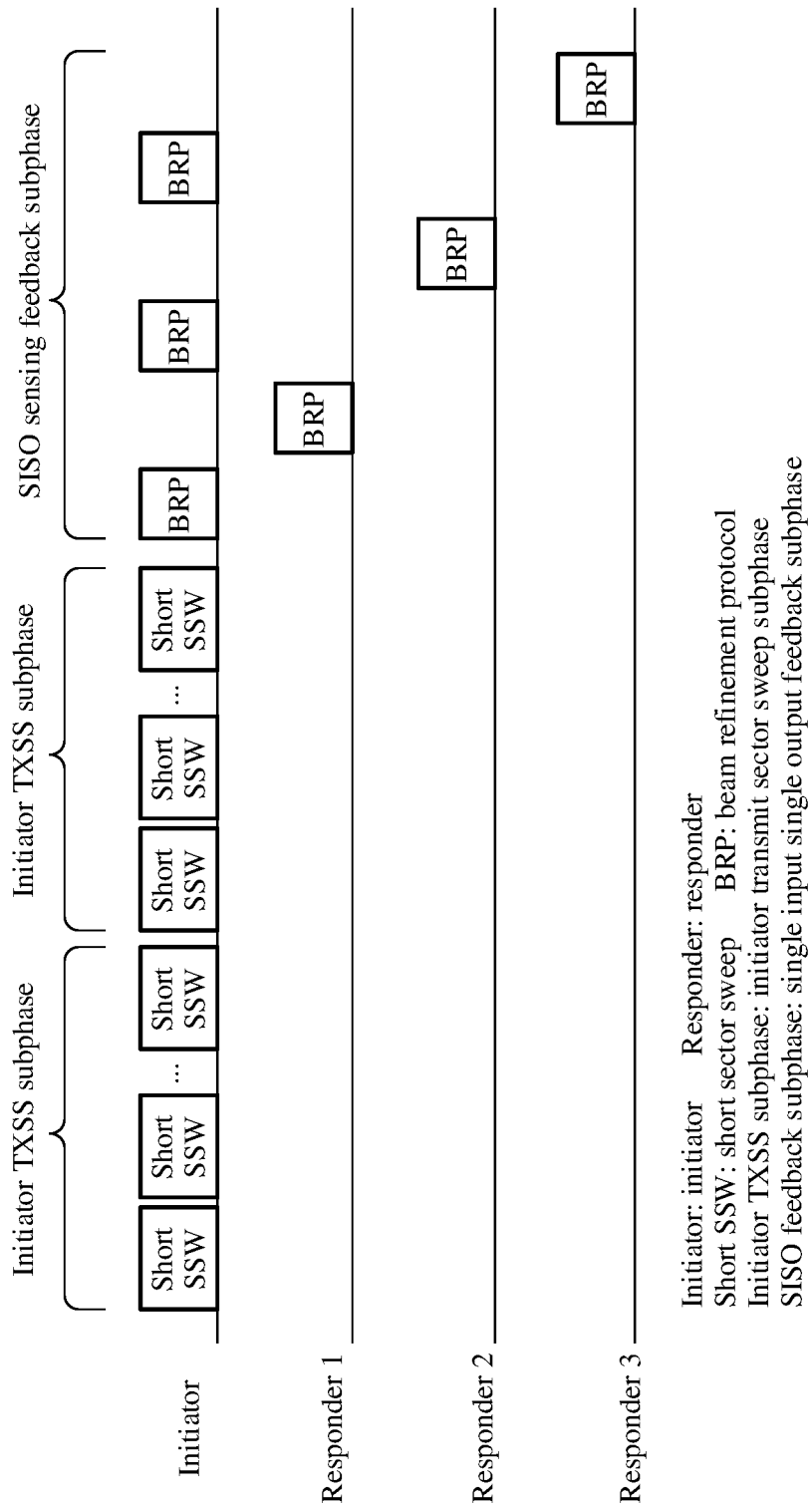
FIG. 14 is a schematic diagram of a time sequence of a SISO phase in MU MIMO BF according to an embodiment of this application.

In an example, FIG. 14 is a schematic diagram of a time sequence of the SISO phase in MU MIMO BF according to this embodiment of this application. As shown in FIG. 14, in the initiator TXSS procedure, different from communication, if an initiator is intended to perform sensing to measure an ambient environment, a short SSW frame needs to be repeatedly sent at least twice in a same beam direction. In other words, the initiator TXSS procedure in FIG. 14 needs to be repeatedly performed twice or more.

In a SISO sensing feedback procedure, the initiator sends a BRP frame including a DMG beam refinement element to poll sensing results of all responders. Values of some fields in the DMG beam refinement element sent by the initiator to the responder need to be specified. When the initiator sends the DMG beam refinement element to poll measurement results of the responders, both CSI measurement requested and target sector ID order requested in a sensing FBCK-REQ field of the DMG beam refinement element should be set to 1, and all subfields in a sensing FBCK-TYPE field should be set to 0. For a frame format of the DMG beam refinement element, refer to the foregoing descriptions (FIG. 13A and FIG. 13B). Details are not described herein again.

The responder sends a BRP frame including a DMG beam refinement element and a sensing measurement feedback element to feedback a sensing result to the initiator. Values of some fields in the DMG beam refinement element sent by the responder to the initiator need to be specified. When the responder sends a DMG beam refinement element, a sensing FBCK-REQ field in the DMG beam refinement element should be set to 0, target sector ID order present in the sensing FBCK-TYPE field needs to be set to 1.

It should be understood that, in the method shown in this embodiment of this application, compared with a process of the SISO phase of MU MIMO BF in the 802.11ay standard, the initiator TXSS procedure is repeatedly performed at least twice, to ensure that two CSI values can be measured by using a same sector.

After the step S306, the MIMO beamforming-based sensing method provided in this embodiment of this application further includes the MIMO phase. The following describes in detail the MIMO phase of the MIMO beamforming-based sensing method provided in this embodiment of this application.

In an implementation, the MIMO phase in the method shown in FIG. 12 may be the same as a MIMO phase of MU MIMO beamforming training in the 802.11ay standard. For a specific procedure and a related frame format, refer to descriptions in the 802.11ay standard. Details are not described herein again. In other words, the MIMO beamforming-based sensing method provided in this embodiment of this application is applied only to the SISO phase of MU MIMO beamforming training, and the MIMO phase of the MU MIMO beamforming training does not change. To be specific, according to the MIMO beamforming-based sensing method provided in this embodiment of this application, optimal sending and receiving beams of both a transmit device and a receive device (the initiator and the responder) in a sensing scenario can be obtained, but an optimal sending and receiving beam pair of both the transmit device and the receive device (the initiator and the responder) in the sensing scenario cannot be obtained.

In another implementation, an interaction process in the MIMO phase in the method shown in FIG. 12 is the same as an interaction process in the MIMO phase of MU MIMO beamforming training in the 802.11ay standard, and frame formats are different. The following describes the MIMO phase in FIG. 12 in detail.

Figure 15:
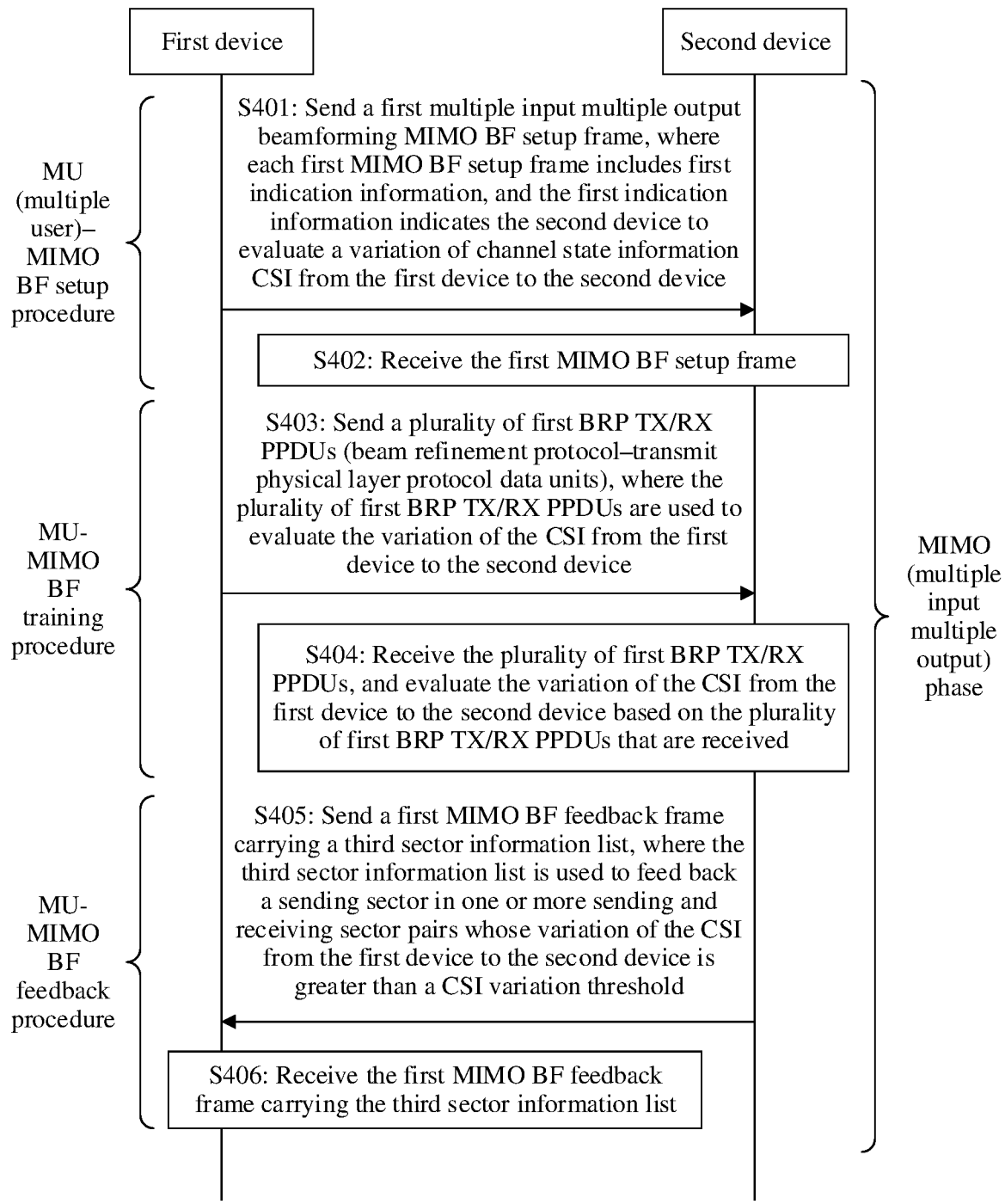
FIG. 15 is another schematic flowchart of a MIMO phase in a MIMO beamforming-based sensing method according to an embodiment of this application.

FIG. 15 is another schematic flowchart of the MIMO phase in the MIMO beamforming-based sensing method according to this embodiment of this application. The MU MIMO BF setup procedure includes step S401 and step S402, the MU MIMO BF training procedure includes step S403 and step S404, and the MU MIMO BF feedback procedure includes step S405 and step S406. The MIMO phase in the MIMO beamforming-based sensing method shown in FIG. 15 includes but is not limited to the following steps.

S401: The first device sends a first multiple input multiple output beamforming MIMO BF setup frame, where each first MIMO BF setup frame includes first indication information, and the first indication information indicates the second device to evaluate the variation of the CSI from the first device to the second device.

S402: The second device receives the first MIMO BF setup frame.

Optionally, in the MU MIMO BF setup procedure, the first device sends the first MIMO BF setup frame to each second device (each responder), and sends a plurality of first MIMO BF setup frames in total. The first MIMO BF setup frame includes first indication information, and the first indication information indicates the second device to evaluate the variation of the CSI from the first device to the second device in the MU MIMO BF training procedure. In other words, the first indication information indicates that a sensing operation needs to be performed in the current MIMO phase and specific sensing operation information. Correspondingly, the second device receives a first MIMO BF setup frame that belongs to the second device.

Optionally, the first indication information is carried by using a reserved bit in a MIMO setup control element (MIMO Setup Control element) in the MIMO BF setup frame. The first indication information indicates a peer device (herein indicating the second device or the responder) to evaluate the variation of the CSI from the first device to the second device in the MU MIMO BF training procedure. In other words, the first MIMO BF setup frame in this embodiment of this application additionally has first indication information compared with a MIMO BF setup frame sent by an initiator in the 802.11ay standard.

Optionally, the first indication information includes a number of beam sweep cycles field, indicating a number of sweep cycles of a receiving beam in the MU-MIMO BF training procedure. When the receive device (herein indicating the second device or the responder) receives BRP TX/RX PPDUs of the number of sweep cycles by using a same receiving beam/receiving sector, the receive device (herein indicating the second device or the responder) starts to calculate a CSI difference. The first indication information further includes one or more of the following fields: an evaluation algorithm field and a CSI variation threshold field. The evaluation algorithm field indicates an evaluation algorithm of the CSI, and the CSI variation threshold field indicates the CSI variation threshold. It should be understood that the evaluation algorithm of the CSI is used to calculate a CSI value, and the CSI variation threshold is used to compare with a variation of a CSI value measured when a same location is swept by using a same beam/sector for a plurality of times, to determine whether there is a moving target (target) in this beam scanning area.

It should be understood that each field included in the first indication information may further have another name. This is not limited in this embodiment of this application.

Optionally, the first MIMO BF setup frame further includes third indication information, to indicate that the first MIMO BF setup frame includes the first indication information. The third indication information is located in a reserved bit in the MIMO setup control element in the first MIMO BF setup frame.

Optionally, a frame format of the MIMO setup control element is shown in FIG. 11A and FIG. 11B. Details are not described herein again.

S403: The first device sends a plurality of first BRP TX/RX PPDUs, where the plurality of first BRP TX/RX PPDUs are used to evaluate the variation of the CSI from the first device to the second device.

S404: The second device receives the plurality of first BRP TX/RX PPDUs, and evaluates the variation of the CSI from the first device to the second device based on the plurality of first BRP TX/RX PPDUs that are received.

Optionally, in the MU MIMO BF training procedure, for an implementation of step S403 and step S404 in this embodiment of this application, refer to the implementation of step S205 and step S206 in FIG. 10A and FIG. 10B. Details are not described herein again.

S405: The second device sends a first MIMO BF feedback frame carrying a third sector information list, where the third sector information list is used to feed back a sending sector in one or more sending and receiving sector pairs whose variation of the CSI from the first device to the second device is greater than the CSI variation threshold.

S406: The first device receives the first MIMO BF feedback frame carrying the third sector information list.

Optionally, in the MU MIMO BF feedback procedure, the second device needs to send the first MIMO BF feedback frame carrying the third sector information list to the first device. To feed back a complete sensing result without affecting a communication feedback result, an element field is added based on a frame format of an original MIMO BF feedback frame to carry the third sector information list. An element identifier of the added element field may be a reserved value, for example, 8. In this application, the added element is referred to as a sensing measurement feedback element (Sensing Measurement feedback element). It should be understood that the added element may have another name. This is not limited in this application. The third sector information list is used to feed back a sending sector in one or more sending and receiving sector pairs whose variation of the CSI from the first device to the second device is greater than the CSI variation threshold. In other words, the MU MIMO BF training procedure is used to train optimal downlink sending and receiving sector pairs for sensing between an initiator and each responder. However, because a receive device only needs to know an optimal receiving sector of the receive device and to perform receiving by using the optimal receiving sector in a subsequent application process, and does not need to notify the transmit device of the optimal receiving sector, the third sector information list only needs to feed back a sending sector in an optimal sending and receiving sector pair. It should be understood that the sending sector fed back in the third sector information list may be different from or the same as the sending sector fed back in the first sector information list.

Optionally, the third sector information list includes a plurality of groups of third sector identifiers, and one group of third sector identifiers is used to identify a sending sector in a sending and receiving sector pair whose variation of the CSI from the second device to the first device is greater than the CSI variation threshold. One group of third sector identifiers includes one AWV Feedback ID and one TX Antenna ID. A sending sector determined by an AWV feedback ID and a TX antenna ID in one group of third sector identifiers and a BRP CDOWN value corresponding to the AWV feedback ID in the sensing measurement feedback element is a sending sector that is in all sending sectors of the first device and in which a CSI difference between any two CSI measurements on a same sending sector is greater than the CSI variation threshold.

Optionally, the group of third sector identifiers may further include a receive antenna identifier (RX Antenna ID), to indicate a receiving antenna. In this application, the RX antenna ID included in the third sector information list is a reserved bit or is not used.

Optionally, an element identifier of the sensing measurement feedback element (Sensing Measurement feedback element) may be a reserved value, for example, 8. It should be understood that the 802.11ay standard defines MIMO BF feedback frame behavior field formats whose element identifiers (element IDs) are from 0 to 7. Based on this, in this embodiment of this application, a MIMO BF feedback frame behavior field format whose element identifier is 8 is added, as shown in Table 6 above. Details are not described herein again. A frame format of the sensing measurement feedback element indicated by an element identifier of 8 is shown in Table 5 above. Details are not described herein again.

Optionally, before step S405, the first device sends a MIMO BF poll (poll) frame to poll measurement results of all second devices (or responders) in a multiple user group (MU Group). In other words, the initiator sends a MIMO BF poll frame to poll sensing results of all responders.

It can be learned that this embodiment of this application combines WLAN sensing and the SISO phase and the MIMO phase of MU MIMO beamforming training. A frame format of a related frame of the SISO phase and the MIMO phase is modified, and whether there is a moving target in an area is determined by using a variation of a CSI value obtained when sweep is performed by using a same beam for a plurality of times. This can implement sensing of the transmit device and the receive device and training on an optimal sending/receiving beam for sensing of the transmit device and the receive device in addition to original MU MIMO beamforming training, with no need to specially design a related process for sensing and training on the beam for sensing, so that overheads are low, and compatibility is good. In addition, this can provide a basis for subsequent WLAN sensing application.

To better understand a MIMO phase process of the method shown in FIG. 15, the following uses an example for description.

In an example, as shown in FIG. 6, in the MU MIMO BF setup procedure, the initiator first sends the MIMO BF setup frame, and adds a sensing measurement field and a MIMO FBCK-REQ extension field by using a reserved bit in the MIMO setup control element in the MIMO BF setup frame. For a frame format of the MIMO setup control element, refer to the foregoing descriptions (FIG. 11A and FIG. 11B). Details are not described herein again. When a sensing measurement bit is set to 1, it indicates that a sensing operation needs to be performed in the current MIMO phase, and specific indication information is indicated by the MIMO FBCK-REQ extension field.

Then, in the MU MIMO BF training procedure, the initiator sends a BRP TX/RX PPDU based on an indication in the MIMO BF setup frame sent in the MU MIMO BF setup procedure.

Finally, in the MU MIMO BF feedback procedure, the initiator sends a MIMO BF poll frame to poll sensing results of all responders. Each responder sends a MIMO BF feedback frame to feed back the result. To feed back a complete sensing result without affecting a communication feedback result, a subelement (subelement), that is, a sensing measurement feedback element, is added to the MIMO BF feedback frame, as shown in Table 5. Details are not described herein again.

The foregoing content describes in detail the method provided in this application. To better implement the foregoing solutions in embodiments of this application, embodiments of this application further provide corresponding apparatuses or devices.

In embodiments of this application, the first device and the second device may be divided into functional modules based on the foregoing method examples. For example, the functional modules may be obtained through division based on corresponding functions, or two or more functions may be integrated into one processing module. The foregoing integrated module may be implemented in a form of hardware, or may be implemented in a form of a software functional module. It should be noted that, in embodiments of this application, module division is an example, and is merely a logical function division. In actual implementation, another division manner may be used.

Figure 16:
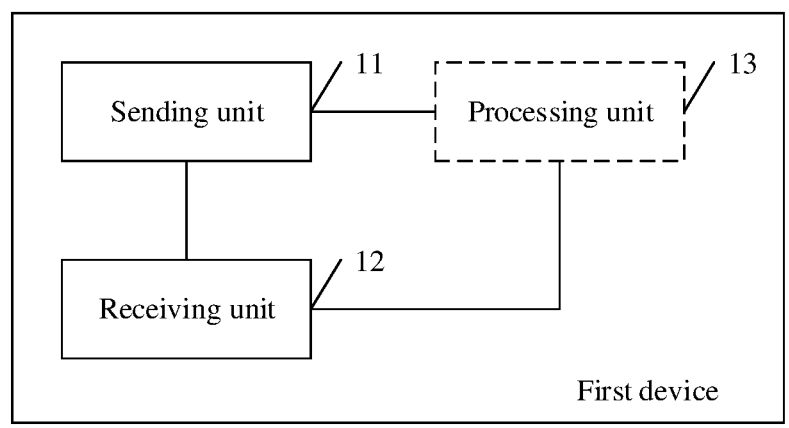
FIG. 16 is a schematic diagram of a structure of a first device according to an embodiment of this application.

When an integrated unit is used, refer to FIG. 16. FIG. 16 is a schematic diagram of a structure of a first device according to an embodiment of this application. As shown in FIG. 16, the first device includes a sending unit 11 and a receiving unit 12.

In a design, the sending unit 11 is configured to send a first beam refinement protocol (beam refinement protocol, BRP) frame, where the first BRP frame indicates a second device to evaluate a variation of channel state information (channel state information, CSI) from the first device to the second device. The sending unit 11 is further configured to send a plurality of first BRP-TX PPDUs, where the plurality of first BRP-TX PPDUs are used to evaluate the variation of the CSI from the first device to the second device. The receiving unit 12 is configured to receive a second BRP frame carrying a first sector information list. The first sector information list is used to feed back one or more sending sectors whose variation of the CSI from the first device to the second device is greater than a CSI variation threshold.

Optionally, the first device further includes a processing unit 13, configured to generate the first BRP frame, and further configured to generate the plurality of first BRP-TX PPDUs.

Optionally, the receiving unit 12 is further configured to receive a third BRP frame, where the third BRP frame indicates the first device to evaluate a variation of CSI from the second device to the first device. The receiving unit 12 is further configured to quasi-omnidirectionally receive a plurality of second BRP-TX PPDUs. The processing unit 13 is further configured to evaluate the variation of the CSI from the second device to the first device based on the plurality of second BRP-TX PPDUs. The sending unit 11 is further configured to send a fourth BRP frame carrying a second sector information list. The second sector information list is used to feed back one or more sending sectors whose variation of the CSI from the second device to the first device is greater than a CSI variation threshold.

Optionally, the processing unit 13 is further configured to generate the fourth BRP frame carrying the second sector information list.

Optionally, the sending unit 11 is further configured to send a first MIMO BF setup frame, where the first MIMO BF setup frame includes first indication information, and the first indication information indicates the second device to evaluate the variation of the CSI from the first device to the second device. The sending unit 11 is further configured to send a plurality of first BRP TX/RX PPDUs, where the plurality of first BRP TX/RX PPDUs are used to evaluate the variation of the CSI from the first device to the second device. The receiving unit 12 is further configured to receive a first MIMO BF feedback frame carrying a third sector information list. The third sector information list is used to feed back a sending sector in one or more sending and receiving sector pairs whose variation of the CSI from the first device to the second device is greater than the CSI variation threshold.

Optionally, the processing unit 13 is further configured to generate the first MIMO BF setup frame. The processing unit 13 is further configured to generate the plurality of first BRP TX/RX PPDUs.

Optionally, the receiving unit 12 is further configured to receive a second MIMO BF setup frame, where the second MIMO BF setup frame includes second indication information, and the second indication information indicates the first device to evaluate the variation of the CSI from the second device to the first device. The receiving unit 12 is further configured to receive a plurality of second BRP TX/RX PPDUs. The processing unit 13 is further configured to evaluate the variation of the CSI from the second device to the first device based on the plurality of second BRP TX/RX PPDUs. The sending unit 11 is further configured to send a second MIMO BF feedback frame carrying a fourth sector information list. The fourth sector information list is used to feed back a sending sector in one or more sending and receiving sector pairs whose variation of the CSI from the second device to the first device is greater than the CSI variation threshold.

Optionally, the processing unit 13 is further configured to generate the second MIMO BF feedback frame carrying the fourth sector information list.

The sending unit 11 and the receiving unit 12 may be integrated into one module, for example, a transceiver module.

It should be understood that the first device in this design may correspondingly perform the foregoing method Embodiment 1, and the foregoing operations or functions of the units in the first device are respectively used to implement corresponding operations in the foregoing method Embodiment 1. For technical effect of the first device, refer to the technical effect in the foregoing Embodiment 1. For brevity, details are not described herein again.

In another design, the sending unit 11 is configured to send a plurality of short sector sweep (sector sweep, SSW) frames. The sending unit 11 is further configured to send a first BRP frame, where the first BRP frame indicates a second device to evaluate a variation of CSI from the first device to the second device based on the plurality of short SSW frames. The receiving unit 12 is configured to receive a second BRP frame carrying a first sector information list. The first sector information list is used to feed back one or more sending sectors whose variation of the CSI from the first device to the second device is greater than a CSI variation threshold.

Optionally, the first device further includes a processing unit 13, configured to generate the plurality of short SSW frames, and further configured to generate the first BRP frame.

Optionally, the sending unit 11 is further configured to send a first MIMO BF setup frame, where the first MIMO BF setup frame includes first indication information, and the first indication information indicates the second device to evaluate the variation of the CSI from the first device to the second device. The sending unit 11 is further configured to send a plurality of first BRP TX/RX PPDUs, where the plurality of first BRP TX/RX PPDUs are used to evaluate the variation of the CSI from the first device to the second device. The receiving unit 12 is further configured to receive a first MIMO BF feedback frame carrying a third sector information list. The third sector information list is used to feed back a sending sector in one or more sending and receiving sector pairs whose variation of the CSI from the first device to the second device is greater than the CSI variation threshold.

Optionally, the processing unit 13 is further configured to generate the first MIMO BF setup frame. The processing unit 13 is further configured to generate the plurality of first BRP TX/RX PPDUs.

The sending unit 11 and the receiving unit 12 may be integrated into one module, for example, a transceiver module.

It should be understood that the first device in this design may correspondingly perform the foregoing method Embodiment 2, and the foregoing operations or functions of the units in the first device are respectively used to implement corresponding operations in the foregoing method Embodiment 2. For technical effect of the first device, refer to the technical effect in the foregoing Embodiment 2. For brevity, details are not described herein again.

Figure 17:
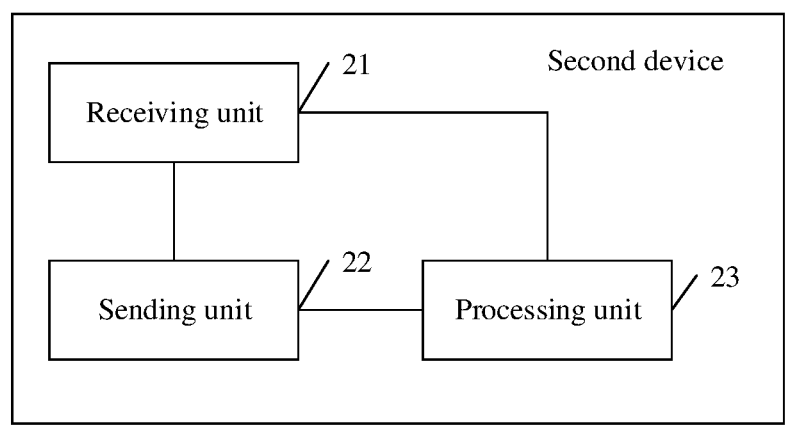
FIG. 17 is a schematic diagram of a structure of a second device according to an embodiment of this application.

FIG. 17 is a schematic diagram of a structure of a second device according to an embodiment of this application. As shown in FIG. 17, the second device includes a receiving unit 21, a sending unit 22, and a processing unit 23.

In a design, the receiving unit 21 is configured to receive a first BRP frame, where the first BRP frame indicates the second device to evaluate a variation of CSI from a first device to the second device. The receiving unit 21 is further configured to quasi-omnidirectionally receive a plurality of first BRP-TX PPDUs. The processing unit 23 is configured to evaluate the variation of the CSI from the first device to the second device based on the plurality of first BRP-TX PPDUs. The sending unit 22 is configured to send a second BRP frame carrying a first sector information list. The first sector information list is used to feed back one or more sending sectors whose variation of the CSI from the first device to the second device is greater than a CSI variation threshold.

Optionally, the processing unit 23 is further configured to generate the second BRP frame carrying the first sector information list.

Optionally, the sending unit 22 is further configured to send a third BRP frame, where the third BRP frame indicates the first device to evaluate a variation of CSI from the second device to the first device. The sending unit 22 is further configured to send a plurality of second BRP-TX PPDUs, where the plurality of second BRP-TX PPDUs are used to evaluate the variation of the CSI from the second device to the first device. The receiving unit 21 is further configured to receive a fourth BRP frame carrying a second sector information list. The second sector information list is used to feed back one or more sending sectors whose variation of the CSI from the second device to the first device is greater than a CSI variation threshold.

Optionally, the processing unit 23 is further configured to generate the third BRP frame. The processing unit 23 is further configured to generate the plurality of second BRP-TX PPDUs.

Optionally, the receiving unit 21 is further configured to receive a first MIMO BF setup frame, where the first MIMO BF setup frame includes first indication information, and the first indication information indicates the second device to evaluate the variation of the CSI from the first device to the second device. The receiving unit 21 is further configured to receive a plurality of first BRP TX/RX PPDUs. The processing unit 23 is further configured to evaluate the variation of the CSI from the first device to the second device based on the plurality of first BRP TX/RX PPDUs. The sending unit 22 is further configured to send a first MIMO BF feedback frame carrying a third sector information list. The third sector information list is used to feed back a sending sector in one or more sending and receiving sector pairs whose variation of the CSI from the first device to the second device is greater than the CSI variation threshold.

Optionally, the processing unit 23 is further configured to generate the first MIMO BF feedback frame carrying the third sector information list.

Optionally, the sending unit 22 is further configured to send a second MIMO BF setup frame, where the second MIMO BF setup frame includes second indication information, and the second indication information indicates the first device to evaluate the variation of the CSI from the second device to the first device. The sending unit 22 is further configured to send a plurality of second BRP TX/RX PPDUs, where the plurality of second BRP TX/RX PPDUs are used to evaluate the variation of the CSI from the second device to the first device. The receiving unit 21 is further configured to receive a second MIMO BF feedback frame carrying a fourth sector information list. The fourth sector information list is used to feed back a sending sector in one or more sending and receiving sector pairs whose variation of the CSI from the second device to the first device is greater than the CSI variation threshold.

Optionally, the processing unit 23 is further configured to generate the second MIMO BF setup frame. The processing unit 23 is further configured to generate the plurality of second BRP TX/RX PPDUs.

The receiving unit 21 and the sending unit 22 may be integrated into one module, for example, a transceiver module.

It should be understood that the second device in this design may correspondingly perform the foregoing method Embodiment 1, and the foregoing operations or functions of the units in the second device are respectively used to implement corresponding operations in the foregoing method Embodiment 1. For technical effect of the second device, refer to the technical effect in the foregoing Embodiment 1. For brevity, details are not described herein again.

In another design, the receiving unit 21 is configured to quasi-omnidirectionally receive a plurality of short SSW frames. The receiving unit 21 is further configured to receive a first BRP frame, where the first BRP frame indicates the second device to evaluate a variation of CSI from a first device to the second device based on the plurality of short SSW frames. The sending unit 22 is configured to send a second BRP frame carrying a first sector information list. The first sector information list is used to feed back one or more sending sectors whose variation of the CSI from the first device to the second device is greater than a CSI variation threshold.

Optionally, the second device further includes a processing unit 23, configured to generate the second BRP frame carrying the first sector information list.

Optionally, the receiving unit 21 is further configured to receive a first MIMO BF setup frame, where the first MIMO BF setup frame includes first indication information, and the first indication information indicates the second device to evaluate the variation of the CSI from the first device to the second device in a multiple user MIMO beamforming training procedure. The receiving unit 21 is further configured to receive a plurality of first BRP TX/RX PPDUs. The processing unit 23 is further configured to evaluate the variation of the CSI from the first device to the second device based on the plurality of first BRP TX/RX PPDUs. The sending unit 22 is further configured to send a first MIMO BF feedback frame carrying a third sector information list. The third sector information list is used to feed back a sending sector in one or more sending and receiving sector pairs whose variation of the CSI from the first device to the second device is greater than the CSI variation threshold.

Optionally, the processing unit 23 is further configured to generate the first MIMO BF feedback frame carrying the third sector information list.

The receiving unit 21 and the sending unit 22 may be integrated into one module, for example, a transceiver module.

It should be understood that the second device in this design may correspondingly perform the foregoing method Embodiment 2, and the foregoing operations or functions of the units in the second device are respectively used to implement corresponding operations in the foregoing method Embodiment 2. For technical effect of the second device, refer to the technical effect in the foregoing Embodiment 2. For brevity, details are not described herein again.

The foregoing describes the first device and the second device in embodiments of this application. The following describes possible product forms of the first device and the second device. It should be understood that a product in any form that has the functions of the first device in FIG. 16 and a product in any form that has the functions of the second device in FIG. 17 fall within the protection scope of embodiments of this application. It should be further understood that the following description is merely an example, and the product forms of the first device and the second device in embodiments of this application is not limited thereto.

In a possible product form, the first device and the second device in embodiments of this application may be implemented by using a general bus architecture.

The first device includes a processor and a transceiver that is internally connected to and communicates with the processor.

In a design, the transceiver is configured to send a first beam refinement protocol (beam refinement protocol, BRP) frame, where the first BRP frame indicates a second device to evaluate a variation of channel state information (CSI) from the first device to the second device. The transceiver is further configured to send a plurality of first BRP-TX PPDUs, where the plurality of first BRP-TX PPDUs are used to evaluate the variation of the CSI from the first device to the second device. The transceiver is further configured to receive a second BRP frame carrying a first sector information list. The first sector information list is used to feed back one or more sending sectors whose variation of the CSI from the first device to the second device is greater than a CSI variation threshold.

Optionally, the processor is configured to generate the first BRP frame. The processor is further configured to generate the plurality of first BRP-TX PPDUs.

In another design, the transceiver is configured to send a plurality of short sector sweep (sector sweep, SSW) frames. The transceiver is further configured to send a first BRP frame, where the first BRP frame indicates a second device to evaluate a variation of CSI from the first device to the second device based on the plurality of short SSW frames. The transceiver is further configured to receive a second BRP frame carrying a first sector information list. The first sector information list is used to feed back one or more sending sectors whose variation of the CSI from the first device to the second device is greater than a CSI variation threshold.

Optionally, the processor is configured to generate the plurality of short SSW frames. The processor is further configured to generate the first BRP frame.

The second device includes a processor and a transceiver that is internally connected to and communicates with the processor.

In a design, the transceiver is configured to receive a first BRP frame, where the first BRP frame indicates the second device to evaluate a variation of CSI from a first device to the second device. The transceiver is further configured to quasi-omnidirectionally receive a plurality of first BRP-TX PPDUs. The processor is configured to evaluate the variation of the CSI from the first device to the second device based on the plurality of first BRP-TX PPDUs. The transceiver is further configured to send a second BRP frame carrying a first sector information list. The first sector information list is used to feed back one or more sending sectors whose variation of the CSI from the first device to the second device is greater than a CSI variation threshold.

Optionally, the processor is configured to generate the second BRP frame carrying the first sector information list.

In another design, the transceiver is configured to quasi-omnidirectionally receive a plurality of short SSW frames. The transceiver is further configured to receive a first BRP frame, where the first BRP frame indicates the second device to evaluate a variation of CSI from a first device to the second device based on the plurality of short SSW frames. The transceiver is further configured to send a second BRP frame carrying a first sector information list. The first sector information list is used to feed back one or more sending sectors whose variation of the CSI from the first device to the second device is greater than a CSI variation threshold.

Optionally, the processor is configured to generate the second BRP frame carrying the first sector information list.

In a possible product form, the first device and the second device in embodiments of this application may be implemented by general-purpose processors.

A general-purpose processor for implementing the first device includes a processing circuit and an input/output interface that is internally connected to and communicates with the processing circuit.

In a design, the input/output interface is configured to send a first beam refinement protocol (beam refinement protocol, BRP) frame, where the first BRP frame indicates a second device to evaluate a variation of channel state information (CSI) from the first device to the second device. The input/output interface is further configured to send a plurality of first BRP-TX PPDUs, where the plurality of first BRP-TX PPDUs are used to evaluate the variation of the CSI from the first device to the second device. The input/output interface is further configured to receive a second BRP frame carrying a first sector information list. The first sector information list is used to feed back one or more sending sectors whose variation of the CSI from the first device to the second device is greater than a CSI variation threshold.

Optionally, the processing circuit is configured to generate the first BRP frame. The processing circuit is further configured to generate the plurality of first BRP-TX PPDUs.

In another design, the input/output interface is configured to send a plurality of short sector sweep (sector sweep, SSW) frames. The input/output interface is further configured to send a first BRP frame, where the first BRP frame indicates a second device to evaluate a variation of CSI from the first device to the second device based on the plurality of short SSW frames. The input/output interface is further configured to receive a second BRP frame carrying a first sector information list. The first sector information list is used to feed back one or more sending sectors whose variation of the CSI from the first device to the second device is greater than a CSI variation threshold.

Optionally, the processing circuit is configured to generate the plurality of short SSW frames. The processing circuit is further configured to generate the first BRP frame.

A general-purpose processing circuit for implementing the second device includes a processing circuit and an input/output interface that is internally connected to and communicates with the processing circuit.

In a design, the input/output interface is configured to receive a first BRP frame, where the first BRP frame indicates the second device to evaluate a variation of CSI from a first device to the second device. The input/output interface is further configured to quasi-omnidirectionally receive a plurality of first BRP-TX PPDUs. The processing circuit is configured to evaluate the variation of the CSI from the first device to the second device based on the plurality of first BRP-TX PPDUs. The input/output interface is further configured to send a second BRP frame carrying a first sector information list. The first sector information list is used to feed back one or more sending sectors whose variation of the CSI from the first device to the second device is greater than a CSI variation threshold.

Optionally, the processing circuit is configured to generate the second BRP frame carrying the first sector information list.

In another design, the input/output interface is configured to quasi-omnidirectionally receive a plurality of short SSW frames. The input/output interface is further configured to receive a first BRP frame, where the first BRP frame indicates the second device to evaluate a variation of CSI from a first device to the second device based on the plurality of short SSW frames. The input/output interface is further configured to send a second BRP frame carrying a first sector information list. The first sector information list is used to feed back one or more sending sectors whose variation of the CSI from the first device to the second device is greater than a CSI variation threshold.

Optionally, the processing circuit is configured to generate the second BRP frame carrying the first sector information list.

It should be understood that the apparatuses or devices in the foregoing various product forms have any function of the first device or the second device in the foregoing method embodiments, and details are not described herein again.

An embodiment of this application further provides a computer-readable storage medium. The computer-readable storage medium stores computer program code. When the processor executes the computer program code, an electronic device performs the method in any one of the foregoing embodiments.

An embodiment of this application further provides a computer program product. When the computer program product runs on a computer, the computer is enabled to perform the method in any one of the foregoing embodiments.

An embodiment of this application further provides a communication apparatus. The apparatus may exist in a product form of a chip. A structure of the apparatus includes a processor and an interface circuit. The processor is configured to communicate with another apparatus through the receiving circuit, to enable the apparatus to perform the method in any one of the foregoing embodiments.

An embodiment of this application further provides a wireless communication system, including a first device and a second device. The first device and the second device may perform the method in any one of the foregoing embodiments.

Method or algorithm steps described in combination with the content disclosed in this application may be implemented by hardware, or may be implemented by a processor by executing software instructions. The software instructions may include a corresponding software module. The software module may be stored in a random access memory (RAM), a flash memory, an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer-readable storage medium and a communication medium. The communication medium includes any medium that facilitates transmission of a computer program from one place to another. The storage medium may be any available medium accessible to a general-purpose or a dedicated computer.

In the foregoing specific implementations, the objectives, technical solutions, and beneficial effect of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A method, comprising:
   sending, by a first device, a first beam refinement protocol (BRP) frame, wherein the first BRP frame indicates to a second device to evaluate a variation of channel state information (CSI) from the first device to the second device;
   sending, by the first device, a plurality of first BRP transmit (TX) physical layer protocol data units (PPDUs), wherein the plurality of first BRP-TX PPDUs are configured to be used to evaluate the variation of the CSI from the first device to the second device; and
   receiving, by the first device, a second BRP frame carrying a first sector information list, wherein the first sector information list feeds back one or more sending sectors whose variation of the CSI from the first device to the second device is greater than a CSI variation threshold.

2. The method according to claim 1, further comprising:
   receiving, by the first device, a third BRP frame, wherein the third BRP frame indicates to the first device to evaluate a variation of CSI from the second device to the first device; and
   wherein after receiving, by the first device, the second BRP frame carrying the first sector information list, the method further comprises:
     quasi-omnidirectionally receiving, by the first device, a plurality of second BRP-TX PPDUs, and evaluating the variation of the CSI from the second device to the first device based on the plurality of second BRP-TX PPDUs; and
     sending, by the first device, a fourth BRP frame carrying a second sector information list, wherein the second sector information list feeds back one or more sending sectors whose variation of the CSI from the second device to the first device is greater than a CSI variation threshold.

3. The method according to claim 1, wherein:
   the first BRP frame comprises a CSI measurement request field and a number of self-beam-sweep cycles field;
   the CSI measurement request field is set to a first value, indicating to the second device to measure the CSI; and
   the number of self-beam-sweep cycles field indicates a number of sweep cycles of a sending beam.

4. The method according to claim 3, wherein the first BRP frame further comprises one or more of the following fields:
   a sensing BRP-transmit sector sweep (TXSS) field, indicating either a request to perform a sensing BRP TXSS process or to acknowledge a request to perform the sensing BRP TXSS process when a value of the sensing BRP-TXSS field is 1;
   a sensing transmit sector identifier field, indicating a sector identifier to be trained;
   a sensing transmit antenna identifier mask field, indicating an antenna bitmap to be trained;

a CSI variation threshold field, indicating the CSI variation threshold; or an evaluation algorithm field, indicating an evaluation algorithm of the CSI.

5. The method according to claim 1, wherein the first sector information list is located in a sensing measurement feedback element whose element identifier in the second BRP frame is a reserved value.

6. The method according to claim 1, wherein the first sector information list comprises a plurality of groups of first sector identifiers, and each group of first sector identifiers comprises a respective antenna weight vector (AWV) feedback identifier and a respective transmit antenna identifier; and wherein a sending sector determined by an AWV feedback identifier and a transmit antenna identifier in a first group of first sector identifiers and a value of a BRP down counter corresponding to the AWV feedback identifier of the first group of first sector identifiers is a sending sector that is in all sending sectors of the first device and in which a CSI difference between any two CSI measurements on a same sending sector is greater than the CSI variation threshold.

7. The method according to claim 2, wherein:

the third BRP frame comprises a CSI measurement request field and a number of self-beam-sweep cycles field;

a value of the CSI measurement request field is a first value, indicating to the first device to measure the CSI; and the number of self-beam-sweep cycles field indicates a number of sweep cycles of a sending beam.

8. The method according to claim 7, wherein the third BRP frame further comprises one or more of the following fields:

a sensing BRP-TXSS field, indicating to acknowledge performance of a sensing BRP TXSS operation when a value of the sensing BRP-TXSS field is 1;

a sensing transmit sector identifier field, indicating a sector identifier to be trained;

a sensing transmit antenna identifier mask field, indicating an antenna bitmap to be trained;

a CSI variation threshold field, indicating the CSI variation threshold; or an evaluation algorithm field, indicating an evaluation algorithm of the CSI.

9. The method according to claim 2, wherein the second sector information list is located in a sensing measurement feedback element whose element identifier in the third BRP frame is a reserved value.

10. The method according to claim 2, wherein the second sector information list comprises a plurality of groups of second sector identifiers, and each group of second sector identifiers comprises a respective antenna weight vector (AWV) feedback identifier and a respective transmit antenna identifier; and a sending sector determined by an AWV feedback identifier and a transmit antenna identifier in a first group of second sector identifiers and a value of a BRP down counter corresponding to the AWV feedback identifier in the first group of second sector identifiers is a sending sector that is in all sending sectors of the second device and in which a CSI difference between any two CSI measurements on a same sending sector is greater than the CSI variation threshold.

11. A first apparatus, comprising:

a processor, configured to run a computer program or instructions, to perform operations comprising:

sending a first beam refinement protocol (BRP) frame, wherein the first BRP frame indicates to a second apparatus to evaluate a variation of channel state information (CSI) from the first apparatus to the second apparatus;

sending a plurality of first BRP transmit (TX) physical layer protocol data units (PPDUs), wherein the plurality of first BRP-TX PPDUs are configured to be used to evaluate the variation of the CSI from the first apparatus to the second apparatus; and receiving a second BRP frame carrying a first sector information list, wherein the first sector information list feeds back one or more sending sectors whose variation of the CSI from the first apparatus to the second apparatus is greater than a CSI variation threshold.

12. The first apparatus according to claim 11, wherein the processor is configured to run the computer program or instructions, to perform further operations comprising:

receiving a third BRP frame, wherein the third BRP frame indicates to the first apparatus to evaluate a variation of CSI from the second apparatus to the first apparatus;

quasi-omnidirectionally receiving a plurality of second BRP-TX PPDUs, and evaluating the variation of the CSI from the second apparatus to the first apparatus based on the plurality of second BRP-TX PPDUs; and sending a fourth BRP frame carrying a second sector information list, wherein the second sector information list feeds back one or more sending sectors whose variation of the CSI from the second apparatus to the first apparatus is greater than a CSI variation threshold.

13. The first apparatus according to claim 11, wherein:

the first BRP frame comprises a CSI measurement request field and a number of self-beam-sweep cycles field;

the CSI measurement request field is set to a first value, indicating to the second apparatus to measure the CSI; and the number of self-beam-sweep cycles field indicates a number of sweep cycles of a sending beam.

14. The first apparatus according to claim 13, wherein the first BRP frame further comprises one or more of the following fields:

a sensing BRP-transmit sector sweep (TXSS) field, indicating either a request to perform a sensing BRP TXSS process or to acknowledge a request to perform the sensing BRP TXSS process when a value of the sensing BRP-TXSS field is 1;

a sensing transmit sector identifier field, indicating a sector identifier to be trained;

a sensing transmit antenna identifier mask field, indicating an antenna bitmap to be trained;

a CSI variation threshold field, indicating the CSI variation threshold; or an evaluation algorithm field, indicating an evaluation algorithm of the CSI.

15. The first apparatus according to claim 11, wherein the first sector information list is located in a sensing measurement feedback element whose element identifier in the second BRP frame is a reserved value.

16. The first apparatus according to claim 11, wherein the first sector information list comprises a plurality of groups of first sector identifiers, and each group of first sector identifiers comprises an antenna weight vector (AWV) feedback identifier and a transmit antenna identifier; and a sending sector determined by an AWV feedback identifier and a transmit antenna identifier in a first group of first sector identifiers and a value of a BRP down counter corresponding to the AWV feedback identifier in the first group of first sector identifiers is a sending sector that is in all sending sectors of the first apparatus and in which a CSI difference between any two CSI measurements on a same sending sector is greater than the CSI variation threshold.

17. A non-transitory computer-readable storage medium, wherein the non-transitory computer-readable storage medium stores program instructions, and when the program instructions are run on a computer, the computer is enabled to perform operations comprising:

sending a first beam refinement protocol (BRP) frame, wherein the first BRP frame indicates to a second apparatus to evaluate a variation of channel state information (CSI) from a first apparatus to the second apparatus;

sending a plurality of first BRP transmit (TX) physical layer protocol data units (PPDUs), wherein the plurality of first BRP-TX PPDUs are configured to be used to evaluate the variation of the CSI from a first apparatus to the second apparatus; and receiving a second BRP frame carrying a first sector information list, wherein the first sector information list feeds back one or more sending sectors whose variation of the CSI from the first apparatus to the second apparatus is greater than a CSI variation threshold.

18. The non-transitory computer-readable storage medium according to claim 17, wherein the computer is enabled to perform further operations comprising:

receiving a third BRP frame, wherein the third BRP frame indicates to the first apparatus to evaluate a variation of CSI from the second apparatus to the first apparatus; and quasi-omnidirectionally receiving a plurality of second BRP-TX PPDUs, and evaluating the variation of the CSI from the second apparatus to the first apparatus based on the plurality of second BRP-TX PPDUs; and sending a fourth BRP frame carrying a second sector information list, wherein the second sector information list feeds back one or more sending sectors whose variation of the CSI from the second apparatus to the first apparatus is greater than a CSI variation threshold.

19. The non-transitory computer-readable storage medium according to claim 17, wherein:

the first BRP frame comprises a CSI measurement request field and a number of self-beam-sweep cycles field;

the CSI measurement request field is set to a first value, indicating to the second apparatus to measure the CSI; and the number of self-beam-sweep cycles field indicates a number of sweep cycles of a sending beam.

20. The non-transitory computer-readable storage medium according to claim 19, wherein the first BRP frame further comprises one or more of the following fields:

a sensing BRP-transmit sector sweep (TXSS) field, indicating either a request to perform a sensing BRP TXSS process or to acknowledge a request to perform the sensing BRP TXSS process when a value of the sensing BRP-TXSS field is 1;

a sensing transmit sector identifier field, indicating a sector identifier to be trained;

a sensing transmit antenna identifier mask field, indicating an antenna bitmap to be trained;

a CSI variation threshold field, indicating the CSI variation threshold; and an evaluation algorithm field, indicating an evaluation algorithm of the CSI.

\* \* \* \* \*